(12) United States Patent
McGill

(10) Patent No.: US 9,875,567 B2
(45) Date of Patent: Jan. 23, 2018

(54) SYSTEMS AND METHODS FOR MODELING

(71) Applicant: Digizyme, Inc., Watertown, MA (US)

(72) Inventor: Gaël-Christophe Garth McGill, Brookline, MA (US)

(73) Assignee: Digizyme, Inc., Brookline, MA (US)

( * ) Notice: Subject to any disclaimer, the term of this patent is extended or adjusted under 35 U.S.C. 154(b) by 0 days.

(21) Appl. No.: 14/662,888

(22) Filed: Mar. 19, 2015

(65) Prior Publication Data
US 2015/0269764 A1 Sep. 24, 2015

Related U.S. Application Data

(63) Continuation-in-part of application No. 14/220,647, filed on Mar. 20, 2014, now abandoned.

(51) Int. Cl.
G06T 13/20 (2011.01)
G09B 5/02 (2006.01)

(52) U.S. Cl.
CPC ............... G06T 13/20 (2013.01); G09B 5/02 (2013.01)

(58) Field of Classification Search
USPC .................................. 345/473, 419; 382/132
See application file for complete search history.

(56) References Cited

U.S. PATENT DOCUMENTS

| | | | | |
|---|---|---|---|---|
| 7,079,145 B2* | 7/2006 | Tonge | ..................... | G06F 17/11 345/419 |
| 8,498,846 B2* | 7/2013 | Xu | ..................... | G06F 17/5086 703/2 |
| 8,543,337 B2* | 9/2013 | Paxson | ................. | G06F 19/708 702/19 |
| 8,624,898 B1 | 1/2014 | Bugaj et al. | | |
| 8,941,680 B2* | 1/2015 | Bobrow | ................. | G06T 13/20 345/419 |
| 2007/0016853 A1 | 1/2007 | Abagyan et al. | | |

(Continued)

FOREIGN PATENT DOCUMENTS

| | | |
|---|---|---|
| EP | 1274060 A1 | 1/2003 |
| WO | 2008/154487 A1 | 12/2008 |

OTHER PUBLICATIONS

International Search Report and Written Opinion dated Jun. 30, 2015, for International Patent Application No. PCT/US2015/021721 with International Filing Date Mar. 20, 2015 (13 Pages).

*Primary Examiner* — Kimbinh T Nguyen
(74) *Attorney, Agent, or Firm* — Brown Rudnick LLP; Adam M. Schoen

(57) ABSTRACT

The invention provides systems that allow users to design and model natural structures such as biomolecules. The system can include a collection of individual models and also provide users with the option to select certain simulation/interaction modalities that will influence the dynamics of models within a simulation created by the user. The system includes a processor coupled to a non-transitory memory within which is stored a digital model that includes data representing a structure and a rig that defines animation dynamics for the structure such that a range of motion of the at least one digital model on an electronic display device is predetermined without manipulation from a user. They system also includes at least one molecular dynamics modality selectable by the user that applies one or more parameters that influence the animation dynamics of the structure in a simulation provided by the system.

24 Claims, 51 Drawing Sheets

(56) References Cited

U.S. PATENT DOCUMENTS

| | | | |
|---|---|---|---|
| 2009/0091563 A1* | 4/2009 | Viz | G06T 13/40 |
| | | | 345/419 |
| 2009/0177455 A1 | 7/2009 | Banerjee et al. | |
| 2013/0187930 A1* | 7/2013 | Millman | G06T 13/20 |
| | | | 345/473 |
| 2013/0222265 A1 | 8/2013 | Smith et al. | |
| 2013/0329982 A1* | 12/2013 | Alghamdi | G06F 19/3437 |
| | | | 382/132 |
| 2014/0267278 A1* | 9/2014 | Ali | G06T 13/20 |
| | | | 345/427 |

\* cited by examiner

407

2201

Modeling of CEA (Carcino-Embryonic Antigen) "Target Cell Side"

| Asset Piece | Graphical View | Asset Residues | Total AA | PDB | PDB Residues | PDB Description | UniProt | (Missing) Asset Connector |
|---|---|---|---|---|---|---|---|---|
| CEA-1 domain | | 35-144 | 110 | 1cd7 | 1-642 | Model of hCEA by homology modelling (H. Sapiens) | P06731 | N/A* (human) |
| CEA-2 domain | | 144-237 | 93 | 1cd7 | 1-642 | Model of hCEA by homology modelling (H. Sapiens) | P06731 | N/A* (human) |
| CEA-3 domain | | 238-322 | 85 | 1cd7 | 1-642 | Model of hCEA by homology modelling (H. Sapiens) | P06731 | N/A* (human) |
| CEA-4 domain | | 324-415 | 92 | 1cd7 | 1-642 | Model of hCEA by homology modelling (H. Sapiens) | P06731 | N/A* (human) |
| CEA-5 domain | | 416-498 | 83 | 1cd7 | 1-642 | Model of hCEA by homology modelling (H. Sapiens) | P06731 | N/A* (human) |
| CEA-6 domain | | 502-593 | 92 | 1cd7 | 1-642 | Model of hCEA by homology modelling (H. Sapiens) | P06731 | N/A* (human) |
| CEA-7 domain | | 594-677 | 84 | 1cd7 | 1-642 | Model of hCEA by homology modelling (H. Sapiens) | P06731 | N/A* (human) |
| TM domain | | N/A | N/A | 2m0t | 134-177 | EGFR transmembrane (TM) domain (H. Sapiens) | P00533 | N/A |
| Glycosylation | | 104-685 | N/A | N/A | N/A | Type: N-linked (GlcNAc); 28 sites; (hCEA H. Sapiens) | P06731 | N/A |

FIG. 48

SYSTEMS AND METHODS FOR MODELING

CROSS-REFERENCE TO RELATED APPLICATION

This application is a continuation-in-part of U.S. patent application Ser. No. 14/220,647, filed Mar. 20, 2014, the contents of which are incorporated by reference.

FIELD OF THE INVENTION

The invention generally relates to systems for building a scientific animation and methods of use thereof.

BACKGROUND

An understanding of a scientific concept is dependent on a person's ability to assimilate dynamic and increasingly complex interrelated processes. For example, in the fields of cellular and molecular biology, numerous cellular and molecular interactions must be understood to comprehend how biological processes are accomplished within complex systems at several different levels of organization.

Unfortunately, most tools for studying scientific concepts are passively visual or text-based. Textual-based learning relies on a person to create an abstraction of a microscopic structure or process by reading some published text. Such an approach has led people to perceive scientific concepts as a series of unconnected ideas or theories, rarely integrating their knowledge and allowing them to make connections with real-life phenomena. Visual tools such as illustrations, diagrams, and animations are not necessarily well-suited to the scientific concepts being studied. For example, some visual materials show scientific phenomena with deceptive clarity, offering an oversimplified view for the sake of clarity. In any case, visual and textual publications embody a limiting paradigm—the document can only show what the author has thought to include. A person studying from such a document is not typically led to new insights. As such, print and digital publications have limited applicability as tools for the synthesis of new information about the natural world.

SUMMARY

The invention provides systems that allow users to design and model natural structures such as biomolecules. The system can include a collection of individual models and also provide users with the option to select certain simulation/interaction modalities that will influence the dynamics of models within a simulation created by the user. Additionally, the system may include environments, such as pre-curated biological or cellular environments that allow the users to simulate and test the interactions of the natural structures with their environments. For example, a team of users could design a novel therapeutic protein and model that protein within the context of a cellular membrane which itself has a realistic and accurate composition of lipids and cell-surface proteins. In such an example, the users could select a molecular dynamics modality to govern the motions and interactions of the novel therapeutic and the cell surface proteins. The system presents the users with the relevant user interface and molecular pre-sets and also facilitates the automated and sophisticated creation of a simulation or visualization of the modeled natural structures. The users themselves can view and interact with the simulation or the product can be provided for access by third parties. A feature of the invention is the ability for groups of users to collaborate, even over diverse geography and time. A first user could set up the question to be explored and another user or team could provide the individual models, such as proteins, nucleic acids, or crystals. A different set of people could provide interesting modeling algorithms and the entire collaborative process could even feedback on itself, with different parts of the team making changes along the way based on extrinsic and intrinsic insights. Since systems of the invention use scientifically accurate models of natural structures to create simulations in which users select or control the environment and the modeling algorithms, researchers can use the system to conceptualize, design, model, and simulate natural phenomena involving biomolecules or other actors. Novel combinations of elements can be made and the system will simulate how those actors interact and what results they produce. Thus, systems and methods of the invention provide tools for the synthesis of natural information.

In certain aspects, the invention provides an integrated system for providing a scientific simulation. The system includes a processor coupled to a non-transitory memory. Stored within the system is at least one digital model that includes data representing a structure and a rig that defines animation dynamics for the structure such that a range of motion of the at least one digital model on an electronic display device is predetermined without manipulation from a user. They system also includes at least one molecular dynamics modality selectable by the user that applies one or more parameters that influence the animation dynamics of the structure in a simulation provided by the system. The user-selectable molecular dynamics modality may include, for example, Brownian dynamics, a Monte Carlo simulation, an explicit-solvent coarse-grained simulation, an implicit-solvent coarse-grained simulation, or molecular dynamics. The structure and the rig of the digital model and the selected molecular dynamics modality may be used to govern how that digital model will interact with other digital models in the simulation and a resulting visualization. The rig that defines animation dynamics may include different sets of rules for the digital model based on the selected molecular dynamics modality. For example, the rig may offer various methods and levels of coarse-graining detail and the selected molecular dynamics modality can allow the user to control one or more of temperature, salinity, pH, osmolality, or viscosity in the simulation. In some embodiments, the rig allows the data to illustrate a biological entity in a plurality of realistic conformations within the simulation.

The system may also include a user-selectable environment that defines the volume and composition of the simulation space for the digital model. The user-selectable environment may have compositional and quantitative settings. For example, the user-selectable environment may provide a representation of a biological membrane for which the compositional and quantitative settings control a specific molecular composition of the biological membrane or a relative amount of lipids and proteins in the biological membrane.

The system may include and provide a graphical interface that allows a user to select the molecular dynamics modality and build the simulation. In certain embodiments, the system is operable to receive a new digital model from the user and create the simulation using the new digital model and the selected molecular dynamics modality. In some embodiments, the user creates the simulation and shares a visual version of the simulation with a plurality of viewers.

Embodiments of the invention allow users to realize value from an emphasis on sharing. For example, a plurality of users can collaboratively work and influence the entire process—from assembly of the model, rigging, simulation and visualization process. Shared collaboration according to the invention also catalyzes communication between team members who may not otherwise effectively communicate (i.e. between molecular modeling experts and disease biologists or even clinicians). As such, it can improve the therapeutic design process by streamlining communications, integrating knowledge along the entire spectrum of expertise and support decisions. The integration of knowledge from diverse collaborating sources helps to avoid downstream (and therefore more costly) mistakes. In some embodiments, a plurality of users may contribute to the simulation by selecting one or more molecular dynamics modalities or digital models for inclusion in the simulation.

Based on rigging techniques and molecular dynamics choices by the user(s), the system may offer relevant simulation methods and do so in a way that alerts the user to the computational feasibility and requirements. The system can help users in the design of novel molecular entities by offering a function-based menu of molecular domains. For example, if a user is designing a cytoplasmic protein and needs to properly localize that protein to a membrane for the protein to function properly, the user could select a 'membrane recruitment' or 'membrane localization' tab of the GUI. For example, the GUI could include a molecular domains/parts menu and a number of relevant structures/rigs could be provided there, ready for modeling and appending to the rest of the molecule being designed (for example, like PH or C protein domains, or a farnesyl chemical group).

The system preferably includes pre-modeled or pre-populated (but still customizable) environments within or against which a model can be simulated. This may be used to provide a 'panel' of controls against which to simulate novel molecular entities. For example, if a new protein therapeutic has been modeled, it can be examined for binding to a receptor on a surface chosen by user (such as a colon cancer cell plasma membrane). However, the new protein therapeutic could further be simulated against a panel of other common cellular (and inorganic surfaces such as those found on medical devices) to model and predict any adverse interactions. In other words, a researcher could probe such questions as "is this protein sticking to the surface of normal colon epithelium as well?" or "is this protein interacting with artificial surfaces like PLGA?"

Systems and methods of the invention may be used to integrate multiple steps of what is currently experienced as a discontinuous process of modeling, simulation, and visualization. The invention facilitates use by a new type of user (e.g., users who wouldn't otherwise know how to do this type of work) thereby democratizing the use of modeling and simulation in molecular/cell biology. Since the system includes built-in menus for parameterizing simulations, the invention overcomes prior-art problems in which knowing which simulations to run and how to parameterize them is not trivial to the uninitiated. Thus systems and methods of the invention provide the power and advantage of integration and presets at all stages—modeling, simulation and visualization.

Aspects of the invention provide a method for providing a scientific simulation. The method includes obtaining a plurality of digital models stored in a non-transitory computer-readable medium. Each digital model has data representing a structure and a rig that defines animation dynamics for the structure such that motion of each digital model on an electronic display device is predetermined without manipulation from a user. At least one molecular dynamics modality is selected that applies one or more parameters that influence the animation dynamics of the plurality of digital models and a simulation is generated through use of the plurality of digital models and the selected molecular dynamics modality. The simulation is output for display on an electronic device as a visualization that conveys a scientific concept to a user. The user-selectable modality may provide, for example, Brownian dynamics, a Monte Carlo simulation, an explicit-solvent coarse-grained simulation, an implicit-solvent coarse-grained simulation, an all-atom simulation, or a quantum mechanical simulation. The selected molecular dynamics modality and the rig of the digital model govern how that digital model will interact with other digital models in a visualization.

The method may include using at least one user-selectable environment, e.g., to control compositional and quantitative settings. A graphical interface may allow a user to select the molecular dynamics modality and build the simulation. Preferably, the structure and the rig of the digital model and the selected molecular dynamics modality govern how that digital model will interact with other digital models in the simulation and a resulting visualization. The method can include using the rig to illustrate a biological entity in a plurality of realistic conformations within the simulation. A plurality of users may contribute to the simulation by selecting one or more molecular dynamics modalities or digital models for inclusion in the simulation. Optionally, at least one of the digital models comprises two or more alternative rigs.

In certain embodiments, the memory includes an environment model that the user may include in the simulation (e.g., an environment model that represents at least a portion of a biological lipid membrane). The method may include receiving a new digital model from the user and creating the simulation using the environment model, the new digital model, and the selected molecular dynamics modality. The simulation may, for example, include a number of the digital models in a pathway animation depicting a cascade of events in which at least two depicted biological structures interact only indirectly. The selected molecular dynamics modality allows the user to control one or more of—for example—temperature, salinity, pH, osmolality, or viscosity. Using methods of the invention, a user may create the simulation and share a visual version of the simulation with a plurality of viewers.

Aspects of the invention provide a system for producing a scientific simulation. The system includes a plurality of digital models stored in a non-transitory computer-readable medium, each digital model comprising data representing a structure and a rig that defines animation dynamics for the structure such that motion of each digital model on an electronic display device is predetermined without manipulation from a user. The system includes one or more user-selectable molecular dynamics modality that applies one or more parameters that influence the animation dynamics of the plurality of digital models. The system is operable to generate a simulation through use of the plurality of digital models and the selected molecular dynamics modality and output the simulation for display on an electronic device as a visualization that conveys a scientific concept to a user. The system may further include user-selectable environment models that the user may include in the simulation. The selected molecular dynamics modality and the rig of the digital model may govern how that digital model will interact with other digital models in a visualization. Using the system, the user may create the simulation and share a visual version of the simulation with a plurality of viewers. The system may be operated to allow a plurality of users to contribute to the simulation by selecting one or more molecular dynamics modalities or digital models for inclusion in the simulation.

BRIEF DESCRIPTION OF THE DRAWINGS

FIG. 48 illustrates a table breaking out components of the CAR molecule.

DETAILED DESCRIPTION

Systems and methods of the invention allow users to collaborate, design, simulate, and model natural structures such as biomolecules using a collection of individual models and providing users with the option to select certain simulation/interaction modalities that will influence the dynamics of models within a simulation created by the user. Additionally, systems and methods of the invention may provide for the inclusion of environments, such as pre-curated biological or cellular environments that allow the users to simulate and test the interactions of the natural structures with their environments. For example, a team of users could design a novel therapeutic protein and model that protein within the context of a cellular membrane which itself has a realistic and accurate composition of lipids and cell-surface proteins. In such an example, the users could select a molecular dynamics modality to govern the motions and interactions of the novel therapeutic and the cell surface proteins.

Figure 41:
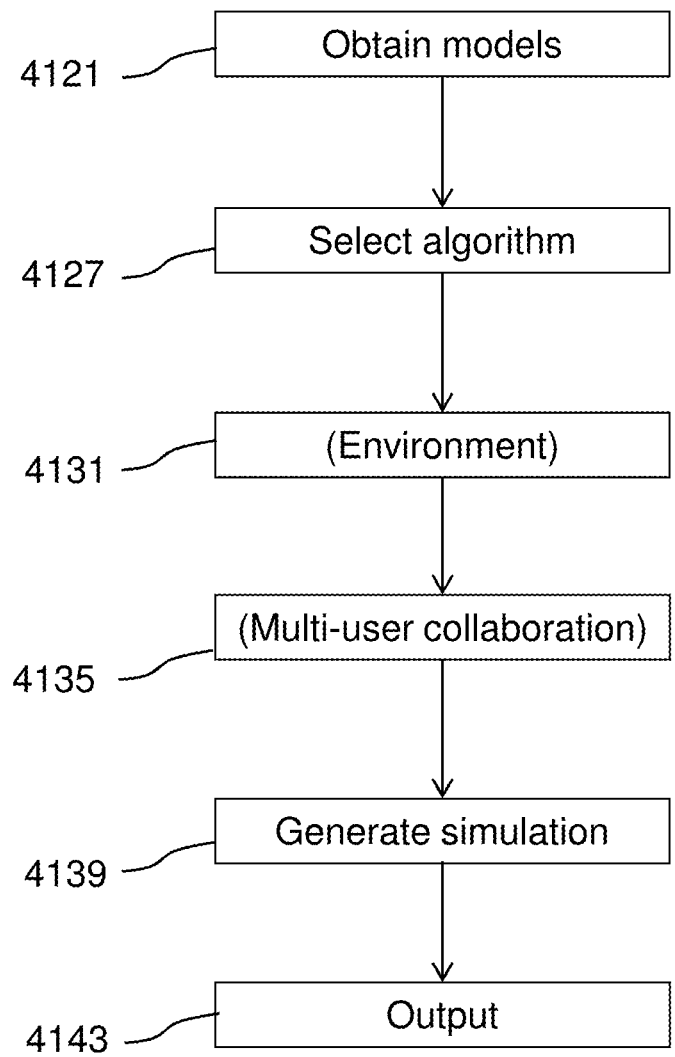
FIG. 41 diagrams a method for providing a scientific simulation.

FIG. 41 diagrams a method 4101 for providing a scientific simulation. The method 4101 includes obtaining 4121 a plurality of digital models stored in a non-transitory computer-readable medium. Each digital model has data representing a structure and a rig that defines animation dynamics for the structure such that motion of each digital model on an electronic display device is predetermined without manipulation from a user. See FIGS. 1-2 and 8-10 and accompanying discussion below. Preferably, the structure and the rig of the digital model and the selected molecular dynamics modality govern how that digital model will interact with other digital models in the simulation and a resulting visualization. The method can include using the rig to illustrate a biological entity in a plurality of realistic conformations within the simulation.

In method 4101, at least one molecular dynamics modality is selected 4127 that applies one or more parameters that influence the animation dynamics of the plurality of digital models and a simulation is generated 4139 through use of the plurality of digital models and the selected molecular dynamics modality. The user-selectable molecular dynamics modality may provide, for example, Brownian dynamics, a Monte Carlo simulation, an explicit-solvent coarse-grained simulation, an implicit-solvent coarse-grained simulation, an all atom simulation, a quantum mechanical simulation, or a combination thereof. The selected molecular dynamics modality and the rig of the digital model govern how that digital model will interact with other digital models in a visualization. Optionally, the user or collaborating users select 4131 at least one user-selectable environment, e.g., to control compositional and quantitative settings.

In a preferred embodiment, the simulation may be offered as a collaborative process and method 4101 may include allowing a plurality of users to contribute 4135 to the simulation by selecting one or more molecular dynamics modalities or digital models for inclusion in the simulation.

Figure 51:
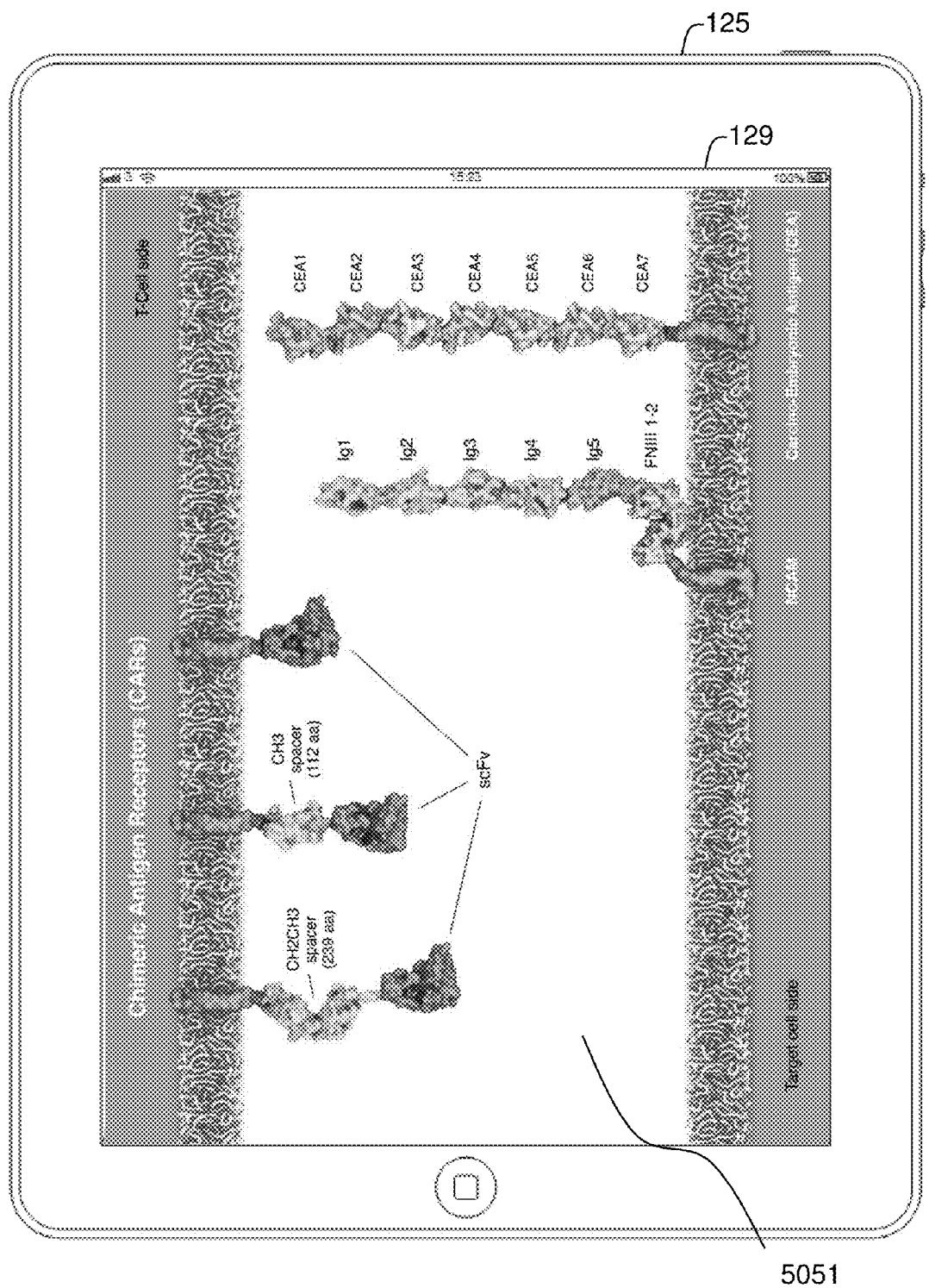
FIG. 51 illustrates a simulation being provided as a visualization on an electronic device.

With continued reference to FIG. 41 and to FIG. 51, the simulation is output 4143 for display on an electronic device 125 as a visualization 129 that conveys a scientific concept to a user. The simulation or visualization that is output 4143 is scientifically accurate and provides a powerful learning and discovery tool since it uses underlying scientific structural data and modeling or interaction modalities. To accomplish this, systems of the invention provide the users with the relevant user interface and molecular pre-sets and also facilitate the automated and sophisticated creation of a simulation or visualization of the modeled natural structures. The users themselves can view and interact with the simulation or the product can be provided for access by third parties. A feature of the invention is the ability for groups of users to collaborate 4135, even over diverse geography and time. A first user could set up the question to be explored and another user or team could provide the individual models, such as proteins, nucleic acids, or crystals. A different set of people could provide interesting modeling algorithms and the entire collaborative process could even feedback on itself, with different parts of the team making changes along the way based on extrinsic and intrinsic insights.

Figure 42:
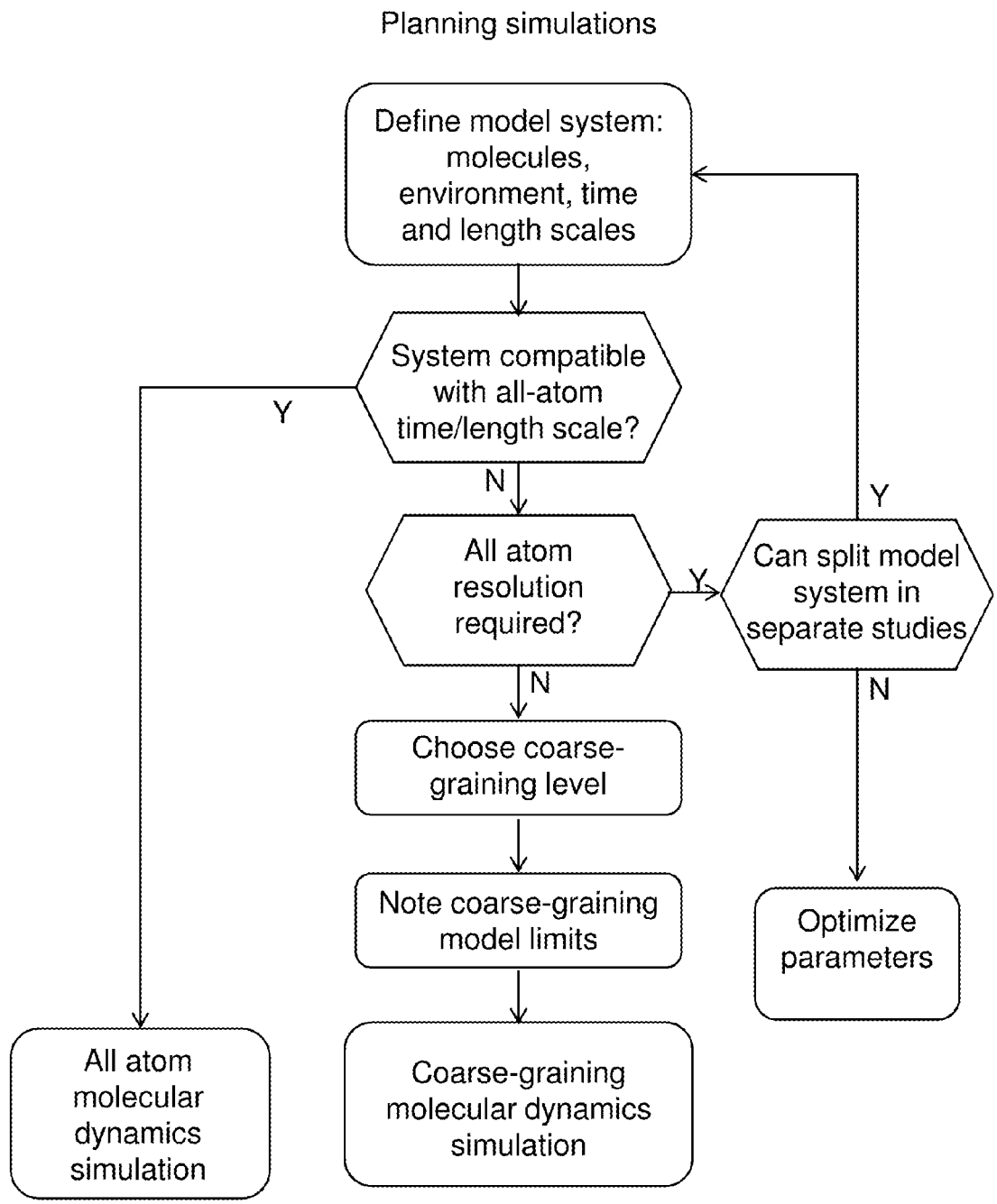
FIG. 42 is a diagram for planning a simulation.

FIG. 42 is a diagram for planning a simulation. The system to be modeled is defined, addressing such parameters as the involved molecules, the environment, and scale. The system can determine whether an all-atom simulation is compatible with the scale. For example, an all-atom representation of a year in the life of a human is probably not compatible with contemporary computer processing power. In contrast, a cell-surface receptor protein embedded in a cell membrane will be compatible with all-atom representation in many contexts. If the model is all-atom compatible, the simulation is created. If the all-atom approach is not compatible, and not required, the planning involves choosing an appropriate coarse-graining level and making a coarse-grained molecular dynamics simulation. If all-atom modeling is required, the model can be split into subsystem or parameters can be otherwise optimized.

Figure 43:
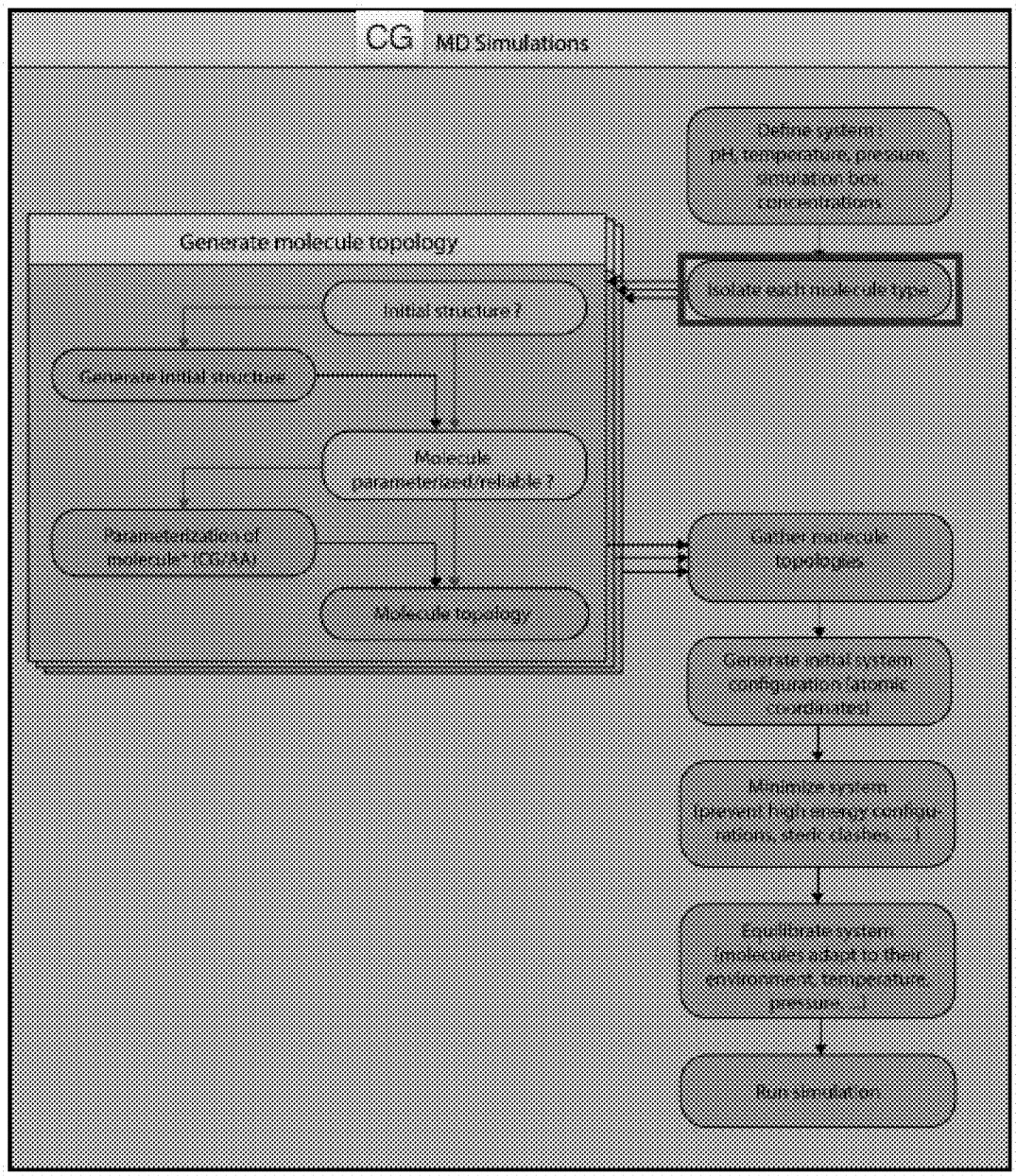
FIG. 43 illustrates a workflow for creating a coarse-grained (CG) molecular dynamics (MD) simulation.

FIG. 43 illustrates a workflow for creating a coarse-grained (CG) molecular dynamics (MD) simulation. Once the system is defined, each molecule type is parameterized to generate a topology. The molecular topologies are gathered by the system and an initial system configuration is generated. The system may optionally be minimized (e.g., preventing steric clashes or high-energy configurations or performing heuristic optimizations) or equilibriated (allowing the molecules to adapt to their environments). The simulation is then run.

Figure 44:
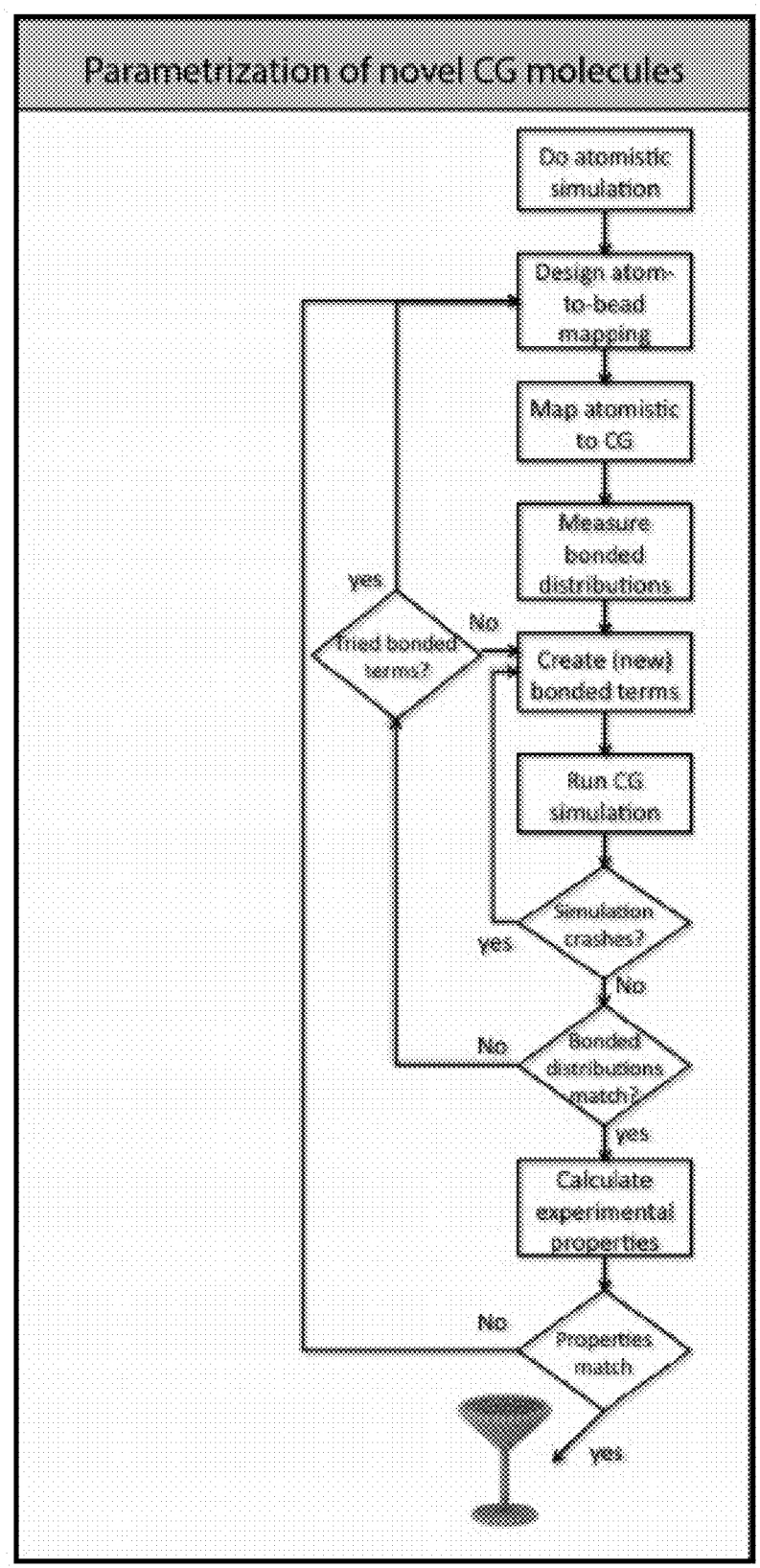
FIG. 44 shows a workflow for parameterization of novel coarse-grained models.
Figure 45:
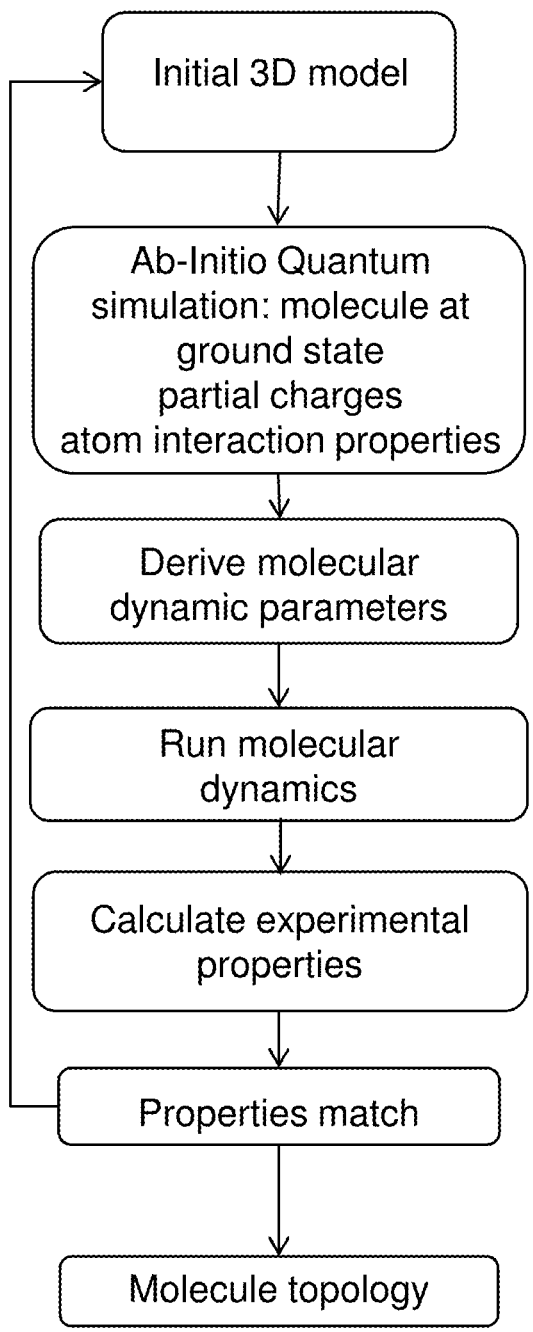
FIG. 45 gives a workflow for parameterization of novel molecules from an ab initio quantum simulation following essentially similar logic.

FIG. 44 shows a workflow for parameterization of novel coarse-grained models. Once any atoms are mapped to coarse-graining and bond distributions are measured, bonded terms are created, and a CG simulation is run. If the simulation does not crash and the bonded distributions match, the experimental properties are calculated. If the properties match, the simulation is output. FIG. 45 gives a workflow for parameterization of novel molecules from an ab initio quantum simulation following essentially similar logic.

An important feature of embodiments of the invention is that the workflows can be performed by the system based on collaborative input from multiple users. For example, a plurality of users can collaboratively work and influence the entire process—from assembly of the model, rigging, simulation and visualization process. By such means, a multidisciplinary team can contribute to a complex task. Shared collaboration according to the invention also catalyzes communication between team members who may not otherwise effectively communicate (i.e. between molecular modeling experts and disease biologists or even clinicians). As such, it can improve the therapeutic design process by streamlining communications, integrating knowledge along the entire spectrum of expertise and support decisions. The integration of knowledge from diverse collaborating sources helps to avoid downstream (and therefore more costly) mistakes.

Figure 46:
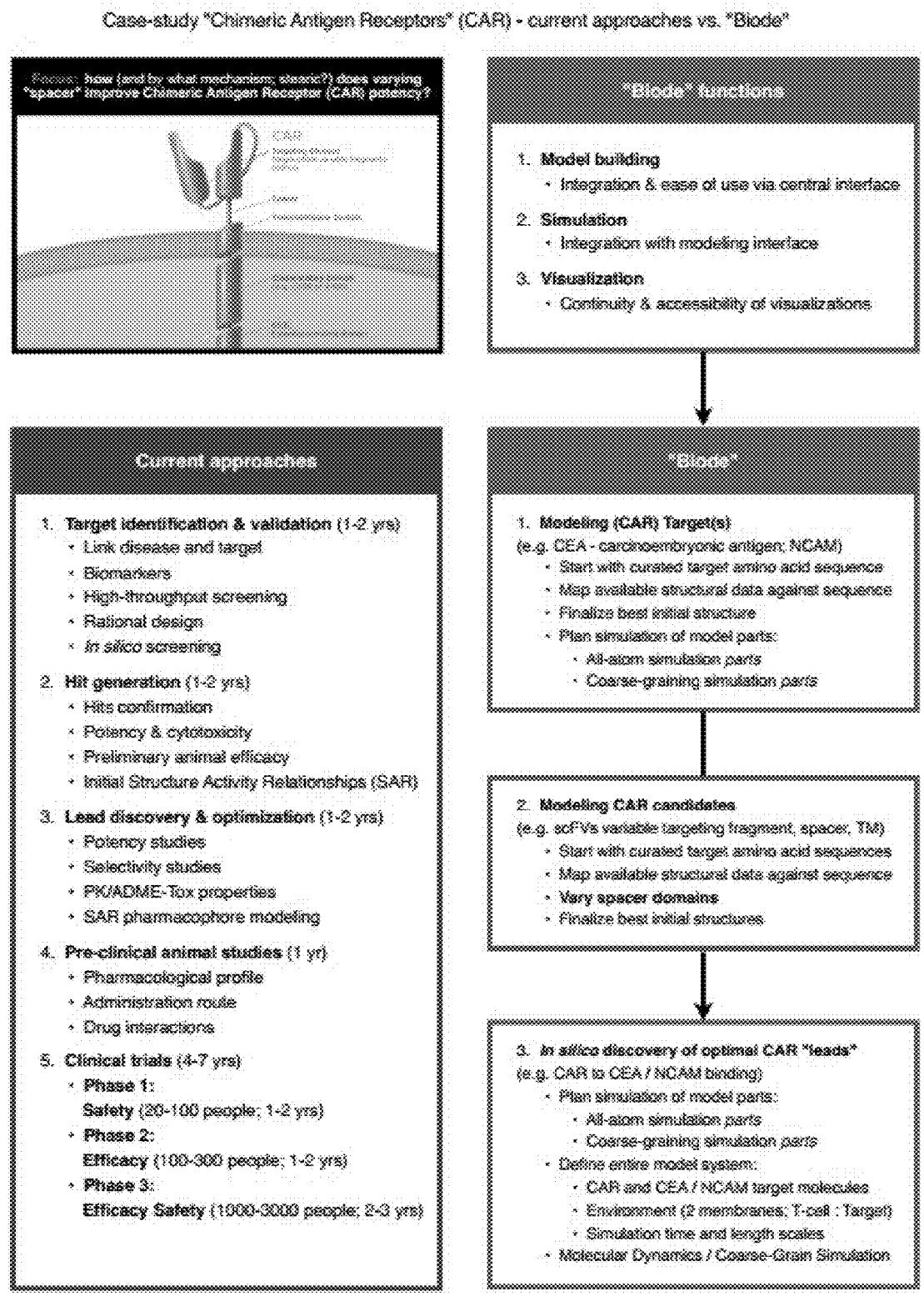
FIG. 46 summarizes current approaches to simulation and modeling for drug discovery and development and compares those approaches to methods of the invention.

FIG. 46 summarizes current approaches to simulation and modeling for drug discovery and development and compares those approaches to methods of the invention. Under current approaches, target identification and validation can take years, after which additional years are spent on hit generation. Each step is often left to different teams. The results of hit generation are passed off to lead optimization and after years there may enter pre-clinical. The depicted current approach suffers by lacking a unifying underlying model structure to which each user collaboratively contributes.

As shown in FIG. 46, systems and methods of the invention provide a BIOmolecular Design Ecosystem ("BIODE"). Important functions included in the design ecosystem include model building, simulation, and visualization. Model building is provided by the system with integration and ease of use via a central interface. Inputs from different collaboration teams are integrated as input into the underlying model or simulation. Thus the simulation is integrated with the modeling interface. As inputs are given, a simulation can be run and inputs can be adjusted by the users as needed. The simulation can be provided for viewing as a visualization.

Use of systems and methods of the invention is illustrated by discussing an example simulation involving a chimeric antigen receptor. A chimeric antigen receptor (CAR) is an engineered receptor in which some arbitrary specificity is grafted to an immune effector cell. One potential use of a CAR involves removing T-cells from a cancer patient, modifying the T-cells to express receptors specific to the cancer (thus making them into CARs), and reintroducing those CARs into the patient. A likely and important question in developing a CAR is how (and by what mechanism) does varying the "spacer" improve the CAR potency?

With continued reference to FIG. 46, using systems and methods of the invention, users can model CAR targets, model CAR candidates, and perform a simulation for the discovery of optimal CAR leads.

Modeling CAR targets such as carcinoembryonic antigen (CEA) may start with a curated model that includes the target amino acid sequence. Available structural data is mapped against the sequence and structure is finalized. A simulation is planned according to the diagram in FIG. 42.

Modeling CAR candidates may include modeling components such as a single-chain variable fragment (scFV) targeting fragment, a spacer, and a transmembrane domain (TM). Similar to modeling the CAR targets, this can include starting with a curated model that includes the candidate amino acid sequences and structural mapping. To explore the effect of varying the spacer, spacer domains are varied and the best initial structures are finalized.

For in silico discovery of CAR leads, a simulation including all parts is planned. Following the diagram shown in FIG. 42, it is determined what combination of all-atom simulation and coarse-graining is appropriate. The entire model system is defined and at least one molecular dynamics modality is selected to govern the model. It is noted that model can refer to the model of the entire system and that within the system various components may each independent be provided by a model, e.g., a rigged model as defined below. With the models chosen, the selected molecular dynamics modality is implemented. In some embodiments, an environment is included. For example, a pre-set environment may be selected (e.g., from a menu). Parameters are set (e.g., simulation time and length scales). In the embodiment diagrammed in FIG. 46, the selected molecular dynamics modality includes performing a molecular dynamics simulation and a coarse-grained simulation. Molecular dynamics (MD) relates to a simulation of physical movements of atoms and molecules in the context of N-body simulation. The atoms and molecules are allowed to interact for a period of time, giving a view of the motion of the atoms. In the most common version, the trajectories of atoms and molecules are determined by numerically solving the Newton's equations of motion for a system of interacting particles, where forces between the particles and potential energy are defined by interatomic potentials or molecular mechanics force fields. In coarse-graining methods, instead of explicitly representing every atom of the system, one uses "pseudo-atoms" to represent groups of atoms. Examples for coarse graining (CG) methods include discontinuous molecular dynamics (CG-DMD) and Go-models. Coarse-graining is done sometimes taking larger pseudo-atoms. Such united atom approximations have been used in MD simulations of biological membranes. Whatever models and molecular dynamics modalities are included, the simulation provides for the in silico discovery of phenomena that will arise from the interaction of the modeled actors. Here, optimal CAR leads may be discovered. A team of users may thereby determine what spacer length or type optimizes the function of CAR potency. Systems of the invention operate to pull together the relevant elements for modeling and also build the model, the molecular dynamics modality, and any selected environment.

Figure 47:
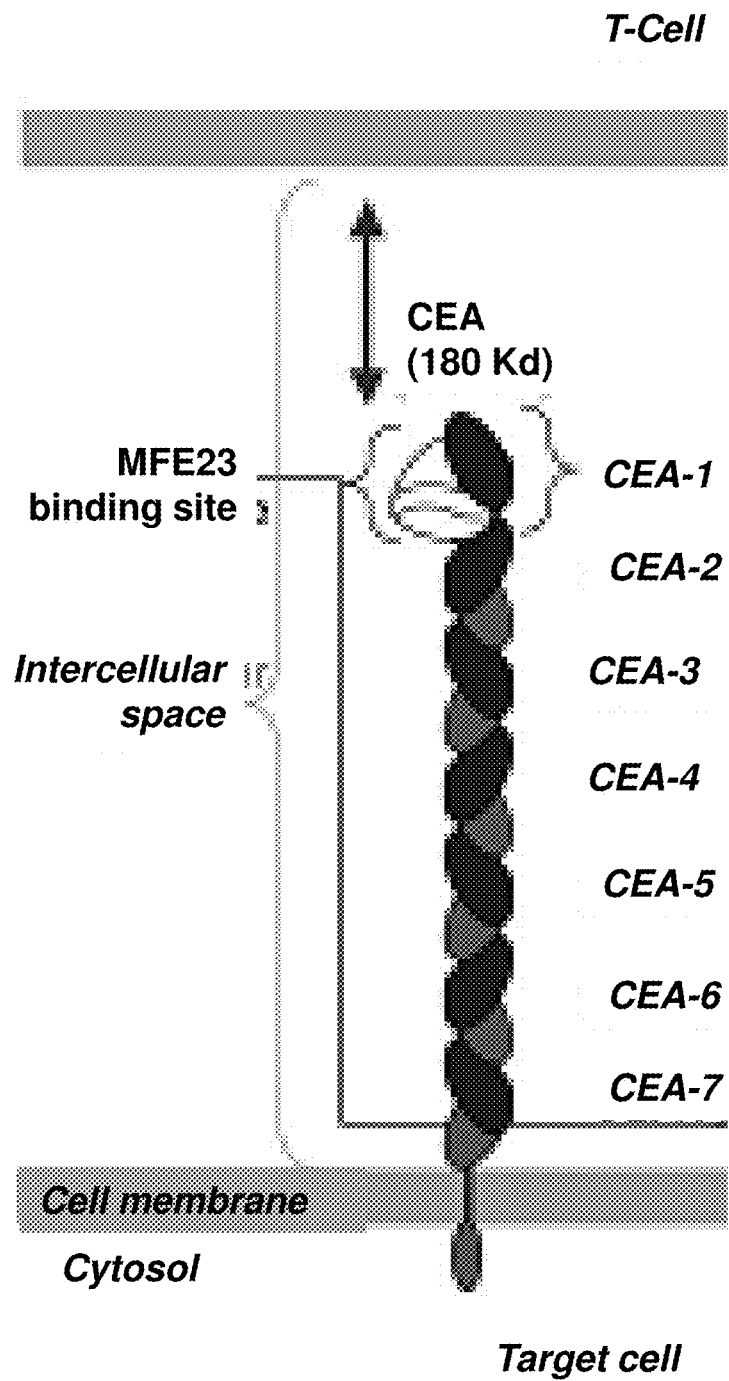
FIG. 47 illustrates components of a chimeric antigen receptor (CAR) molecule.

FIG. 47 illustrates components of a CAR molecule. The spacer is provided by CEA moieties that operate to disposes the MFE23 binding site with respect to the cell membrane, in the intercellular space. Systems of the invention can build this model by pulling relevant elements from an underlying curated model database, discussed in more detail below.

FIG. 48 illustrates a table breaking out components of the CAR molecule. Systems of the invention can build the table "behind the scenes" for using in building the model or could optionally make such a table available for user collaboration and interaction. For example, in some embodiments, a user could view such a table and edit components (e.g., could substitute a different protein databank (PDB) ID # for one or any of the CEA domains). In some embodiments, a plurality of users may contribute to the simulation by selecting one or more molecular dynamics modalities or digital models for inclusion in the simulation.

The preceding description shows systems and methods of the invention used for modeling of CAR molecules. As will be appreciated, systems and methods of the invention may be used to model or simulate any suitable molecule or natural entity. To give an exemplary, non-limiting list, natural phenomena that may be modeled include electron transport; proton-pumping by ATPase; structure and function of a reovirus sigma1 protein; a nucleic acid strand or strands; details of a cellular membrane; hydrogen bonding network in water or other environments; phospholipids in leaflets; types of transport; membrane-enclosed organelles; endo- and exo-cytosis; replication and the function of polymerases; transcription; translation; a MAP kinase cascade; interaction of small molecules with targets; others; or any combination thereof. Structures, agents, and phenomena that may be modeled using systems and methods of the invention include any suitable ones of those discussed in Whitford, 2005, Proteins: Structure and Funtion, Wiley 542 pages; Alberts and Johnson, 2014, Molecular Biology of the Cell, Garland Science, 1464 pages; Green and Sambrook, 2012, Molecular Cloning: a Laboratory Manual (Fourth Edition): Three-volume set, Cold Spring Harbor Laboratory Press, 2028 pages, the contents of each of which are incorporated by reference.

Based on rigging techniques and molecular dynamics modality choices by the user(s), the system may offer relevant simulation methods and do so in a way that alerts the user to the computational feasibility and requirements (i.e. if you are using this model and want to simulate in a water box, you should probably use a Brownian Dynamics simulation using the Martini coarse-grained water model).

Figure 49:
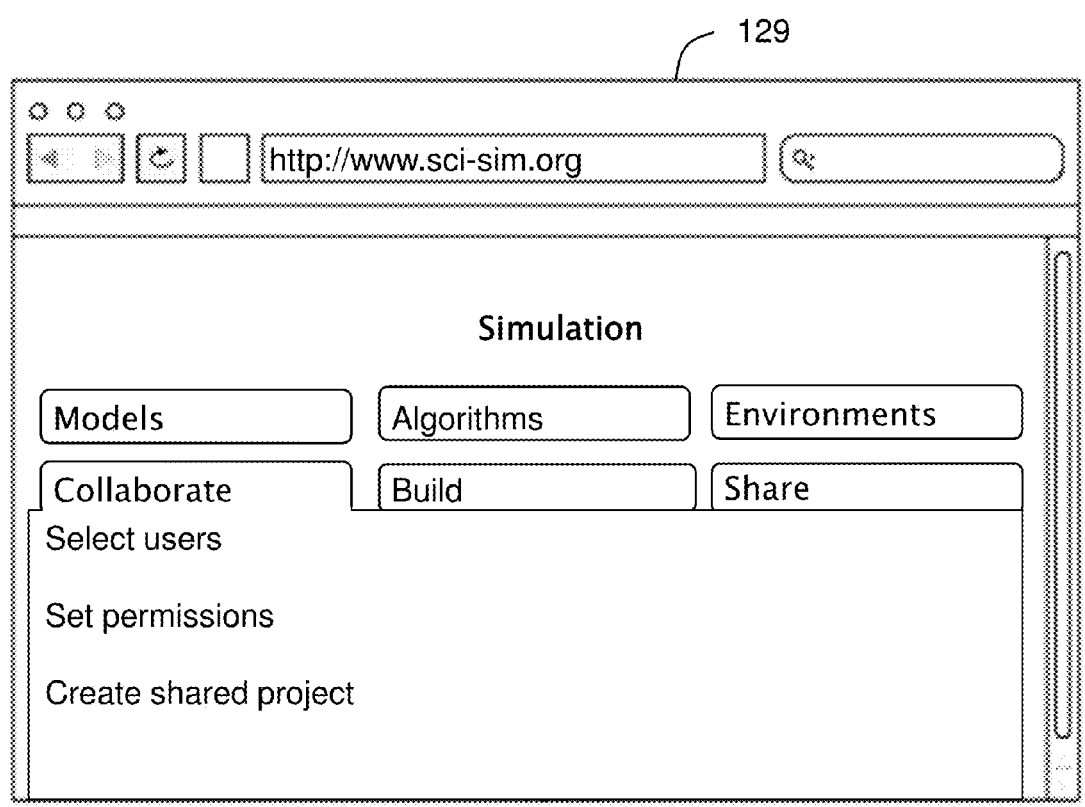
FIG. 49 shows a graphical interface by which a user may select a model, a molecular dynamics modality, or an environment and build the simulation.

FIG. 49 shows a graphical interface 129 by which a user may select a model, a molecular dynamics modality, or an environment and build the simulation. By providing an interface 129, systems of the invention can help users in the design of novel molecular entities by offering a function-based menu of molecular domains. For example, if a user is designing a cytoplasmic protein and needs to properly localize that protein to a membrane for the protein to function properly, the user could select a 'membrane recruitment' or 'membrane localization' tab of the GUI. For example, the GUI could include a molecular domains/parts menu and a number of relevant structures/rigs could be provided there, ready for modeling and appending to the rest of the molecule being designed (for example, like PH or C protein domains, or a farnesyl chemical group).

Figure 50:
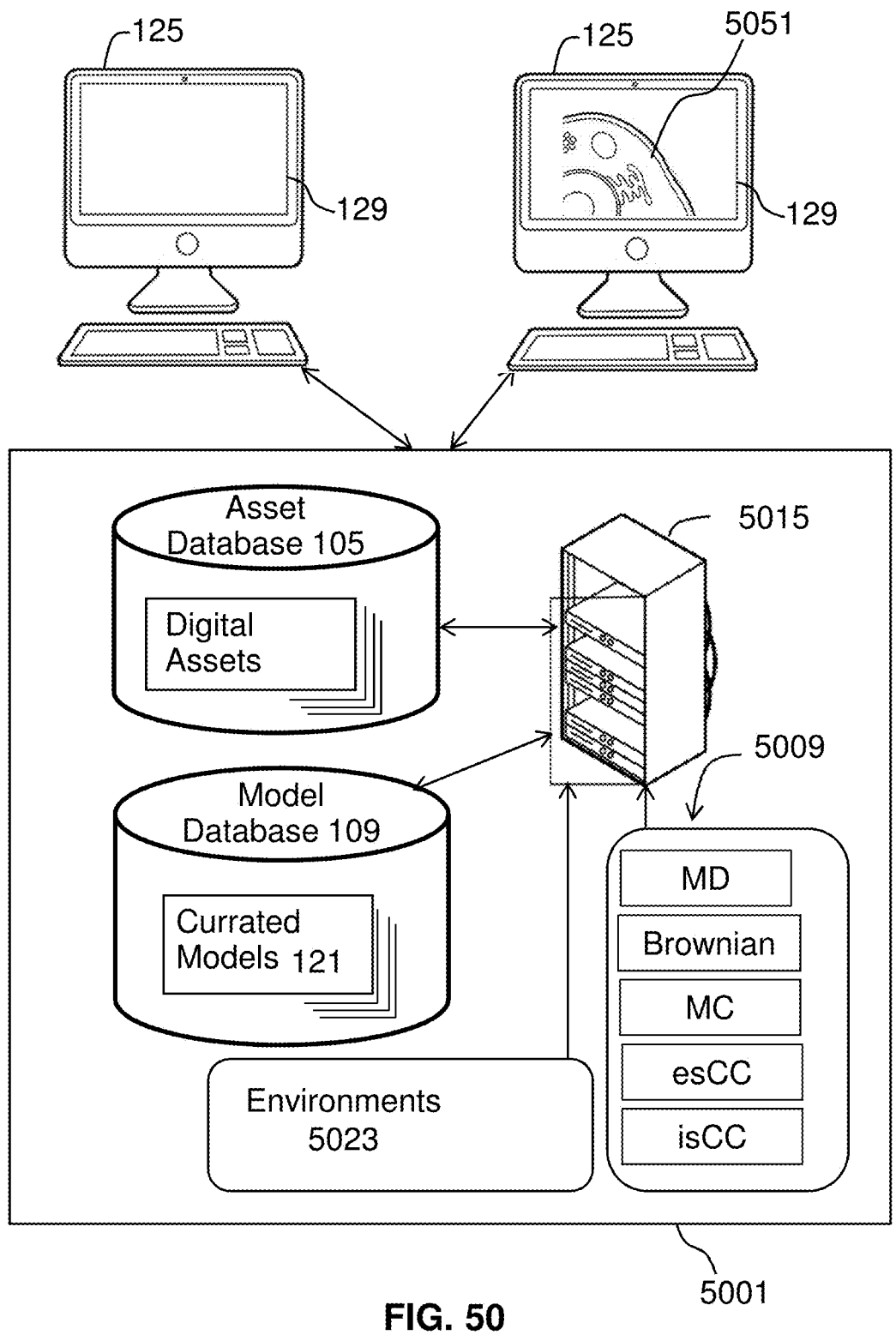
FIG. 50 diagrams a biomolecular design ecosystem (BIODE).

FIG. 50 diagrams a system that can be used to provide a biomolecular design ecosystem (BIODE) according to certain embodiments. The system preferably includes a server system 5001 operable to communicate with one or any number of user devices 125. A user device 125 can show a simulation 5051 through interface 129. The server system 5001 preferably includes a processor 5015 coupled to storage, which preferably includes a model database 109. The system may also include an asset database 105. The model database 109 includes curated, rigged models 121. The databases 109, 105 and the rigged models 121 are discussed in greater detail below. The server system 5001 additionally includes at least one user-selectable molecular dynamics modality 5009. In the depicted embodiments, the user selectable molecular dynamics modalities 5009 include Brownian, Monte Carlo simulation (MC), explicit-solvent coarse graining, implicit-solvent coarse graining, all-atom simulation, quantum mechanical simulations, hybrids, others, or combinations thereof. It is additionally noted that these need not be mutually-exclusive categories. Any one of the molecular dynamics modalities may overlap with, or be a subset of, any of the others, yet each may still be offered as an optional molecular dynamics modality for the user to select. The server system 5001 may include a module embodiment the planning simulation steps disclosed in FIG. 42 to aid a user in selecting the appropriate molecular dynamics modality. Once the appropriate molecular dynamics modality is selected, the processor 5015 may parameterize the model according to the workflow set out in FIG. 43 or in FIG. 44. Additionally, the server system 5001 may include a user selectable environment 5023 such as a cell membrane, cytosolic environment, or other.

The system 5001 preferably includes pre-modeled or pre-populated (but still customizable) environments 5023 within or against which a model can be simulated. This may be used to provide a 'panel' of controls against which to simulate novel molecular entities. For example, if a new protein therapeutic has been modeled, it can be examined for binding to a receptor on a surface chosen by user (such as a colon cancer cell plasma membrane). However, the new protein therapeutic could further be simulated against a panel of other common cellular (and inorganic surfaces such as those found on medical devices) to model and predict any adverse interactions. In other words, a researcher could probe such questions as "is this protein sticking to the surface of normal colon epithelium as well?" or "is this protein interacting with artificial surfaces like PLGA?"

Systems and methods of the invention may be used to integrate multiple steps of what is currently experienced as a discontinuous process of modeling, simulation, and visualization.

FIG. 51 illustrates a simulation 5051 being provided as a visualization through an interface 129 of an electronic device 125. The invention facilitates use by a new type of user (e.g., users who wouldn't otherwise know how to do this type of work) thereby democratizing the use of modeling and simulation in molecular/cell biology. Since the system includes built-in menus for parameterizing simulations, the invention overcomes prior-art problems in which knowing which simulations to run and how to parameterize them is not trivial to the uninitiated. Thus systems and methods of the invention provide the power and advantage of integration and presets at all stages—modeling, simulation and visualization.

It is noted that system 5001 may be operated to receive a new digital model 121 from the user and add the model 121 to database 109. System 5001 may then create a simulation using an optional environment model, the new digital model, and a user-selected molecular dynamics modality. The simulation may, for example, include a number of the digital models in a pathway animation depicting a cascade of events in which at least two depicted biological structures interact only indirectly. The selected molecular dynamics modality allows the user to control one or more of—for example—temperature, salinity, pH, osmolality, or viscosity. Using methods of the invention, a user may create the simulation and share a visual version of the simulation with a plurality of viewers.

The foregoing discussion of the biomolecular design ecosystem (BIODE) includes components such as a curated model database and rigged models discussed in greater details in the following.

Aspects and embodiments of the invention involve a curated model database that may be used for providing visualization products that visually convey at least a portion of a scientific concept. A visualization product may include a single digital asset or a plurality of digital assets. Exemplary digital assets include pictures, animations, interactives, simulations, games, and other media. Exemplary visualization products include, without limit, electronic textbooks, animated simulations of biological phenomena, educational games, and high quality illustrations. In certain embodiments, the visualization product provides a visual narrative of a scientific concept without the assistance of text to link together separate digital assets of the visualization product. In certain embodiments, the visualization product operates to convey a scientific concept to an audience without the use of any text. Visual assets are built of curated models, discussed in greater detail below. Additionally, the system offers embedded assessment, which evaluates the user's retention of concepts covered.

Figure 1:
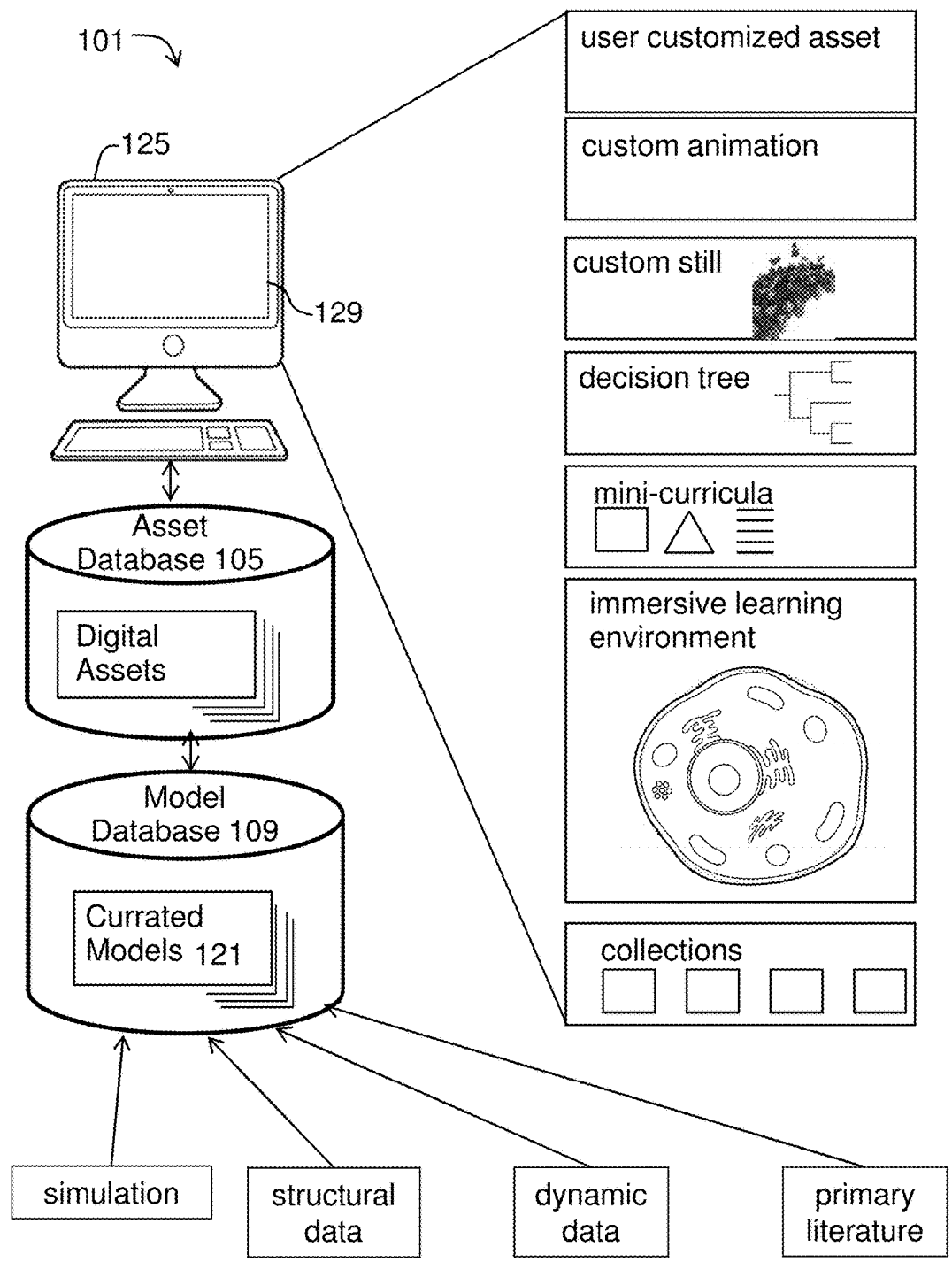
FIG. 1 shows an overall architecture of systems of the invention.

FIG. 1 generally illustrates an architecture of systems of the invention. Systems of the invention can be used to provide visual scientific content for example, as customized assets, animations, stills, interactive "decision-tree" visualizations, curricula, and immersive learning environments. The visualization product may be a single digital asset or a plurality of digital assets. The provided visual products may be described as curricula or animations, for example, but it can be understood that a plurality of digital assets is one general form of such a visual product. A visualization product may generally include a grouping of digital assets that explain a particular topic. One important type of visual product is a mini-curriculum. A mini-curriculum may refer to an organized group of digital assets supplemented with educator support materials, assessment materials, and other materials for use in the classroom or other educational context.

A visualization product that includes a plurality of digital assets may be made by drawing on an asset database 105. Digital assets within asset database 105 generally refer to an image, an animation, an interactive diagram, a mini-game, or such a piece of digital media. Generally, a digital asset will include one or more curated models from a curated model database 109. The present invention generally relates to curated model database 109.

Curated database 109 generally includes one or a plurality of rigged curated models 121. A curated model may generally be understood to refer to a 3D model of a molecule, organ, organisms, instrument or other that is constructed from multiple data sources (such as structural, dynamic and other sources) and rigged so as to be 'scene-ready' for production. A curated model may also include embedded within all the sources and techniques used in the modeling/rigging (and other curation) activities. Preferably, a curated model includes a multi-dimensional (e.g., 3D molecular) model that integrates scientific information (structural, dynamic, and other) that is 'ready to use' for visualization. Curated models 121 may be built de novo or by sourcing scientific data from a suitable source such as, for example, a simulation, structural data (e.g., from protein data bank), dynamic data, or the scientific literature. Curation includes selection or building of a model and rigging or simulating the model to produce a rigged or posed model 121. Rigging or simulating a model can make a model 'ready to use' for visualization. It is noted that a user for the curated model database may be a scientific animator (when models from the database are imported into a 3D app like Maya and then used to create a visualization, static or dynamic). One novel feature of a curated models database includes the way in which the models are accompanied by data which may specify (i) what pieces of a model were derived from what kind of data (X-ray vs. NMR vs. cryo-EM vs. modeled de novo using hypothetical data vs. others); (ii) the range of motion for a model as captured by one or multiple rigs (remembering that any given protein or other macromolecular model can have multiple rigs associated with it); (iii)

domains/regions of the model associated with certain known biochemical behaviors; or others. For example, the model for a transmembrane protein may include—besides the structural data itself such as the shape(s) of the protein and its known range of motion—the transmembrane domain being flagged with metadata such that the protein embeds itself properly into a lipid bilayer when combined with a model or simulation of a lipid bilayer membrane. Another kind of data includes sites of post-translational modifications such as phosphorylation, glycosylation, or others.

Components of system 101 may be interacted with by a variety of different users. Non-limiting examples of users with respect to FIG. 1 are given. The simulations, structural and dynamic data and primary literature that feed into model database 109 may be used by scientists or system administrators to make curated models 121. An animator may use model database 109 and the curated models 121 to create digital assets that populate asset database 105. A teacher, publisher, or content provider may use the digital assets to create custom animations, stills, mini-curricula, collections, and other media. End-users such as students, scientists, or the consumer public may use the custom animations, stills, mini-curricula, collections, and other media. It will be appreciated that any of the users or others may use any element of system 101.

Figure 2:
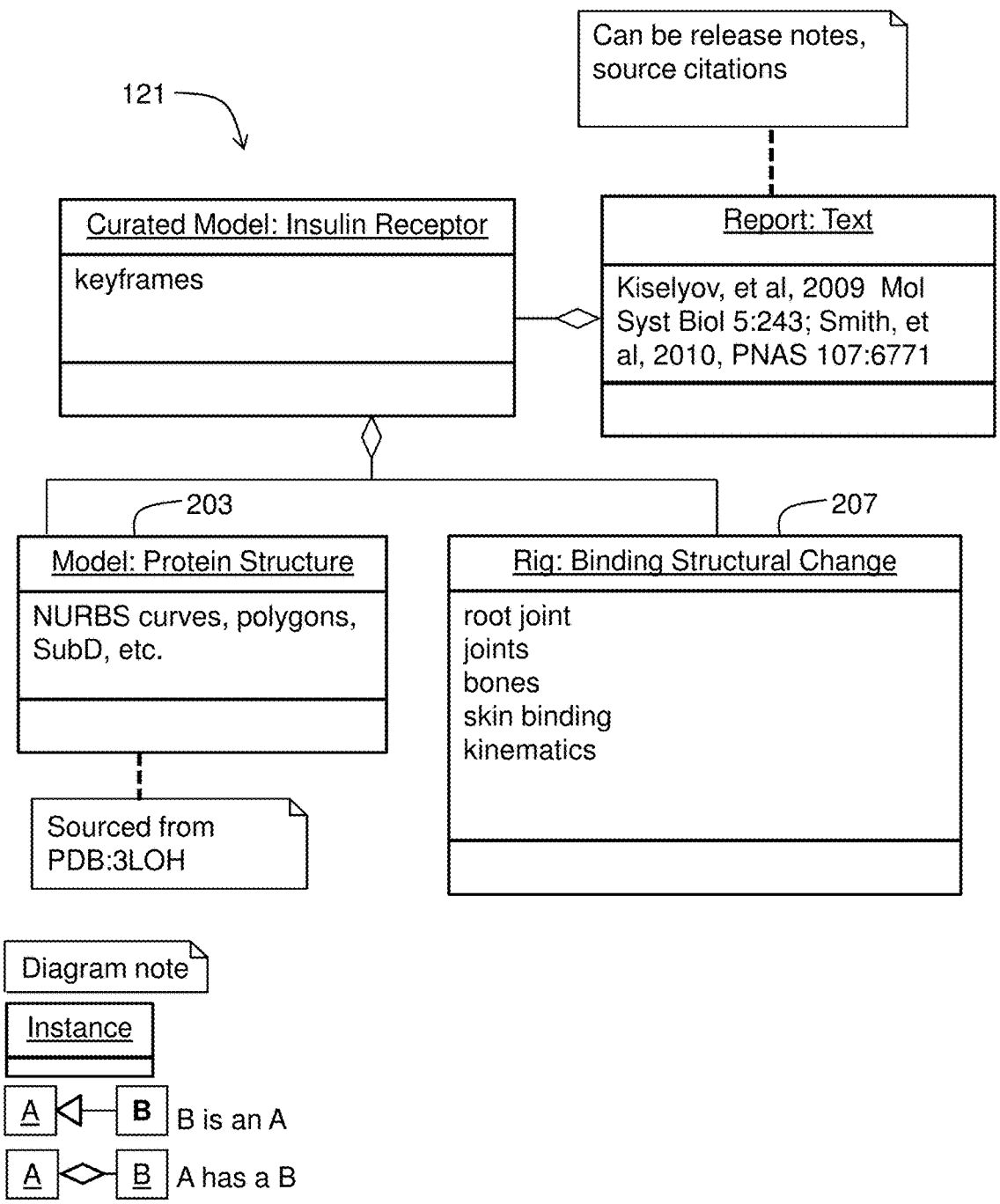
FIG. 2 represents a rigged model.

FIG. 2 gives an exemplary structure of a rigged model 121. A rigged model 121 will generally include a model 203 and a rig 207. A rig is known in the art of 3D animation and generally refers to a 3D construct that provides an organized system of deformers, expressions, and controls applied to a model and that specifies and drives the motion of the model so that it can be effectively animated or simulated. A rig may include joints, bones, particles, springs, or other concepts. Rig has been used in the animation arts to include a deformation engine that specifies how movement of a model should translate into animation of a depicted entity based on the model. A rig provides software and data used to deform or transform a neutral pose of a model into a specific active pose variations. By having animation software manipulate a rig incorporated to a model, animated or simulated movement of the model is achieved. Rigging may sometimes be referred to as character setup or animation setup. A detailed discussion of creating rigs may be found in sources such as O'Hailey, 2013, Rig it Right! Maya Animation and Rigging Concepts, Focal Press, Burlington Mass., 280 pages; Palamar and Keller, 2011, Mastering Autodesk Maya 2012, Wiley Publishing, 950 pages (esp. chapters 5 and 7); and Sharpe, et al., 2008, In silico: 3D Animation and Simulation of Cell Biology with Maya and MEL, Elsevier Morgan Kaufman, Burlington, Mass. (622 pages), the contents of each of which are incorporated by reference. Rigging and rigs are discussed in U.S. Pat. No. 8,253,745 to Hahn; U.S. Pat. No. 7,782,324 to Goldfarb; U.S. Pub. 2013/0235046 to Lanciault; U.S. Pub. 2011/0098113 to Lanciault; U.S. Pub. 2009/0295793 to Taylor; U.S. Pub. 2009/0091563 to Viz; and U.S. Pub. 2006/0109274 to Alvarez, the contents of each of which are incorporated by reference. Rigging is discussed in greater detail below (e.g., with respect to FIGS. 7-10).

Model 203 includes data representing a structure, often in the form of a geometry file or particle cloud/object. Any suitable model 203 may be included in a rigged model 121. The model may represent a single molecule, an assembly of molecules, or a structure or systems. Examples of things that may be represented by a model include a protein, a nucleotide, a polymerase bound to a strand of DNA, a solar system, a skeleton, a machine, or others. In some embodiments, model 203 is a geometry or particle object file(s) of a format suitable for creation, viewing, and manipulation within modeling or animation software such as, for example, Autodesk Maya. Any suitable animation software may be used. Exemplary animation software products include those provided by Cinema4D Studio by Maxon Computer Inc. (Newbury Park, Calif.), Blender supported by the Stichting Blender Foundation (Amsterdam, the Netherlands), and 3DS Max 2014 by Autodesk, Inc. (San Rafael, Calif.).

Any suitable method may be used to obtain a geometry or particle file. For example, the information necessary to create geometry or particle files can be imported from sources such as structure database, created de novo within a modeling environment, or built of raw data obtained from an experiment or assay. The structures to be represented by geometry or particle files may be predicted by computational algorithms, or may represent real structures determined by spectroscopic methods such as X-ray crystallography or nuclear magnetic resonance (NMR).

One exemplary approach to obtaining geometry files includes the use of a molecular graphics application such as Chimera or PyMOL. Other suitable applications may include Astex Viewer, UGENE, DS Visualizer, Swiss PDB Viewer, Interchem, VMD, RasMol, Jmol, Python Molecular Viewer, Coot, MDL Chime, MolSoft Viewer, and other such products. Such a program can be used to open raw structural data, such as a set of coordinates from a protein databank (PDB) file and to export the structural data in a format suitable for use in a modeling environment. Raw structural data can also be used to generate a particle file for use in a modeling, animation or simulation environment.

A PDB file embodies a format for representing actual 3D structures of biological molecules. The PDB format is widely accepted as a standard in the biosciences. The molecules may include protein, nucleic acid (RNA or DNA), lipids, carbohydrates, other molecules or macromolecules, a complex of several proteins, a complex of protein with nucleic acid, or any combination thereof including but not limited to these in a complex with small molecule ligands such as drugs, cofactors, metal ions, etc. The 3D structure of the macromolecule is usually determined by X-ray crystallography, but other spectroscopic methods, such as NMR, or microscopic methods, such as cryoEM, are occasionally employed. The Protein Data Bank currently archives close to 100,000 PDB files of molecular structures, which are freely available to the public. See, e.g., Berman, et al., 2000, The Protein Data Bank, Nucl Acids Res 28(1):235-242.

The PDB format includes ASCII text giving XYZ coordinates for atom locations, as well as data on atom-to-atom bond connections. Other information typically included are protein amino acid sequence and secondary structure, crystallographic space group, and general comments on the biological role of the protein. Molecular graphics applications such as Chimera or PyMOL by design readily import PDB files.

The structural data can be exported from the molecular graphics application (e.g., Chimera, PyMOL) to generate geometry files. These may be exported as Virtual Reality Modeling Language (VRML) and then converted to OBJ format (a common data format for 3D data) before being imported into a modeling program such as Maya. Additionally or alternatively, scripts can be used to prepare a geometry file from a set of coordinates using, for example, Maya Embedded Language (MEL). The method to use may relate to what will be done with the geometry once inside Maya. In certain embodiments, large PDB datasets are brought into Maya as geometry files using the multi-scale model feature of Chimera.

In some embodiments, structural data can be obtained for modeling using products like the Molecular Maya Toolkit, sometimes referred to as mMaya or Molecular Maya, the embedded Python Molecular Viewer, sometimes referred to as ePMV or BioBlender. Molecular Maya is a free software toolkit that extends the capabilities of Maya by allowing users to import, build, and animate molecular structures. Molecular Maya includes the functionality to open PDB- and other formatted files. Molecular Maya works with Maya 2011, 2012, 2013, and 2014 and adds a molecule-shaped icon to the Maya environment. Molecular Maya includes (or adds to Maya) UI elements for opening PDB files. Molecular Maya can import the text-formatted native PDB file.

Typically Maya, or Molecular Maya, will present an empty scene upon opening. Once a PDB file is imported, it can be viewed as atoms. However, Molecular Maya can transform it into a geometric or particle structure, with options for selecting levels of resolution. Once imported, the geometry and/or particle file provides the model 203 for a rigged model 121. Molecular Maya allows a curator to import a range of structural pieces which may then be assembled by hand (or simulated) to create model 203 or a model 121.

Figure 3:
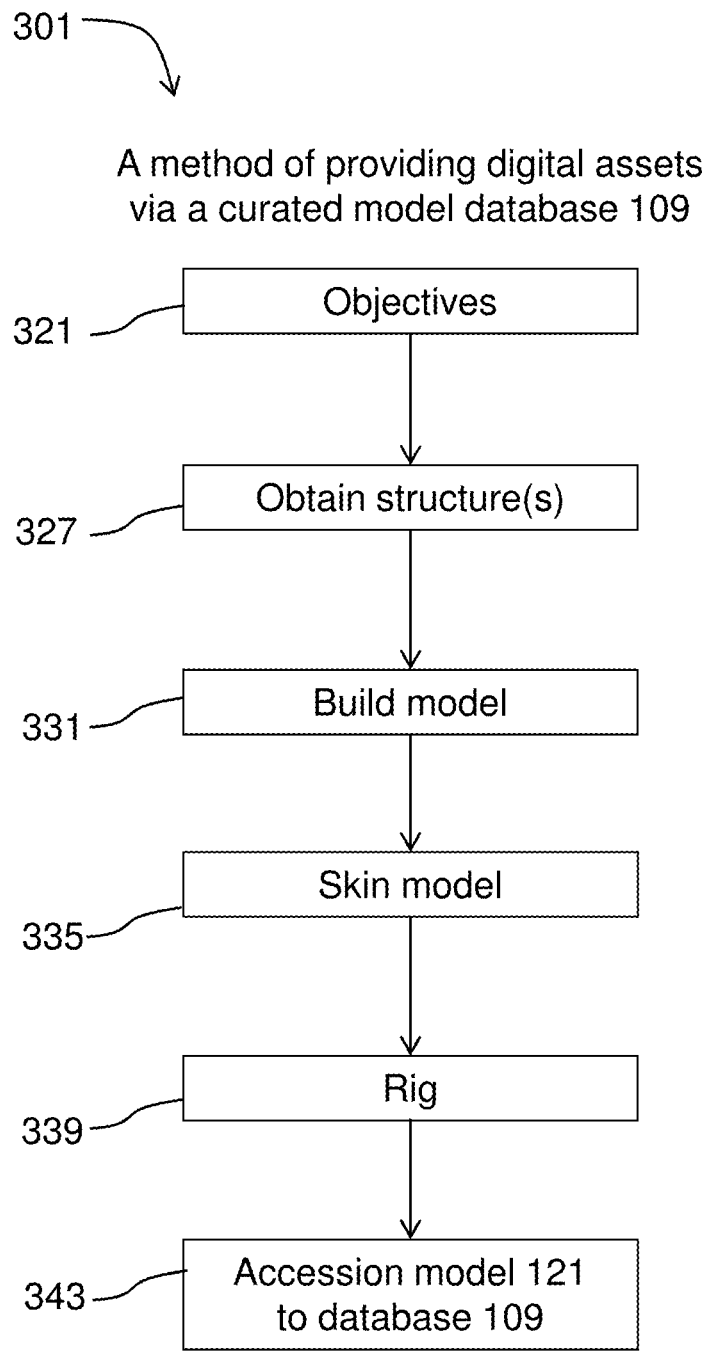
FIG. 3 diagrams a method for providing a curated model database.

FIG. 3 diagrams a method 301 for providing a curated model. Method 301 operates preferably within the context of determining an objective 321. For example, it may be the objective to provide a curated model of biological macromolecules. A computer system is used to obtain 327 structure data. Structure data can be obtained from a scientific assay such as x-ray crystallography, either directly or once published (e.g., from PDB files) or a combination of these. The structure is used to build 331 a model 203, typically a geometry or particle file. The model may optionally be surfaced 335 with textures or shaders.

The geometry is rigged 339 with a rig that defines animation dynamics for the structure such that a range of motion for the rigged model is defined (i.e., for the depiction of the underlying structure in a downstream animation). Each curated model is accessioned 343 to curated model database 109. Access to these rigged, digital models 121 is then provided for use in illustrating scientific concepts. Access may be provided through, for example, asset database 105, in which one or more rigged model 121 may be bundled into digital assets.

A curated model database 109 may include sets of models that are tailored to illustrate biological systems or concepts. For example, in some embodiments, a curated model database 109 includes models to represent all of the components of a cell. Thus, in some embodiments, the database includes entries for each of the components of a cell such as, for example, all of the structures that make up the membrane, cytoplasm, and nucleic acids, as well as a variety of proteins, lipids, and carbohydrates, in all cells. Database 109 may be further tailored to provide curated models 121 for representing specific cell types (e.g., eukaryotic or bacterial). A eukaryotic cell database (e.g., animal, plant, or fungi) may include structures for the nucleus, chromosomes, ribosomes, microtubules, microfilaments, centrioles, cilia, flagella, and other structures. An animal-based database 109 may include organelles such as the nucleus, the nucleolus (within the nucleus), rough and smooth endoplasmic reticulum, Golgi apparatus, mitochondria, vesicles, lysosomes, centrosomes, centrioles and other such structures. A plant cell database 109 may include entries for the cellulose cell wall, central vacuole, and chloroplasts, as well as organelles. Fungal cells my include chitinous cell walls. A bacterial cell curated model database 109 may include models representing the cell wall (e.g., thick peptidoglycan for Gram+ bacteria), plasma membrane, extracellular structures such as fimbriae and pili, S-layers, glycocalyx, and flagella. Intracellular bacterial components include the bacterial chromosome and plasmids ribosomes and other multi-protein complexes, intracellular membranes, cytoskeleton, as well as nutrient storage structures such as inclusions, vacuoles, or other micro-compartments. Archaea cells may have a lipid monolayer membrane.

One of skill in the art will recognize that digital assets/modules database 105 and curated model database 109 may be accessed via interaction through a computer system. Using a computer system, a 3D modeling/animation package like Maya, SoftImage, 3DStudioMax, modo etc., may be employed to perform methods such as method 301 to produce a model, which may be deposited into the curated model database 109). Any suitable computer system may be used.

Figure 4:
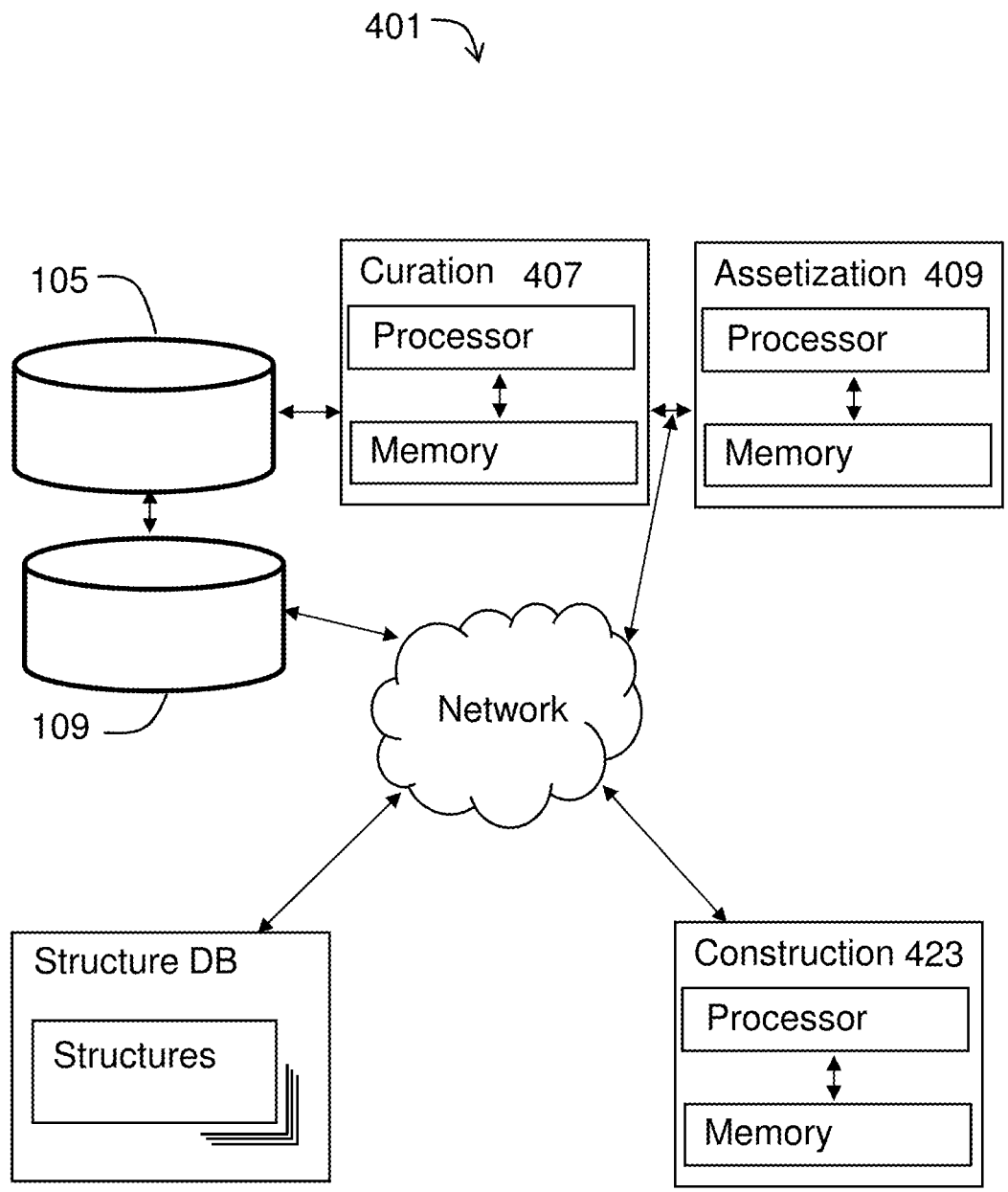
FIG. 4 illustrates components of a computer system of the invention.

FIG. 4 illustrates components of a computer system 401 that may be included in systems of the invention. Generally, asset database 105 operates with the ability to connect to and pull from curated model database 109. A curation computer device 407 is used to create curated models and populate model database 109. Computer device 409 is used to build digital assets that include the rigged models 121. One of skill in the art will recognize that curation computer device 407 and computer device 409 are being described in terms of their roles. These roles can each separately be performed by using one or any number of different computers and can even both be performed through the use of a single computer. A computer generally refers to a device that includes a processor coupled to a non-transitory memory and an input output device. Computers of system 401 may communicate with one other via a network—broadly referring to the hardware used in transferring signals between computers. Network 401 may be taken to include internet hardware such as telephone lines, cell towers, local switches and routers (e.g., LINKSYS products by Cisco Systems, Inc. (San Jose, Calif.), Ethernet cables, Wi-Fi cards, network interface cards, and other such device. Network 401 may be understood as providing the ability to obtain structures from a structure database such as, for example, protein databank. As will be discussed in greater detail below, system 401 provides a construction computer device 423 for constructing a visual product (which device may be provided by one or more separate, dedicated devices or may be provided by the same one or more computer device providing either or both of curation computer device 407 and computer device 409). It will be appreciated that in some embodiments, curation computer device 407 and computer device 409 are employed in a production environment, wherein skilled scientist-animators rig models and build assets. In some embodiments, curation method 301, as depicted in FIG. 3, is performed using curation computer device 407. In general, the output of curation method 301 will include at least one rigged model 121.

In certain embodiments, construction computer device 423 refers to the personal computer (e.g., tablet, laptop, or desktop) used by a consumer to log into system 401 and order, design, or put together a visualization project to communicate a scientific idea. A visualization product may include one or more of a picture, an animation, a simulation, a game, an interactive model, or other such media. Components of animations, simulations, and other interactive media can operate based on animation principles. Models such as PDB-based structures can be rigged and animated using animation and modeling software tools.

Figure 5:
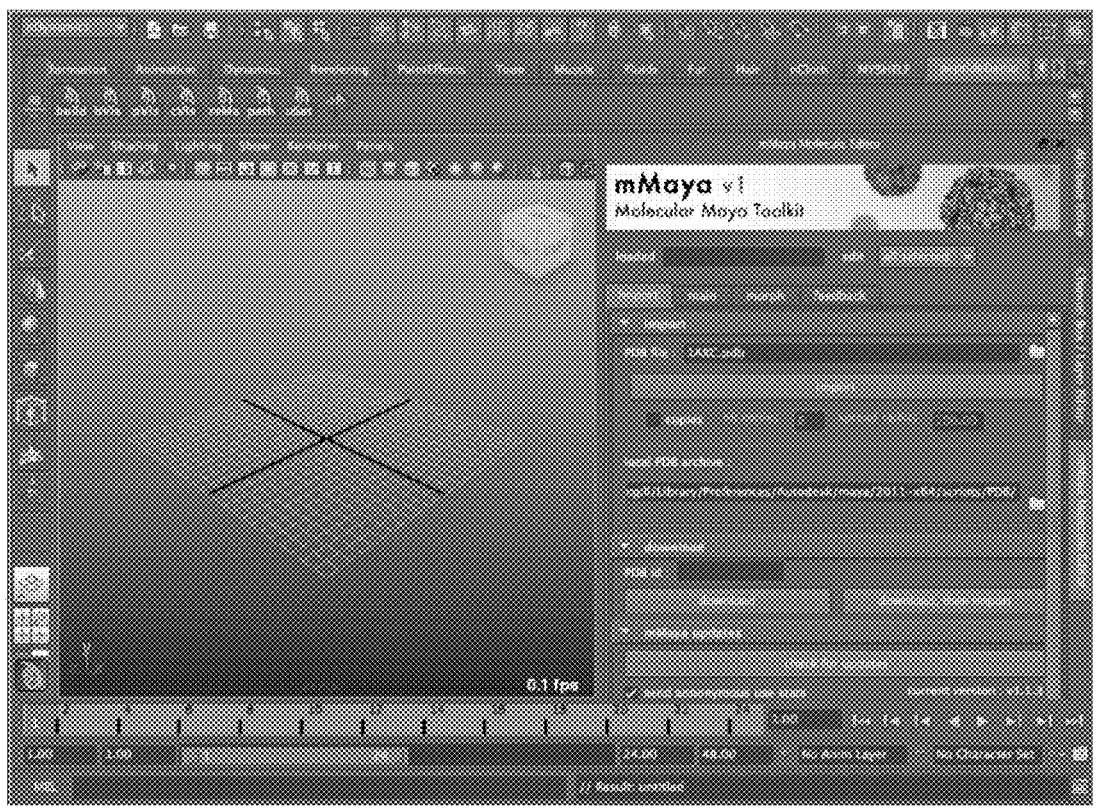
FIG. 5 shows a modeling and animation tool as presented by the system.

FIG. 5 shows a modeling and animation tool as presented by system 401, i.e., a screenshot from a modeling and animation environment (e.g., as implemented on curation computer device 407). In some embodiments, the animation environment is provided by Molecular Maya (e.g., mMaya v 1.0 or future versions) and is used to rig a model such as may be obtained from a PDB file. System 401 can be used to create models, rig models, simulate models and create visual products such as animations that use those models.

Productions of very large-scale and complex visual depictions of biological systems are provided for by the separation and specialization of tasks afforded by modeling and animation environments such as Maya. For example, while a model—geometry or particle file—can be rigged, and the rig will typically include a reference to the geometry file, it will be appreciated that a rig can be changed to reference a different model. That is, one of the valuable properties of a rig is that it can be used with one geometry then another. For example, a modeler could make a "quick and dirty" geometry and hand it off to the rigger. The rigger could build a rig using that geometry while the modeler works on a more detailed geometry. However, as used within an animation, a rig will generally reference one model (i.e., the geometry that it rigs).

In some embodiments, system 401 includes Maya and models 203 are represented through the use of Maya's dependency graph. Maya is one example of an environment useful here, but there are others and the models that live in the curated model database can be created in 3D software environments other than Maya. Geometric objects, as well as data processing units such as transforms and shaders, are encapsulated as nodes. These nodes are connected through their attributes into a network that is known as the dependency graph. Each node is dependent upon another, which includes that as the dependency graph is dynamically updated, changes to any node automatically propagate through the graph to all other nodes which are dependent on it. This dynamic updating of the dependency graph is the core of the real-time graphics engine of Maya. A Maya scene is a system of interconnected nodes that are packets of data. The data within a node tells Maya what exists in a scene. Maya contains special node types (e.g., directed acyclic graph nodes) for certain things. Generally, when working on objects in Maya's viewport, those objects, such as cubes, spheres, and planes of surface geometry, are DAG nodes. A DAG node is model of two types of nodes, transform and shape nodes. A shape nodes describes what an object is and a transform node describes where it is. Thus it will be appreciated that a model includes all of the structures and their locations needed to represent the intended object, and those structures can be, for example, nodes within a Maya dependency graph.

Figure 6:
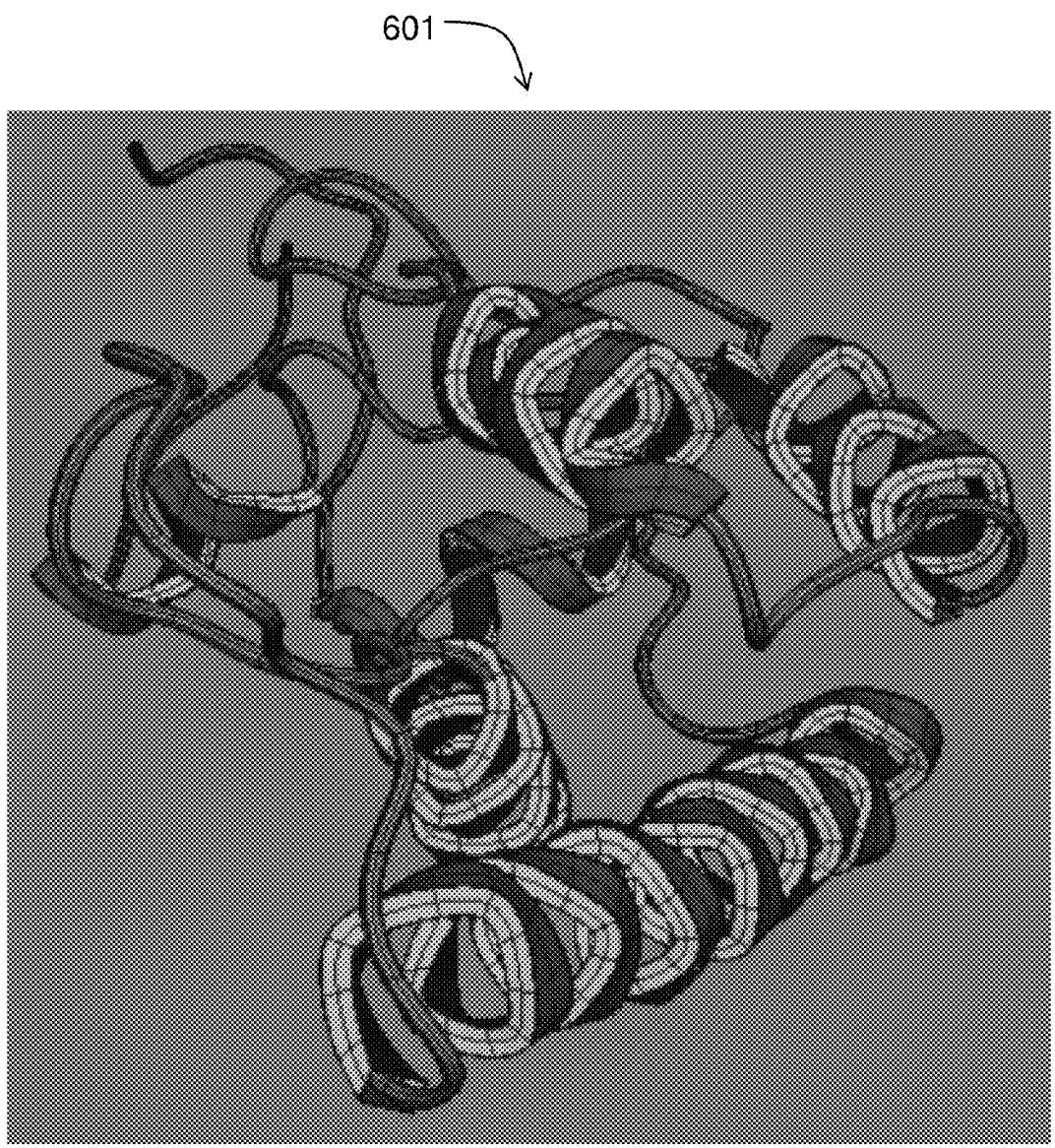
FIG. 6 shows a protein model according to embodiments of the invention.

FIG. 6 shows a protein model 601 according to certain embodiments. If created in Maya or Molecular Maya, each polygon or non-uniform rotation b-spline (NURBS) curve of model 601 may be included as a node in the dependency graph. A complex geometry such as model 601 can be obtained by building within Maya or by import. For example, as discussed above, PDB files can be imported directly into Molecular Maya or by exporting VMRL from a molecular viewer. Additionally, complex geometries can be built within Maya using tools for 3D modeling.

Generally, a 3D model includes the geometry provided by surface. Maya supports three surface types: polygons, NURBS, and subdivisions. A polygon geometry includes a surface made up of polygon faces with shared edges and vertices. Polygonal surfaces can be split, removed, extruded, and smoothed. One of skill in the art of 3D modeling will recognize the great breadth of geometries that can be created with polygon surface. So too with NURBS geometries, which basically comprises surfaces created over a network of NURBS curves and converted to triangles when rendered. Subdivision surfaces, or subDs, are a way of adding detail to particular sections of a mesh by subdividing the existing surfaces. Instead of geometry, a 3D model may also be created with particles. This particle object can either remain particles or be used, in turn, to generate surface geometry such as an isosurface.

Figure 7:
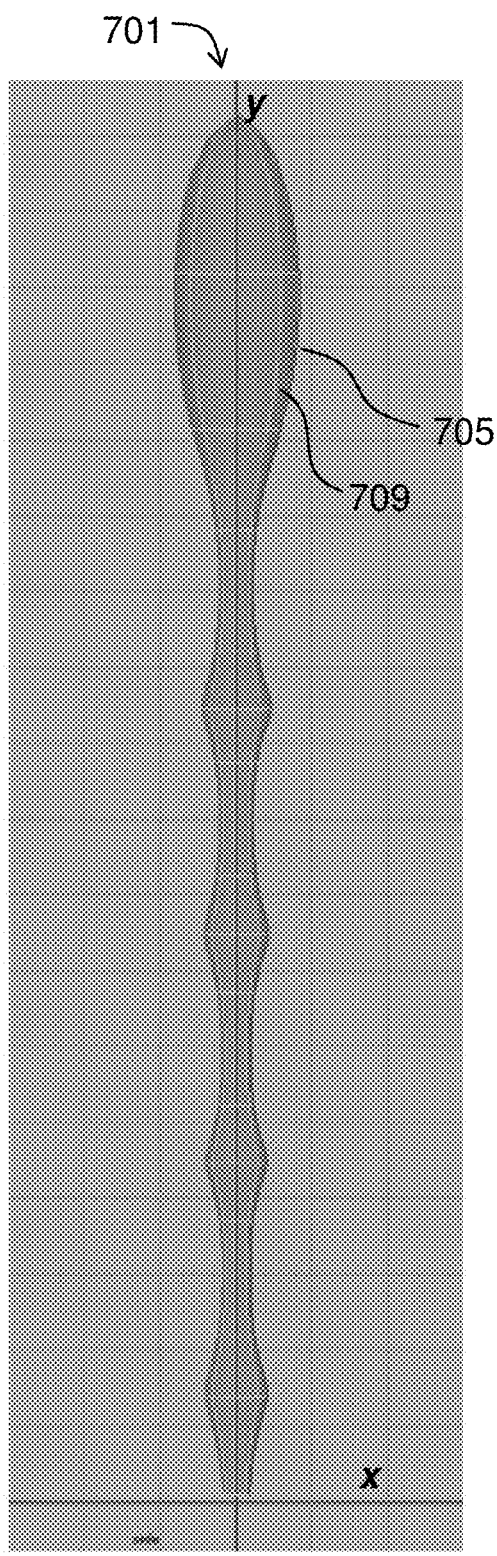
FIG. 7 depicts a model representing a reovirus sigma1 protein.

FIG. 7 depicts a model 701 representing a reovirus sigma1 protein. Reovirus attaches to cellular receptors with the sigma1 protein, a fiber-like molecule protruding from the 12 vertices of the icosahedral virion. The receptor-binding fragment of sigma1 includes an elongated trimer with two domains: a compact head with a beta-barrel fold and a fibrous tail containing a triple beta-spiral. See Chappell, et al., 2002, Crystal structure of reovirus attachment protein sigma1 reveals evolutionary relationship to adenovirus fiber, EMBO J 21:1-11. Model 701 can be made by any suitable method such as, for example, approximating the outer surface of the molecule by drawing a NURBS curve and rotating it around the Y axis. In some embodiments, model 701 is made by importing data from a PDB file, specifically from PDB #1KKE. A PDB file can be imported directly into a program such as molecular Maya or a PDB file can be opened in a viewer (e.g., PyMOL) and exported as VRML which can then be opened by a program such as Maya or Molecular Maya to arrive at model 701 as shown in FIG. 7.

Model 701 represents one subunit of the sigma1 trimer and the beta-barrel head and fibrous tail are visible. That structure is represented here as a plurality of NURBS curves 705 defining a surface 709. This model 701 provides the geometry file that can be rigged for animation.

Figure 8:
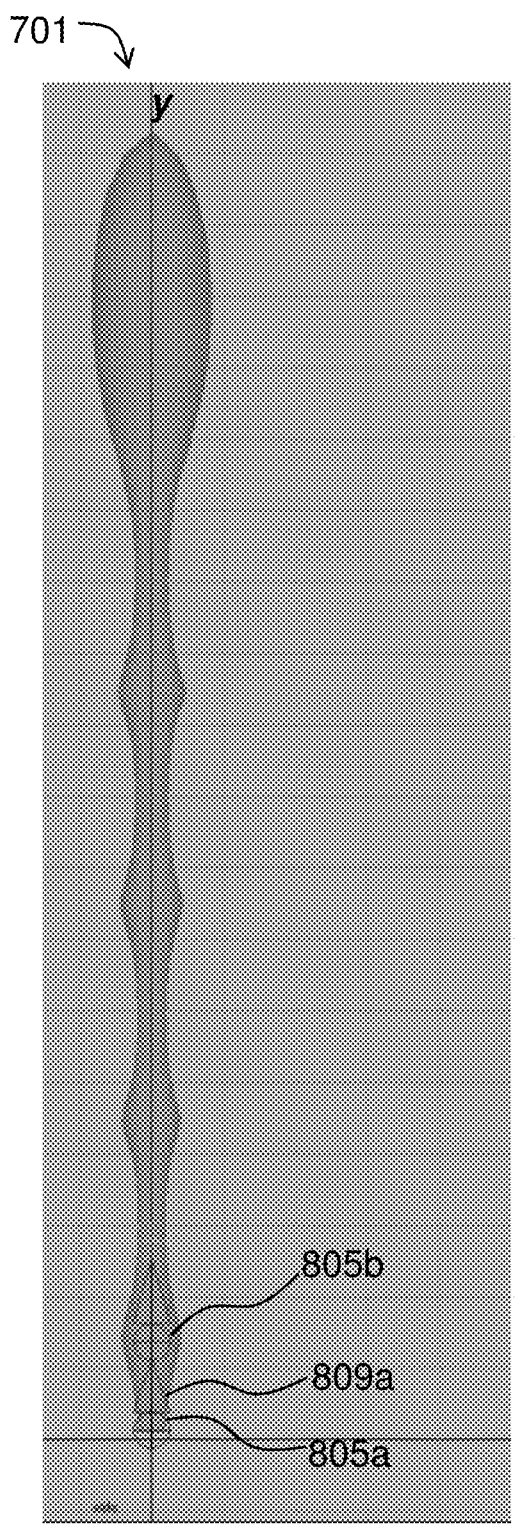
FIG. 8 illustrates rigging a model.

FIG. 8 illustrates rigging model 701. Rigging includes the creation of organized systems of deformers, expressions, and controls applied to an object so that it can be animated well. A rig will allow an animator to create an animation without himself doing the rigging. That is, rigging is uncoupled from animation or simulation, allowing different tasks to be performed by specialists. As one of skill in the art will recognize, rigging is a continuously evolving practice. Typically, rigging will include starting with a geometry or particle object such as model 701, building a skeleton, creating the rig and weighting the geometry.

The skeleton is built by adding joints 805 to model 701. Rigging can include using Maya's Joint Tool from the Animation menu to create a skeleton when, for example, beginning work on a geometric structure. For example, if protein is modeled as a mesh, and a scientist wishes to illustrate conformational changes upon binding, the Joint Tool can be used to introduce joints into the mesh, which will be connected by bones (here, bones, joints, and skin refer to the control tools known in the animation arts). Joints are oriented in that their axis (e.g., defining the pivot) is oriented appropriately. Typically, orienting is done before the geometry is bound to the skeleton. In Maya, a joint will be represented by a wireframe sphere. Joints are connected by bones 809, which are represented by wireframe pyramids with the point pointing towards the child when joints 805 are parented together. Generally, a bone 809 will extend between a parent and a child joint 805. A skeleton can be assembled to correspond substantially to a skeleton as known in zoology, however a skeleton more generally represents a structure for animation. In fact, a strength of the animation methods described herein is that the skeleton need not match the natural skeleton. A skeleton may be bound to a skin so that, when bones and joints of a skeleton move (e.g., according to inputs and a rig), the skin presents a visible surface that deforms (e.g., according to how it is bound to the skeleton). As seen in FIG. 8, first joint 805a is created at the end of the fibrous tail of the monomer. When second joint 805b is created, bone 809a is created extending from first joint 805a to second joint 805b. This process is continued for all of model 701.

Figure 9:
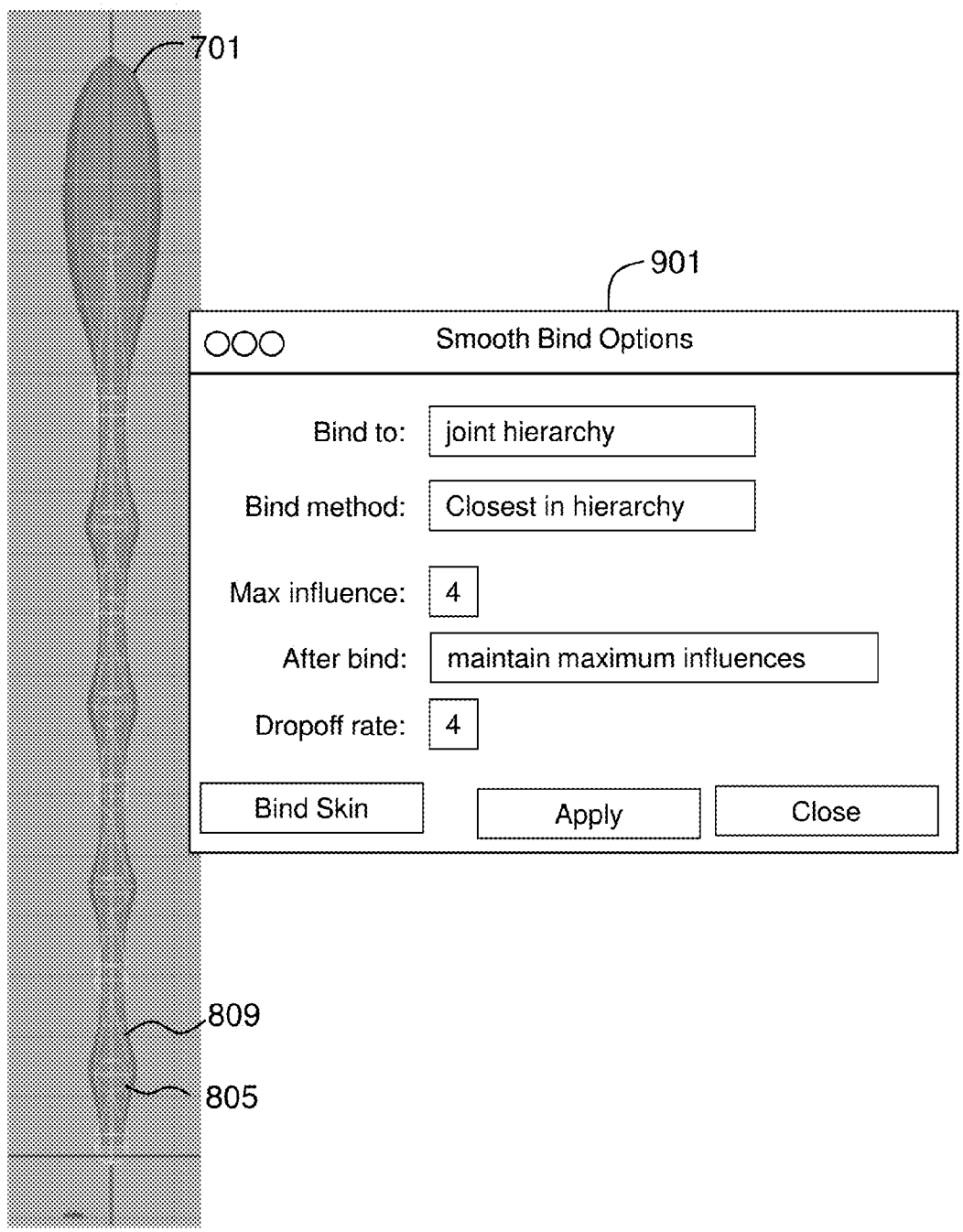
FIG. 9 shows a rigged model.

FIG. 9 shows model 701 with a set of joints 805 connected by bones 809 and a dialog box 901 for binding model 701. FIG. 9 illustrates skinning the geometry of model 701. Skinning geometry is the process in which geometry is bound to joints so that, as the joints are rotated or translated, the geometry is deformed. The terms skinning and binding are generally interchangeable. Any type of binding by may be used such as, for example, smooth binding, interactive skin binding, and rigid binding. When geometry is smooth bound, each vertex of the geometry receives a weighted influence from the joints 805. Interactive weighting allows the rigger to set weights by entering them. Typically, the skeleton is bound to the geometry with the skeleton in the bind pose.

Once geometry has been skinned to a skeleton of joints, a system of controls is created to make animating the joints as simple as possible. Controls can be created from locators or curves or any other node that can be selected in the viewport. Other types of deformers may be used besides joint deformers and may include influence objects, lattice deformers, Maya Muscle, and other tools. Using bones and joints created during rigging, parts of a model can be moved with scientific accuracy.

Figure 10:
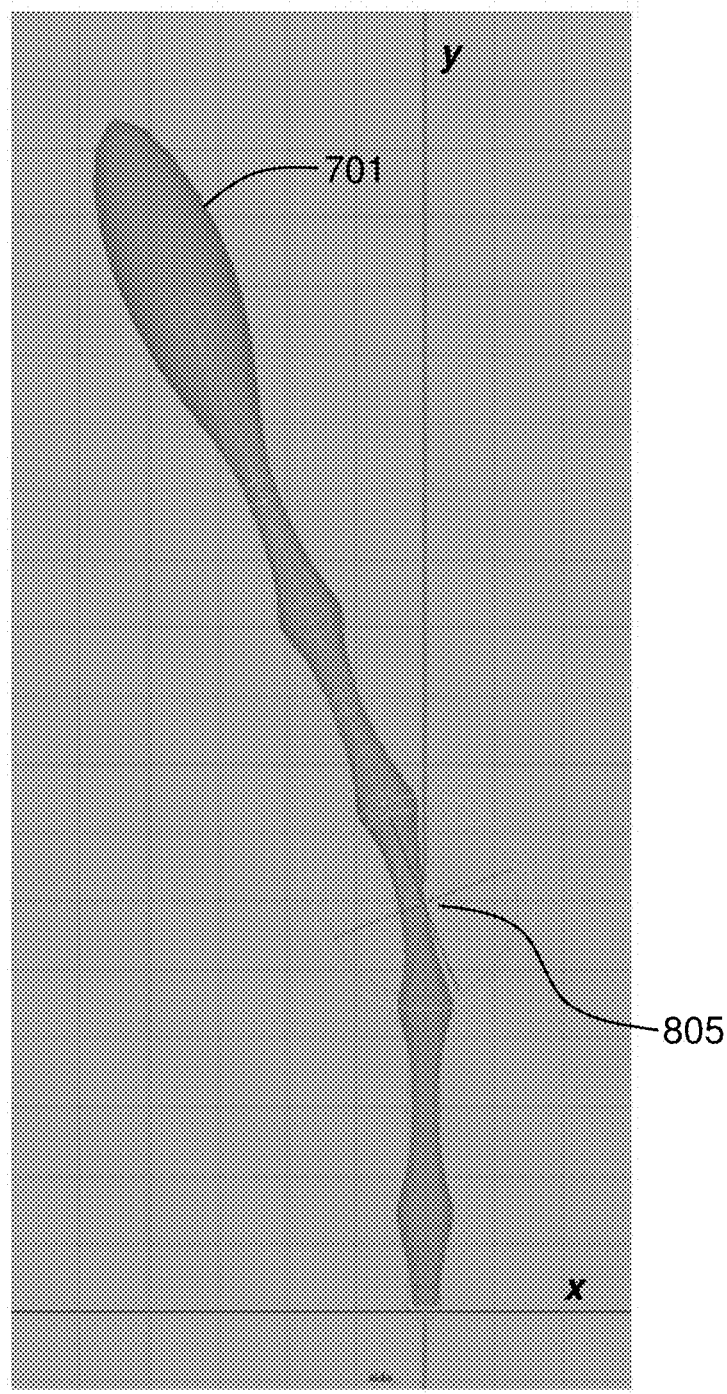
FIG. 10 shows a motion of a model based on the rigging.

FIG. 10 shows a motion of a model 701 based on the applied rigging. The sigma1 monomer has bent around joint 805. Rotation around joints can be controlled by kinematic concepts, as provided for within animation environments such as Maya and molecular Maya.

Such animation environments provide for controls such as forward kinematic and inverse kinematic controls of systems of joints. Forward kinematics refers to having each joint in a chain inherit the motion of its parent joint, while inverse kinematics (1K) refers to causing joints to orient themselves based on the location of a goal known as an end effector. For example, an amino acid side chain in the active site of an enzyme may be rigged with inverse kinematics using the substrate as the end effector. A protein subunit that undergoes a tertiary structure re-organization while changing conformations may be modeled using forward kinematics.

In some embodiments, animation involves the use of deformers such as blend shapes. A blend shape deformer allows a depicted structure to morph between two meshes and allows a user to control the blend and the morph. Typically, at least two topologically identical meshes are created, representing the structure in at least two corresponding conformations. A blend shape is created from the meshes and a node network is created that will work with constraints and rig controls to adjust the animated transformation between the two conformations. In Maya, the two meshes are selected and the Blendshape command is run from the Create Deformers menu. A new node is created and one of the meshes can be deleted (now being represented by the Blendshape).

Preferably, a rigged model includes an animation rig that is easy to understand. For example, controls are labeled and easy to select. For any handle, entering 0 in the translation channels for the controls return the rig to the start position. IK handles use world space coordinates so setting translation channels to 0 moves the handle to origin. These and other principles of good rigging will be understood by those of skill in the art. One valuable tool in rigging includes the use of set driven keys. Driven keys link attributes of one object to attributes of another. Setting driven keys can eliminate the need to move each of a plurality of parts independently.

The invention provides techniques that are suited for complex morphs that allow conformational states of proteins to be depicted. Using systems and methods of the invention, one may create animations that are based on actual data for protein dynamics to provide vibrations and degrees of flexibility that reflect the protein's actual range of thermo-dynamically-permissible motion. The actual structural data is fed into the geometry of the 3D model 203, and dynamic data informs the rig 207. Not only can rigged models provide a scientifically accurate range of motion for proteins and other structures, other benefits can be included such as collision detection or overlap prevention.

For example, systems of the invention may be operable to register and warn against impending self-intersections through the use of self-aware rigging techniques applicable to scientific structures such as biological macromolecules. For structures such as biological molecules, collision detection rigging can include the use of electrostatic forces (e.g., as mapped to the surface of a space-filling model). Application of such collision-detection rigging (i.e., abiding by electrostatic concepts providing that like-charged surfaces repel and unlike-charges attract) provides a set of simulation tools useful to create molecular vistas with semblance to what happens in nature.

In some embodiments, the one or a set of MEL scripts not only create Maya-native geometry directly from the PDB but also automatically create a rig that has some inherent motion constraints applied. The automatic rigging may be applied with different types of molecular representation (ball & stick versus cartoon for example would have very different 'rules' applied to constrain motion). A MEL script can apply certain rigging to certain structural motifs automatically and by default. For example, the peptide bonds of a polypeptide can be automatically rigged for realistic rotations. The rigged model can be provided for "fine tuning" by a user by hand.

In certain embodiments, information for the rig is obtained from a scientific data source. For example, the conformational dynamics data bank (CDDB) can be accessed to obtain information about possible conformations of a protein. A rig can be created to restrict the range of motion of the protein model to conformations allowed by the conformation data bank information. A MEL script can be used to automatically create that rig and apply it to the model based on CDDB data. The CDDB is described in Kim, et al, 2011, Nucl Ac Res 29:D451-5. Suitable databases for protein dynamics may be discussed in Liu & Karimi, 2007, High-throughput modeling and analysis of protein structural dynamics, Brief Bioinform 8(6):432-45. Additionally, curated models of the invention are suited for employment in modern gaming engines. In many cases, the digital assets (models, textures, rigs) used to develop high-end games are created in packages like Maya. In like fashion, molecular-movie style animations are generated within an environment such as Maya for application within interactive molecular environments for educational purposes. Further, embodiments of the invention can use rigging concepts to depict motion through animation and can even be used to control levels of granularity at which motion can be depicted. For example, at one level, the overall motion of molecular structures within their environments can be shown, while at another level, motions at the atomic level can be depicted.

Figure 11:
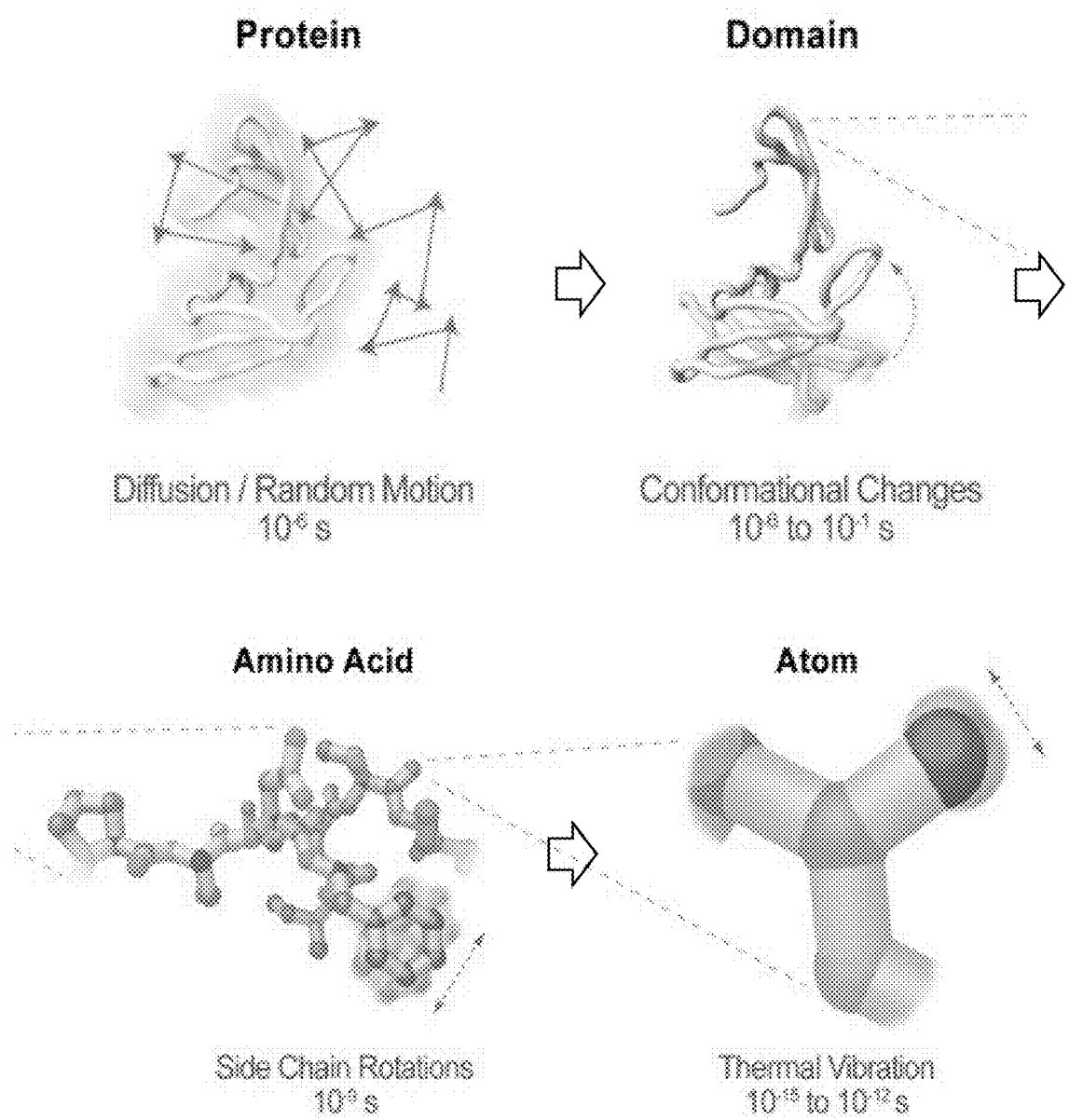
FIG. 11 illustrates protein dynamics at four different levels.

FIG. 11 illustrates protein dynamics at four different levels that can be illustrated using modeling and rigging concepts discussed herein. As sketched by FIG. 11, the diffusion or random motion of entire proteins can be illustrated. Further, conformational changes associated with domains of proteins can be depicted, for example, within an animation provided by methods of the invention involving the use of rigged models. At a more particular level, the various side chain rotations of individual amino acids can be depicted. Even at the particulate level, the thermal vibrations of individual atoms can be depicted. While discussed herein in terms of using rigged models, it will be appreciated that other tools can be brought to bear in conveying natural phenomenon. For example, process such as diffusion and random motion or Brownian motion can be modeled as stochastic process and such processes can be implemented using computer programming or scripting. For example, MEL or Python scripting may be employed.

In certain embodiments, MEL or Python scripts start directly from a PDB coordinate file and generate ribbon, surface or particle representations. In some embodiments, the MEL or Python scripts read from the PDB file, e.g., atom-by-atom. Typically, a set of coordinates will be given to each atom and any bonds indicated in the PDB file will be treated as indicating a connection to another atom. Shading groups are created in the Maya dependency graph. MEL scripts set shading for each atom and create a sphere in the dependency graph. For each bond, a cylinder is created. These models created by MEL scripts may be lighter and cleaner that exports from Chimera or PyMOL since they have been built within Maya using optimized types of geometry, such as NURBS, for example. The geometry file once loaded into Maya appears as a structure in a display. For example, where a PDB file is imported, the protein molecule will be displayed (see FIG. 6 for an example). The molecule in the display can be rotated, translated, and scaled using Maya's native functionality (e.g., hold down ALT+L, M, or R mouse button, respectively, while dragging) for transforming the scene view. A molecule may be displayed using a known format such as a ball and stick model. Sticks represent bonds and balls represent atoms. A molecule may be displayed using a surface model—i.e., showing a surface of the molecule.

In some embodiments, methods of the invention are implemented by programming within an animation environment. Besides MEL and Python, Maya provides an application programming interface, the Maya API. Both MEL and the Maya API support construction of complex geometric objects, creation of new tools and workflows, and manipulation of object and tool attributes. Those programming mechanisms may be found discussed in "Complete Maya Programming: An Extensive Guide to MEL and the C++ API", by David A. D. Gould (Morgan Kaufmann, 2003). Preferably, the API is used for large data sets and complex algorithms. Code accessing the API will be contained within a plug-in. Programming within Maya can be used to automatically import structures such as PDB files as geometries or to automatically rig geometries, as discussed above.

As described above in reference to FIG. 3, once rigged, each model 121 is accessioned 271 to curated model database 109. Access to these rigged, digital models 121 is then provided for use in illustrating scientific concepts. The following discussion describes potential uses of database 109.

Figure 12:
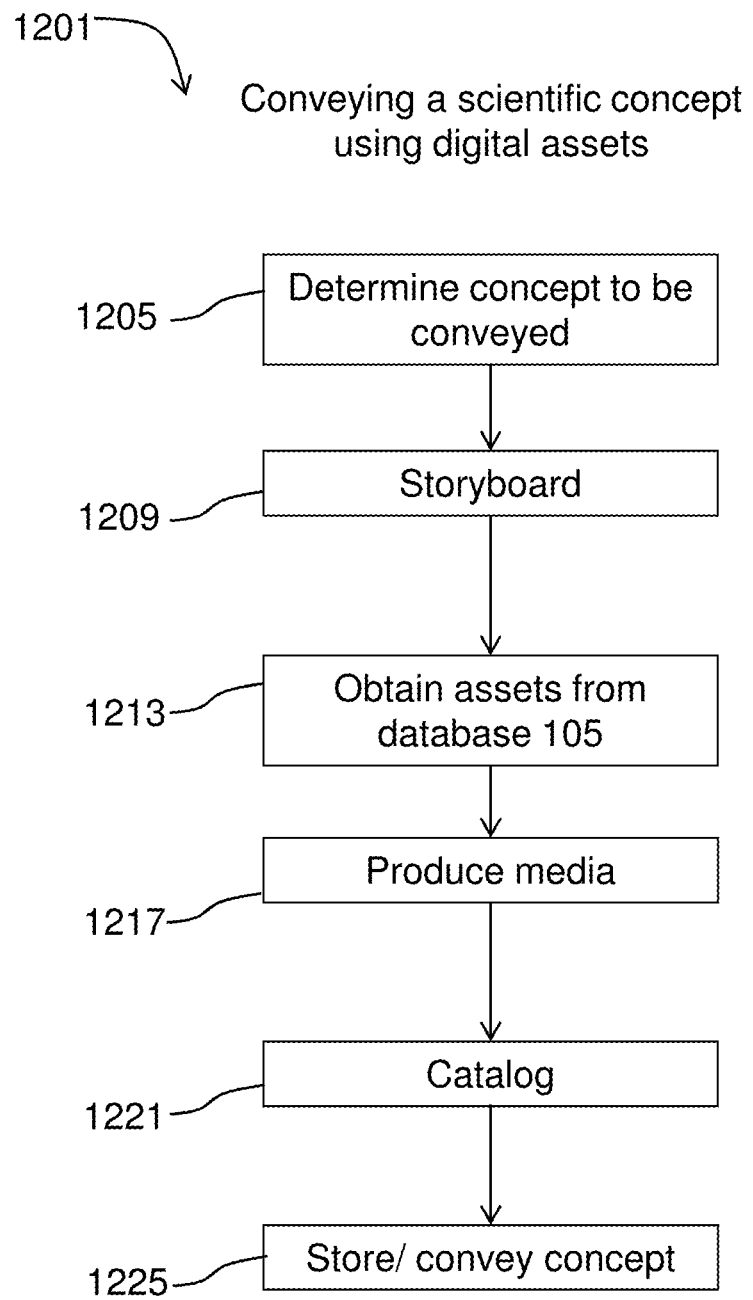
FIG. 12 diagrams a method of building asset database.

FIG. 12 diagrams a method 1201 of making a visualization product that includes a plurality of digital assets that can be used for conveying a scientific concept. The conveyance of some scientific concept is determined 1205 to be an important objective. Any suitable scientific concept can be conveyed using methods of the invention including, for example: protein structure, dynamics, activity, or binding; embryonic development; cosmological concepts or general relativity; cell biology phenomenon such as cell signaling pathways or actin/myosin function; organismal behavior such as eusocial insect colony function; chemical phenomenon such as small molecule effects on targets; biochemistry and metabolism; molecular biology; and others. Once the concept is determined 1205, a storyboard is developed 1209 that will determine a digital asset to be produced. Developing 1209 a storyboard may merely refer to ordaining a structure by which material will be presented. For example, developing a storyboard may consist only of deciding to obtain a still image, or developing a storyboard may include planning a series of scenes for inclusion in a complex, multi-actor animation (e.g., showing TATA binding and recruitment). Once the actors or storyboard and concept are settled, rigged models 121 are obtained 1213 from database 105 for inclusion in a digital asset. The rigged model(s) 121 to be included will relate to the natural phenomenon to be represented. For example, protein conformations can be illustrated by using a rig and a protein model that work together to illustrate the protein assuming a plurality of realistic conformations within an animation. In preferred embodiments, method 1201 may be used to depict complex phenomenon. Rigged models 121 included in digital assets may be found to be particularly valuable for illustrated concepts that some students struggle with. For example, a digital asset can be a pathway animation depicting a cascade of events in which at least two depicted biological structures interact only indirectly.

For example, the mitogen-activated protein (MAP) kinase cascade may be well illustrated using a digital asset that includes an animation. Due to the nature of character rigging, indirect interactions can be understood. For example, MAP kinase kinases (aka MAP2 kinases) are turned on by phosphorylation by upstream kinases (e.g., MAP3 kinases) and themselves phosphorylate MAP kinases. Many of the MAP3Ks, such as c-Raf, MEKK4 or MLK3, themselves require multiple steps for activation. MAP kinases exist that phosphorylate serine or threonine residues near proline on cytosolic proteins and also phosphorylate transcription factors during transcription. Numerous of these interacting proteins exhibit critical activities in separate locations in the cell and never physically meet directly. Thus an animation can illustrate the indirect interactions between, for example, c-Raf and a classical MAP kinase such as ERK1. Since each protein (c-Raf, a MAP2K, ERK1) is included with a structurally accurate model 203 and a dynamically accurate rig 207, an audience can view the indirect influence of c-Raf on transcription via an animation that is scientifically accurate. Additionally, this material can be illustrated through, for example, a web-based interactive decision tree, allowing a freshman student to select input and decide conditions that control a depicted outcome. As discussed, a digital asset can include an animation. Alternatively or additionally, a digital asset could be, for example, a still, a simulation, an interaction, a game, or other media.

One or a number of high-quality still images that depict natural phenomena with scientific accuracy may be desired by a publisher. Stills can be composed using models from database 109. For example, if a publisher wishes to illustrate the so-called central dogma of molecular biology to a high-school audience, systems and methods of the invention can be used to produce three stills, one to illustrate each of replication, transcription, and translation. The nucleic acids and proteins can be included based on models from the database and the images can be stylized to communicate effectively with the high-school education level (e.g., bases can be presented in a simplified structure and each clearly labeled with one of A, T, C, and G). In contrast, a working researcher may desire a digital asset consisting of a still image illustrating an autocatalytic property of a ribonucleic acid for publication in a peer-reviewed journal. Using a model from the database, such a still can be composed and—in view of the average post-doctoral education level of the readership—a valence electron cloud for the oxygen of a 2' hydroxyl group that acts as a nucleophile in phosphodiester cleavage can be illustrated and shaded so that readers visualize the ribozyme reaction mechanism. Thus one can appreciate that systems and methods of the invention can be used to produce 1217 a visualization product that includes a plurality of digital assets, each digital asset having one of a variety of formats. The digital assets may be tailored to an education level of an audience for the effective conveyance of a scientific concept.

Producing a digital asset may include building an animation that uses one or a plurality of rigged models 121. Digital assets are made to be scientifically accurate. This can include, for example, concealing portions or picking alternative geometrical or visual representations for portions of the digital model for which scientific data is not available.

Additionally, digital assets can be tailored to an education level of an audience. For example, a level of complexity of the digital asset can be set according to an education level of an audience that will view an animation. Additionally or alternatively, parts of the digital asset can be concealed based on the education level.

In some embodiments, systems and methods of the invention are operable to automatically tailor a visualization to an education level of an audience. This can be accomplished by having different qualities of information in the rigged models and using computer program instructions that, within an animation, selectively use certain of those qualities of information. For example, proteins may include information about surface geometry and also information about charge distribution on the surface. If an education level is within K-12, the charge information may be omitted from an animation, whereas if the education level is graduate or higher, the charge information may be included as a color-coded scheme on the surface of individual proteins.

Tailoring to an education level can include controlling a number of elements to depict in an animation. For example, in an animation depicting transcription initiation, if the audience level is set at grade school, systems of the invention may depict only an RNA polymerase processing a DNA strand. For a graduate education level, the system may include, for example, TATA binding proteins and transcription factors binding and recruiting the polymerase.

In some embodiments, digital models may include elements or portions that are tagged with an education level so that systems may selectively exclude those elements or portions for education levels that do not match the tag. For example, in biochemistry, it is thought that in an enzyme-catalyzed reaction, the substrate will fleetingly occupy a highest-energy transition state and that the nature of this transition state precludes its ever being observed according to quantum principles. A model of the substrate may include rigging allowing the substrate to assume the transition state form and may further include rigging that vibrates or blurs the surface geometry at the instant the transition state form is assumed to prevent direct and instantaneous visualization of the transition state form. For an animation in which the education level is, for example, elementary school, any depiction of the transition state may be excluded and the enzyme-catalyzed reaction may be depicted simply as substrate-in, product out. For college level animations, the transition state may be depicted for an instant during the reaction. For an animation intended for a post-doctoral biochemist with an understanding of quantum physics, the uncertain transition state may be depicted.

The digital assets can be manipulated to create scientifically-accurate depictions of natural phenomenon. For example, circumstantial parameters such as temperature, viscosity, salinity, or pH can be set (e.g., some proteins may exhibit different conformations, or some reactions may occur at different speeds, as such parameters vary). To expand, a number of proteins are known to respond to [H+] gradients. If, for example, an ATPase is being modeled in a lipid bi-layer membrane, a user may input a hydrogen ion concentration on either side of the membrane. If the concentration is isomolar across the membrane, the ATPase—by virtue of its rigging—will be depicted as static. If there is a hydrogen ion concentration, the ATPase will be depicted as active. Similarly, temperature can be manipulated to influence an animation. To give an example, if an animation environment is set up with rigged models for Taq polymerase, DNA strands, oligonucleotide primers, and dNTPs, a user can use an interface provided by systems of the invention to establish a series of different temperatures that will be modeled at different times during the animation. At high temperatures, the DNA will melt, and at cooler temperatures, the oligos will hybridize to the DNA to initiate polymerase activity. By thus setting environmental parameters, a user can successfully model the polymerase chain reaction.

Each digital asset is cataloged 1221 by, for example, title, subject matter, client ID, or other information for later retrieval and use. The digital assets are then stored in asset database 105 and used to convey 1225 the scientific concept to an audience.

In general, steps of method 1201 can be performed using system 401. As discussed above, system 401 includes a processor coupled to a non-transitory memory having stored therein a plurality of models, each model comprising data representing a structure and a rig that defines animation dynamics for the structure such that a range of motion of each model on an electronic display device 129 is predetermined without manipulation from a user.

Figure 13:
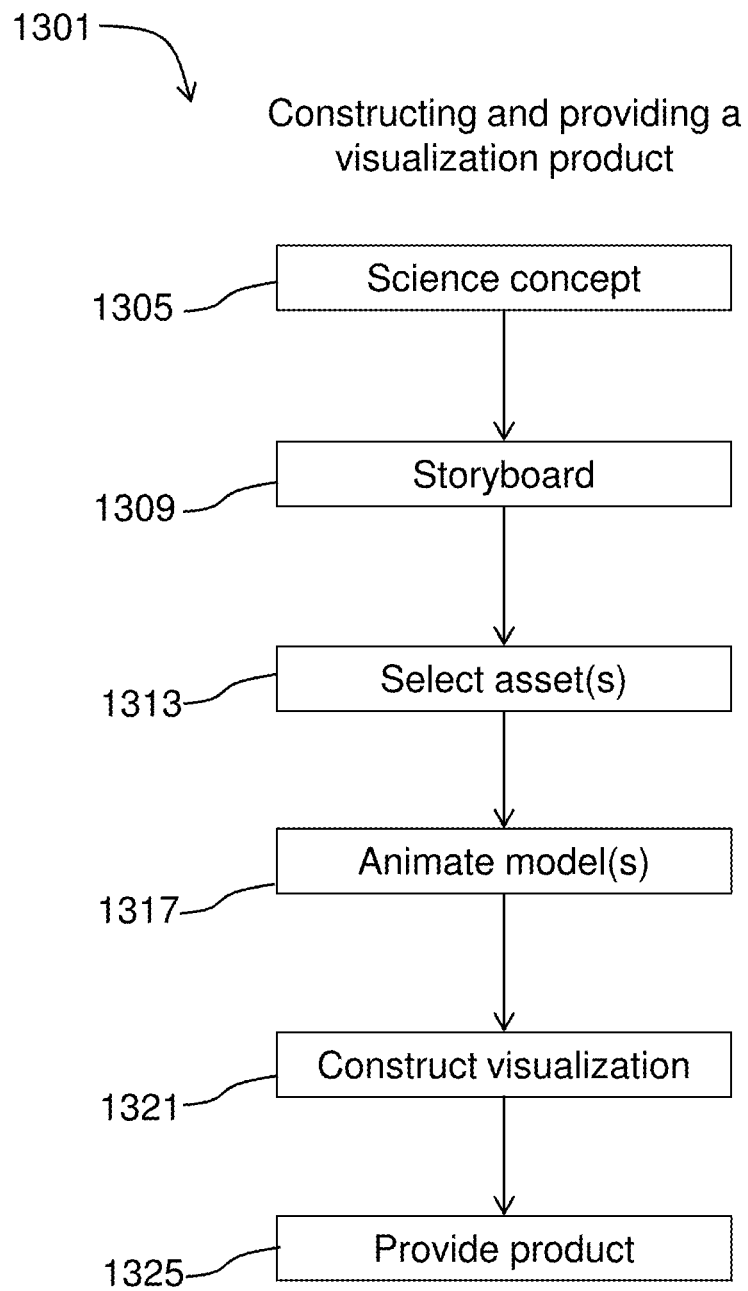
FIG. 13 diagram a method for constructing a visual product.

FIG. 13 diagrams a method 1301 for constructing and providing a visual product using a curated database of the present invention. Generally, method 1301 for providing a visualization product includes determining 1305 some science concept or topic to be depicted. A storyboard for the visualization may be developed 1309. No particular format is required for a storyboard. A storyboard, generally, is a tool to organize contents of a visual product. To satisfy the content required by the storyboard, digital assets are selected 1313 for inclusion. At least one of the digital assets will be capable of visually conveying at least a portion of the scientific concept. At least one of the digital assets will include a rigged model 121. Use of a rigged model 121 allows models to be animated 1317. Using a computing device 125, a visualization product is constructed 1321 such that it includes at least one digital asset. This visualization product is then provided 1325 for use (e.g., for viewing by the audience on an electronic display device). Method 1301 may include receiving data related to the education level of the audience.

The visual product may be any product that visually communicates a scientific concept. For example, the visual product may be an animation depicted on a computer screen or it may include a tangible medium having files stored therein that can be accessed to view an animation. The visual product may include a still photo or an interactive game. In some embodiments, the visual product includes a digital textbook (e.g., for viewing via a tablet computer or similar device). Providing the visual product may include rendering an animation (e.g., taking the 3D modeling and animation files and outputting a video clip that comprises a series of bitmapped images). In certain embodiments, the visualization product will include a set of digital assets that, in the aggregate, convey an entire scientific concept (e.g., protein folding or DNA replication).

In preferred embodiments, a visual product is tailored to an education level of an audience. This can include receiving education level information. For example, a customer can order a visualization product (e.g., using a web interface) and may include in the order the information about the audience. Education level can be specified by, for example, grade level, or it can be provided in other terms such as age. The visual product can then be tailored to the grade level. For example, in some embodiments, tailoring the digital asset is done by automatically visually concealing one or more portions of the digital asset based on the data related to the education level of the audience.

Constructing and providing a visual product is preferably performed using a system that includes a processor coupled to a non-transitory memory. The system can be used to construct an electronically displayable visualization product that comprises at least one digital asset that visually conveys at least a portion of a scientific concept. The digital asset includes a structure 203 and a rig 207 and is tailored based on an education level of an audience. An end user can access the system to initiate creation of a visual product.

Figure 14:
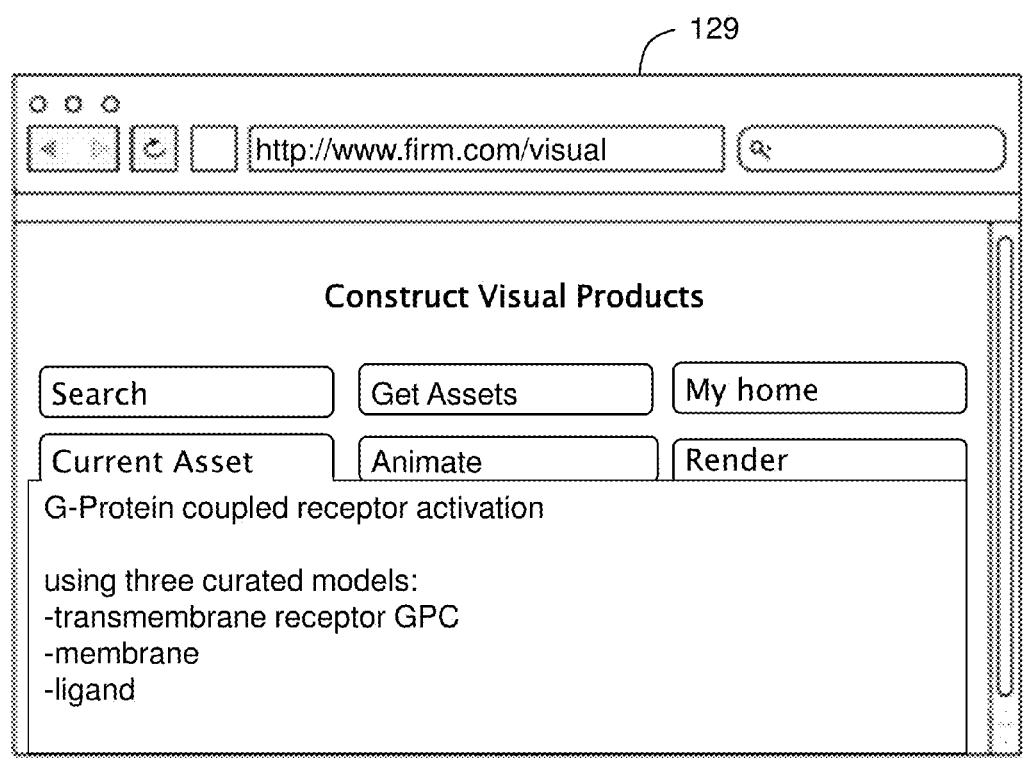
FIG. 14 depicts an interface for using systems of the invention.

FIG. 14 depicts an interface 129 provided by computing device 125 for using systems of the invention. As shown in FIG. 14, systems and methods of the invention can employ a web front-end or other interface, such as a dedicated application, to allow users to create products described herein. Since databases, products, and visualizations described herein may include a large number and variety of unforeseen assets or model types (e.g., for things like a cell-type library), it is valuable for the invention to provide an easy-to-use interface for users to put in suggestions or requests. For example, a user can request their favorite cell type or a peroxisome. As depicted in FIG. 14, a user may see a web interface to set up a request for a visualization product that illustrates G-protein coupled receptor activation.

Any suitable scientific concept may be illustrated by systems and methods of the invention. For example, embryonic development can be illustrated and conveyed by modeling a developing embryo using one or more rigged model 121. In certain embodiments, one or more entire cell (e.g., substantially all components or processes) is depicted. Systems and methods of the invention have particular application to systems that include a stochastic component. For example, it may be illustrative to depict transmembrane proteins as drifting within a lipid bi-layer membrane to communicate the fluidic mosaic model hypothesis of the plasma membrane. See, e.g., Singer & Nicholson, 1972, The fluid mosaic model of the structure of cell membranes, Science 175(4023):720-31. Using rigged models 121, each lipid can be populated to a membrane surface, and each transmembrane protein can be included, using a rigged model 121 for each. Using methods of the invention as described herein, any of these scientific concepts and more can be illustrated.

Figure 15:
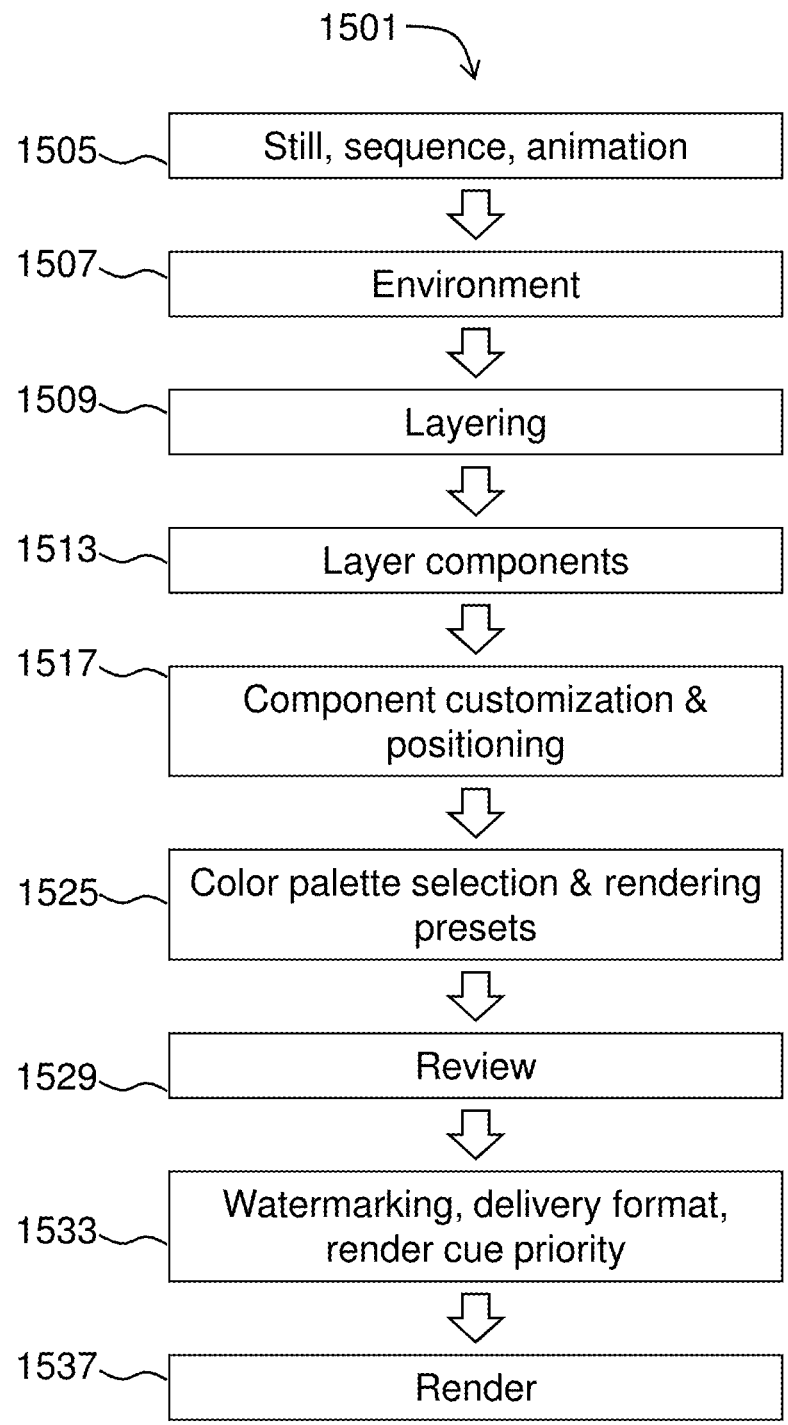
FIG. 15 shows a method for creating a visual product.

FIG. 15 shows a method 1501 for creating a visual product according to certain embodiments. Method 1501 includes determining 1505 what product to make such as, for example, a still, a sequence, or an animation. The environment is then constructed 1507. Constructing the environment includes layering 1509 (see FIG. 20) and selecting 1513 layer components. Layer component choices depend on the subject matter, the environment, and the layer. If a cellular biology concept is being communicated, options for components to have within various layers of the visual product may include none, nucleus, plasma membrane exterior, plasma membrane interior, mitochondrion, cytoplasm, others, or a combination thereof. Embodiments of the invention include preset models and user-driven sets of layer components. The components can be customized and positioned 1517. Options are component-specific such as, for example, animation presets.

Rendering presets and color palettes are selected 1525. Selecting color palettes can include assigning color by component or using an overall Kuler palette, and can also include using an overall image style (ambient occlusion (AO), simulated electron microscope (EM), cartoon-style, combinations). Ambient occlusion is a method to approximate light shining onto a surface. Typically, ambient occlusion is used for realism. Ambient occlusion models rays cast in every direction from a surface. Rays which reach the background increase the brightness of the surface, whereas a ray that hits an object contributes no illumination. As a result, points surrounded by a large amount of geometry are rendered dark, whereas points with little geometry on the visible hemisphere appear light. Programs such as molecular Maya include shaders such as the EM shader to simulate the appearance of electron microscopy.

All of the preceding work can be reviewed 1529, allowing a user to revisit any of the foregoing steps. In some embodiments, the product is watermarked 1533. A delivery format is established. The product may then be rendered 1537.

As discussed above and throughout, systems and methods of the invention can be used to create a variety of digital assets, databases, and visual products. Systems and methods of the invention may include additional features and functionality. For example, a scientific animator my use a curated model to create a digital asset, which could, for example, depict and illustrate such diverse phenomena as polymerization, cell signaling, Brownian motion, lipid bilayer membrane structure, cellular organization, protein folding and conformation, organismal anatomy, embryonic development, bench-top lab experiment protocols, intracellular biomolecular structure and composition, viral structure and function including capsid packing, the biochemistry of metabolism, phylogenetics, ecological principles, neural function, and other phenomenon. For example, in some embodiments, a digital asset may illustrate polymerization. Individual monomers may be modeled and rigged so that they will self-assemble in an animation. In certain embodiments, a digital asset may illustrate Brownian motion. A curated model can be used for each of the individual particles (e.g., proteins, molecules, other physical particles), which may exhibit stochastic motion that is illustrated and modeled using the curated models.

The audience may be any single person or group of people with any education level, and the invention addresses unmet needs for a variety of different audience types or education levels. The audience may be of a collegiate or post-collegiate level, which may include for example, graduate, medical, post-doctoral or any other level. Content may be provided that is relevant to pre-collegiate, undergraduate, graduate, medical school and post-doctoral. For example, high-school students (e.g., in AP Biology) may be educated through the use of visual products such as standards-based mini-curricula in life sciences or other engaging digital modules contextualized in 3D environment. Such visual products provide support for the teachers as well as the students. A mini curriculum may include, for example, an assessment integrated with curriculum modules in the form of a digital asset as described herein. Using methods herein, it is possible to customize a visual style across collections. Generally a module is a singular digital learning asset or "widget", and can be of a number of different types of media such as static or interactive images or diagrams, interactives, or mini-games, for example. A visual mini-curriculum can be made of a grouping of modules that address traditional curriculum topics. A collection may include a grouping of modules that belong together based on scientific topic, but not necessarily assembled in an education, curricular context like a mini-curriculum. In certain embodiments, systems and methods of the invention provide for collaborative learning. For example, content may be tailored to support paired, or groups of, students on projects. Material may be delivered such that tasks or response prompts are directed to members of a pair or group to support collaborative learning objectives.

The concept of a digital, visual mini-curriculum may find value in visual products provided for college students. For example, pre-med students can learn anatomy and physiology concepts. For working research scientists, there is a need for the ability to provide scientifically accurate visualizations in which static or animated visuals are derived from actual datasets. Scientists may require a clear provenance of datasets used for a visualization. Visual products as described herein may be used by scientists to illustrate and understand competing models for mechanisms. The general public may be well-served by books, articles, TV shows and documentaries that include scientifically accurate visualizations tailored to the average education level of the general public within a market segment. A society may be better informed and able to bring a fundamental understanding of science to future careers. A mini-curriculum will generally include educational materials and preferably includes tools for assessment.

One benefit of a mini-curriculum of the invention is that, due to the visual nature of the products provided by the invention, the curriculum need not be interwoven with prose exposition as required by convention for existing textbooks and journal articles. While a visual product may include some text (e.g., as captions, labels, or navigational instructions), in some embodiments, products of the invention are substantially visual, which can be taken to mean that the products do not include or require expository paragraphs of text for understanding. A visual curriculum has benefits due to the fact that many people learn in different styles and also that many scientific concepts are conducive to teaching visually. Additionally, a visual mini-curriculum is easier to distribute to audiences with different languages, since chapters of text do not need to be translated.

A mini-curriculum generally defines teaching material in that content is organized according to some pedagogical principle. For example, it may be determined that it is preferable to teach DNA replication prior to teaching mutation, and all prior to teaching population genetic concepts relating to diversity but after teaching Mendelian genetics. Accordingly, a visualization product may be prepared that includes, and indeed centers on, replication and reproduction as the molecular basis for inheritance, but the visualization product may follow a sequence that begins with Punnett square before giving the molecular mechanisms of diploid genetics. The sequence may end with illustrations linking the inherited alleles to populations in a geographical context.

To give an alternative example, a mini-curriculum may be prepared that presents a visualization of a molecular process such as apoptosis but the pedagogical organization may include assessment actions built in to the visualization and linked to certain parts of the illustrated apoptosis mechanism. The assessment tool could be, for example, an on-screen test (e.g., click a multiple-choice answer to proceed). In certain embodiments, the assessment tool is embedded as an interaction requiring a viewer to influence the depicted scene in the scientifically correct mechanism. In certain embodiments, assessment includes visual aspects and a user's progress is assessed visually. A user may interact with a visual display to satisfy an assessment (e.g., drag and drop the appropriate molecule given context). In this way, visual assessment can capture the assessment of a user.

The visual assessment embodiments are included but not limited to: 1) allowing student to visually modify existing imagery (either through labeling, additional sketching, selection or other activities), 2) order sets of still images or image sequences (animations) to properly sequence a temporal process, 3) create their own custom imagery within the system, control parameters that impact the quantitative and/or qualitative output of simulations and game-like interactives.

Systems and methods of the invention not only allow instructors to monitor student progress and understanding within and across individual assets, but they also enable/guide them in implementing asset-based activities in a flipped-classroom context. For example, aspects of certain digital assets are designed to be used by students at home for instructional purposes, while other aspects of these assets are designed to facilitate classroom-based discussions and problem solving.

The invention offers a new level of transparency to users that is realized at two levels: a) the sources used for creation of content in all form (structural, dynamic or other) and b) the process and methodology used to create the visualization itself.

Systems and methods of the invention provide for rapid updating of content based on changing scientific data or shifting theories within the scientific community. The system designed to allow revisions within digital assets as well as deletion or creation of entirely new digital assets.

Assessment materials may be provided with or within visual products. For example, a visualization may be accompanied by a test that prompts a user to make a series of answers in an extrinsic medium. In this example, a user could provide written answers outside of the system while accessing a visual product. This allows the assessment tool to provide standardized extrinsic results that can be compared against results from other methods (e.g., filled-in scantron sheets). In certain embodiments, assessments are adaptive and embedded within a visual product. For example, in illustrating a molecular biology reaction, a user may have to drag the appropriate molecule into a scene, e.g., from a palette of candidate molecules. Preferably, the assessment can aid in evaluating a student by, for example, measuring progress through educational objectives.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

EXAMPLES

Example 1. Storyboarding

Figure 16:
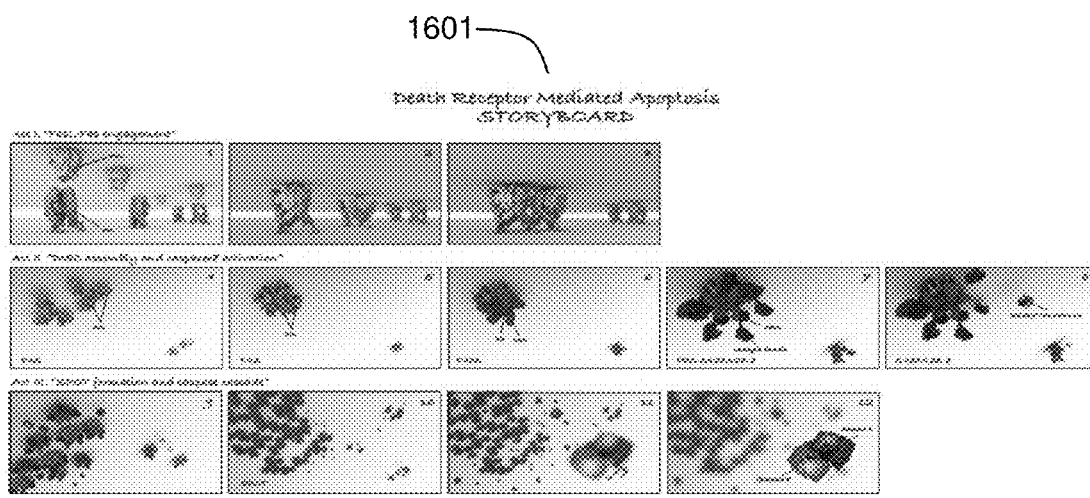
FIG. 16 depicts a storyboard.

FIG. 16 depicts a storyboard 1601. The table at the bottom of FIG. 16 gives an example of the varied and numerous structural pieces that are gathered and used to construct a curated model. That is, the table in FIG. 16 illustrates components that may be used in creating or populating a curated model database, which database may be used in the creation of storyboard 1601. In the illustrated example, a teacher may wish to communicate death receptor mediated apoptosis to a college student audience. The teacher may wish to communicate mechanisms of cell death through the binding of ligands to death receptors such as Fas/CD95 and the subsequent formation of the death-inducing signaling complex. See, e.g., Pennarum, et al., 2010, Playing the DISC: turning on the TRAIL death receptor-mediated apoptosis in cancer, Biochim Biophys Acta 1805(2):123-40. The teacher or a service provider may develop a storyboard to illustrate the Fas ligand member of the tumor necrosis factor (TNF) family and the aggregation of death domains (DDs), allowing Fas-associated death domain (FADD) to bind to the death domain of Fas. FADD also binds to caspace-8 through its death effector domain (DED) and ultimately active caspase-8 is released to the cytosol.

Storyboard 1601 may include identified actors to be included in a visualization product. In the depicted storyboard 1601, a Table of Actors lists the Fas ligand (FasL); a tumor necrosis factor receptor superfamily member 10b (DR5); Fas; FADD; caspase-8; and caspase-5, as well as the primary structure and PDB accession number of each.

Storyboard 1601 is thus a valuable tool for planning a visualization and tailoring the visualization to the education level of an audience. In the depicted example, the teacher plans on illustrating apoptosis to a college-level audience. The teacher or designer includes that information and provides the PDB numbers of the actors (proteins). This information allows a visualization product to be made and tailored.

Figure 17:
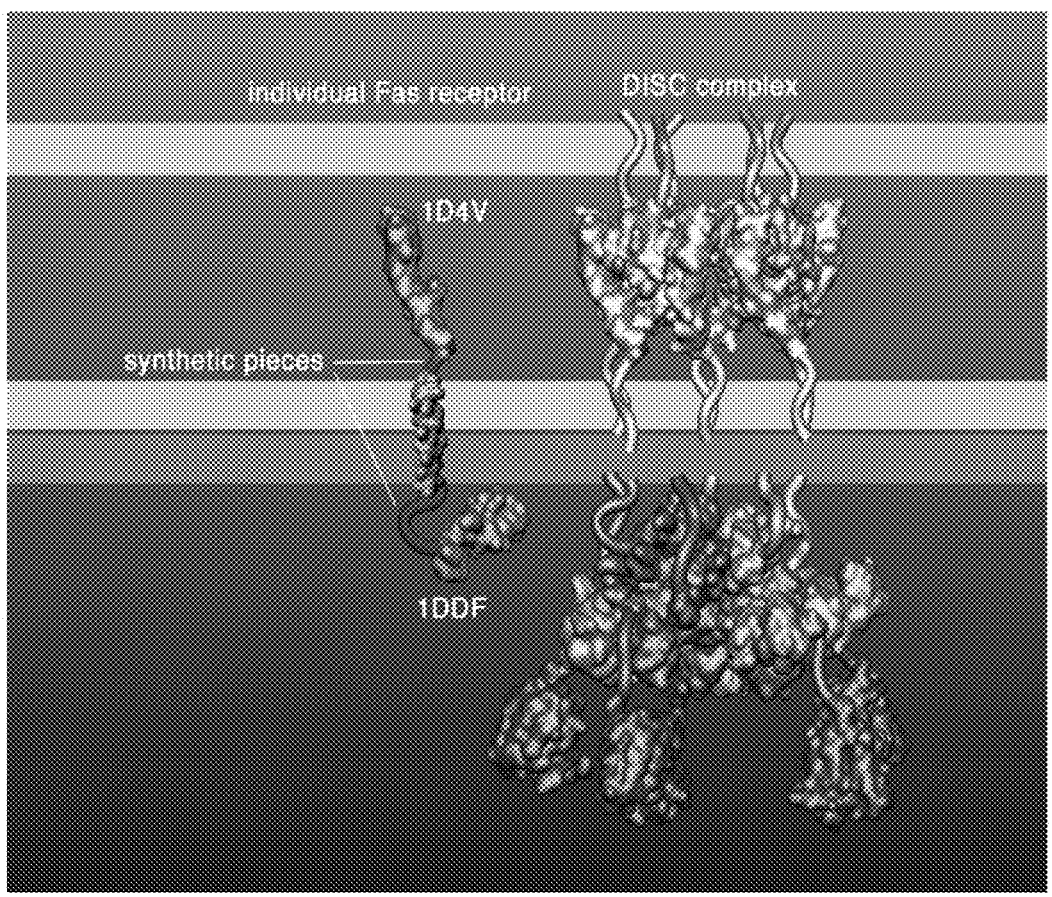
FIG. 17 illustrates a visual product that has been created using storyboard.

FIG. 17 illustrates a curated model for DISC in the process of being built within the Maya/Molecular Maya UI. The models are rigged so that the individual proteins move and assemble realistically.

Example 2. Modeling for a Still

Systems and methods of the invention may be used to create visual products that include still images.

Figure 18:
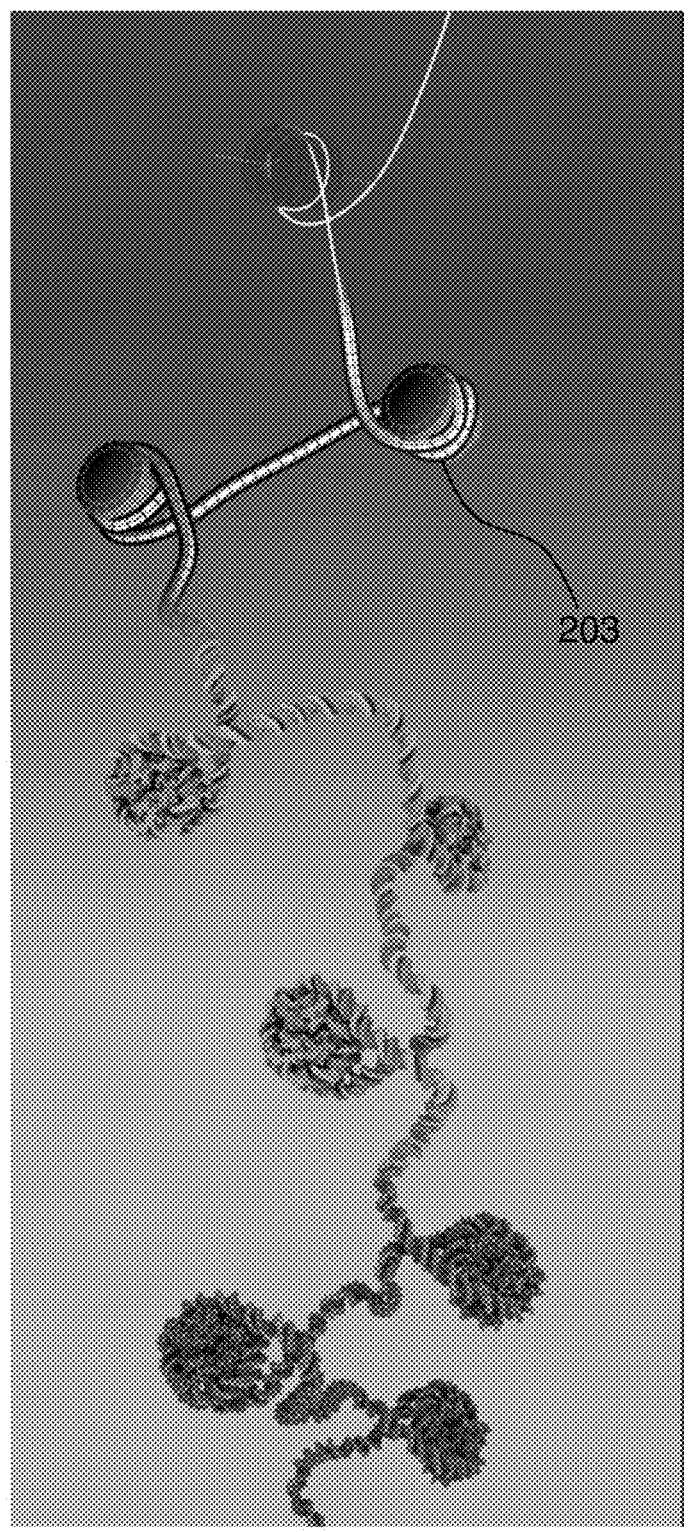
FIG. 18 shows a DNA strand.

FIG. 18 gives an example of how an underlying structural dataset can be used to drive multiple types of molecular representations—as seen in different top-to-bottom levels of the image. Here, the tailoring of the representation/rendering is something that would be specified and happen at the level of the specific digital module in the digital assets/modules database or Visual Cell. Specifically, FIG. 18 shows a DNA strand in a stylistic manner in which progress through the modeling process is illustrated from top to bottom along the strand. At the top of FIG. 18, the DNA strand is represented by a simple curved line with a histone appearing a simple cylindrical spool shape. Moving down FIG. 18, the modeling of the DNA strand and the histone using polygons or NURBS curves is represented. A user can build up a model in, for example, molecular Maya. Detail is added and, at the bottom of FIG. 18, surface textures and shading and lighting is included in the model so that the packaging of DNA into chromatin is illustrated with a very high level of detail. The level of detail can be selected based on the education level of the audience. For example, advanced chemistry students can be shown the charge distributions on the surfaces of the histones (net positive) and the charge distributions on the surfaces of the DNA (net negative due to the phosphate groups) and this can aid the advance chemistry student to understand that chromatin represents a low energy state in DNA packing. In contrast, for an early elementary student, the level of detail may be kept much lower and it may be most effective to communicate only that DNA is coiled around histones in manner in which a garden hose is stored to aid in storage and retrieval. The bottom-most area of FIG. 18 represents the finished model 203 of DNA and histones.

Figure 19:
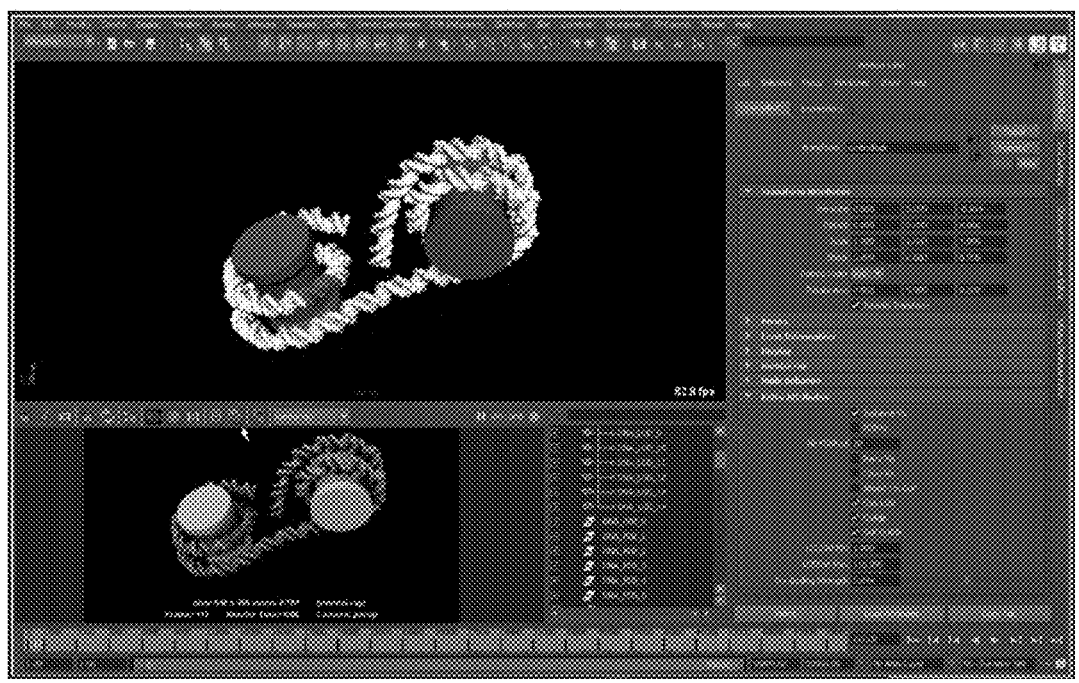
FIG. 19 illustrates use of a modeling product to prepare a model.

FIG. 19 illustrates use of a product such as molecular Maya to prepare model 203 showing DNA coiled around histones. Even though the final visual product may be determined to be a single still image, the highest possible level of scientific accuracy can be ensured by modeling the actors as rigged 3D structures. Chromatin provides a good example due to the fact that the precise way in which DNA wraps around a histone is a product of the structure and dynamic properties of both DNA and the histone. Rigging techniques can be used to restrict the possible range of motion of the DNA realistically and then to wrap the DNA around the histone, as shown in FIG. 19. That model can then be used to create a visual product that includes a still image.

A visual product including this material can also include multiple layers so that the primary actors (here, DNA and histones) are depicted with scientific accuracy in their natural environment. This functionality is provided via digital assets which may rest on a foundation of curated digital models.

Figure 20:
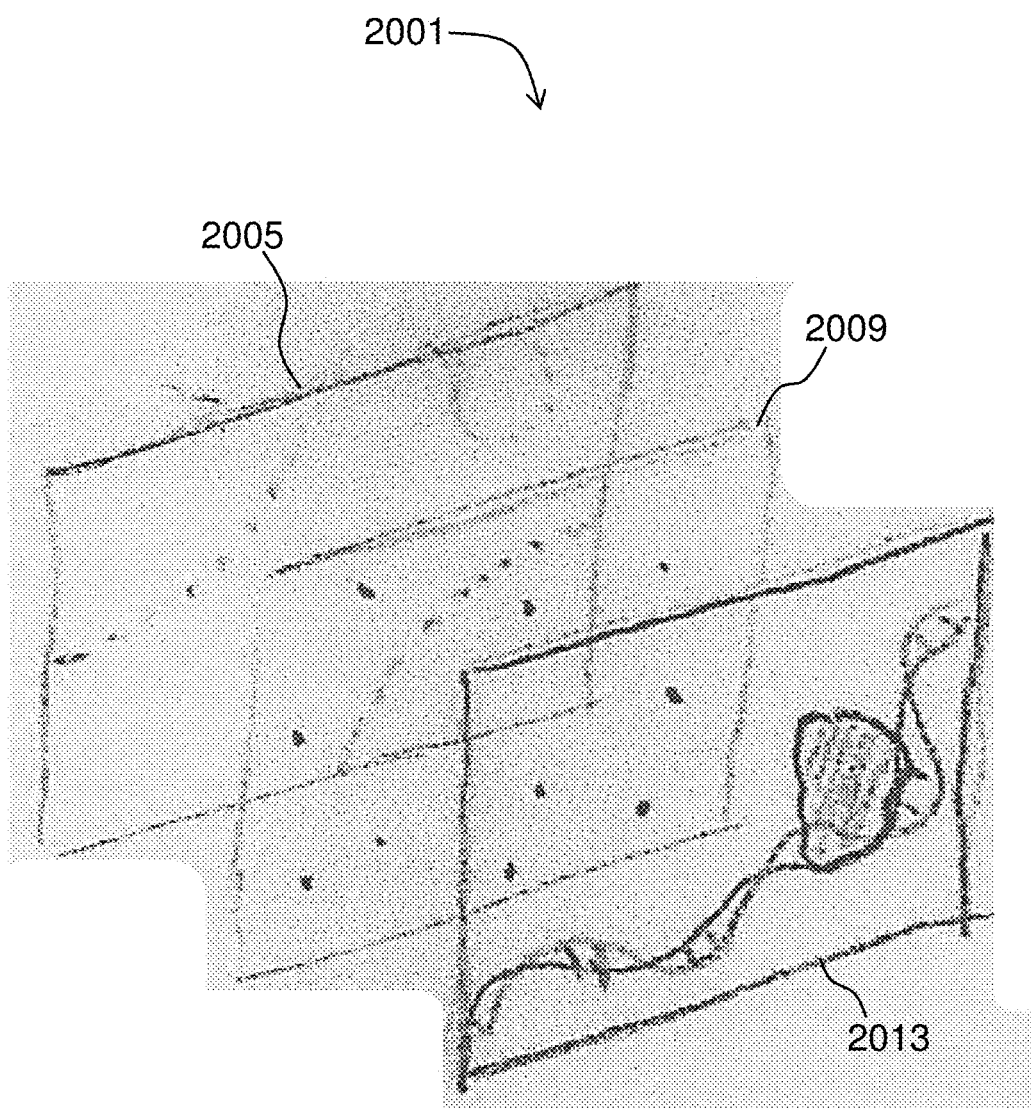
FIG. 20 shows the layers of a layered structure.

FIG. 20 shows the layers of layered structure 2001. Generally, a layered structure 2001 for conveying a scientific concept will include at least a back layer 2005, a mid-layer 2009, and a front layer 2013. Any suitable scientific concept can be depicted using layered structure 2001. For example, transcription initiation can be illustrated by having back layer 2005 provide a nuclear backdrop. Mid layer 2009 can include environmental proteins as actors (e.g., one or more miscellaneous CCCTC-binding factor). Front layer 2013 will generally include primary actors such as the "hero" protein, here, a transcription factor bound to DNA. Using different layers can aid in automatically tailoring a visual product to the educational level of an audience. For example, where it is desired to teach simply the wrapping of DNA around histones, the back layer 2005 and mid layer 2009 can be put into soft focus so that the student's attention is given to the front layer 2013. Alternatively, a level of detail in mid layer 2009 can be increased for, for example, a journal publication about binding factors where the audience will typically have a post-doctoral education level. Using at least one rigged model 121, a visual product can be made—such as an animation, interaction, simulation, game, a photo-quality still, or similar material—that can be used to illustrate a scientific concept.

Figure 21:
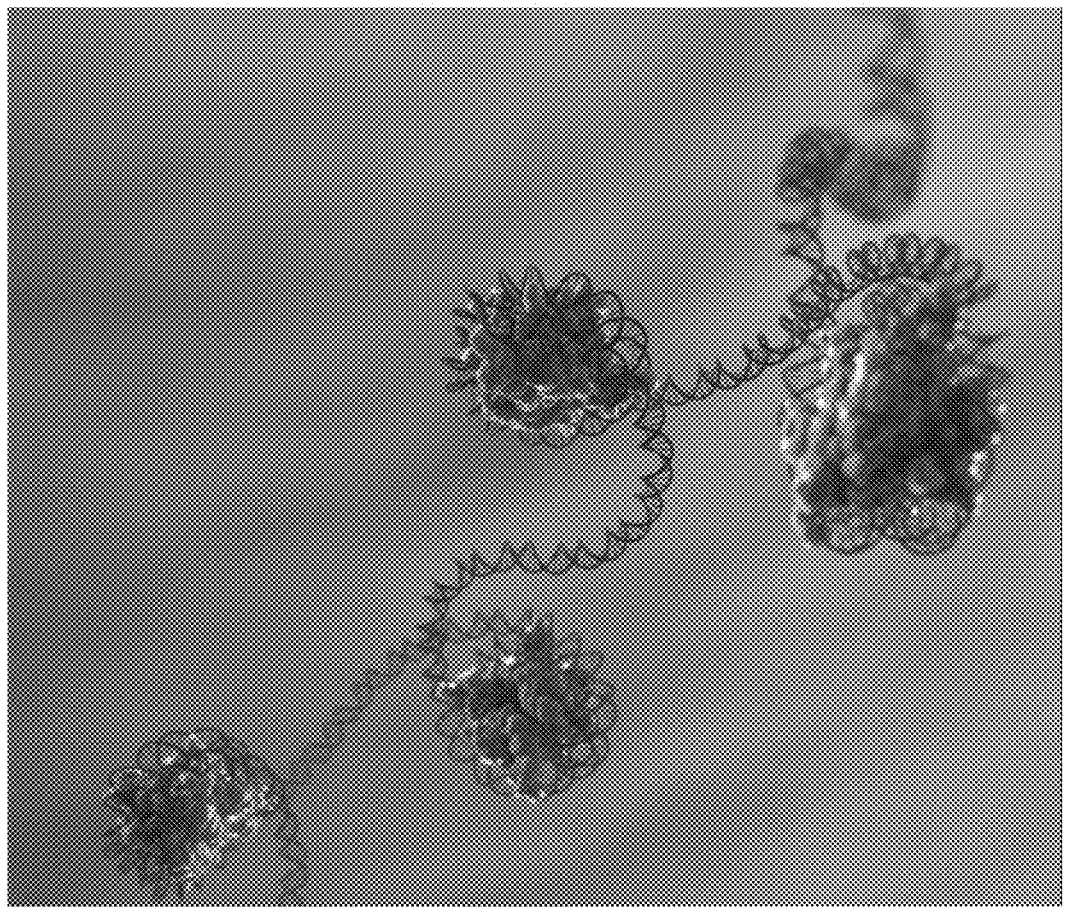
FIG. 21 presents a digital asset created using layered structure.

FIG. 21 presents a digital asset created using layered structure 2001, i.e., the final product of the methods illustrated by FIGS. 18-20. Since layers are used and since material is represented using rigged models, the image in FIG. 21 provides a visual product that conveys a scientific concept with accuracy and is tailored to the education level of an audience.

Example 3. Photorealistic Products

In some embodiments, a curated database includes macroscopic models. For example, macroscopic curated models may be useful in the setting of 1) laboratory equipment and 2) biological organisms. For equipment, could have curated models of lab equipment that are pre-rigged to animate in certain ways. For biological organisms (most likely the model systems of biology . . . mouse, yeast, *Xenopus, C. elegans*, zebrafish etc.) models may also be pre-rigged to be 'animation-ready'.

Figure 22:
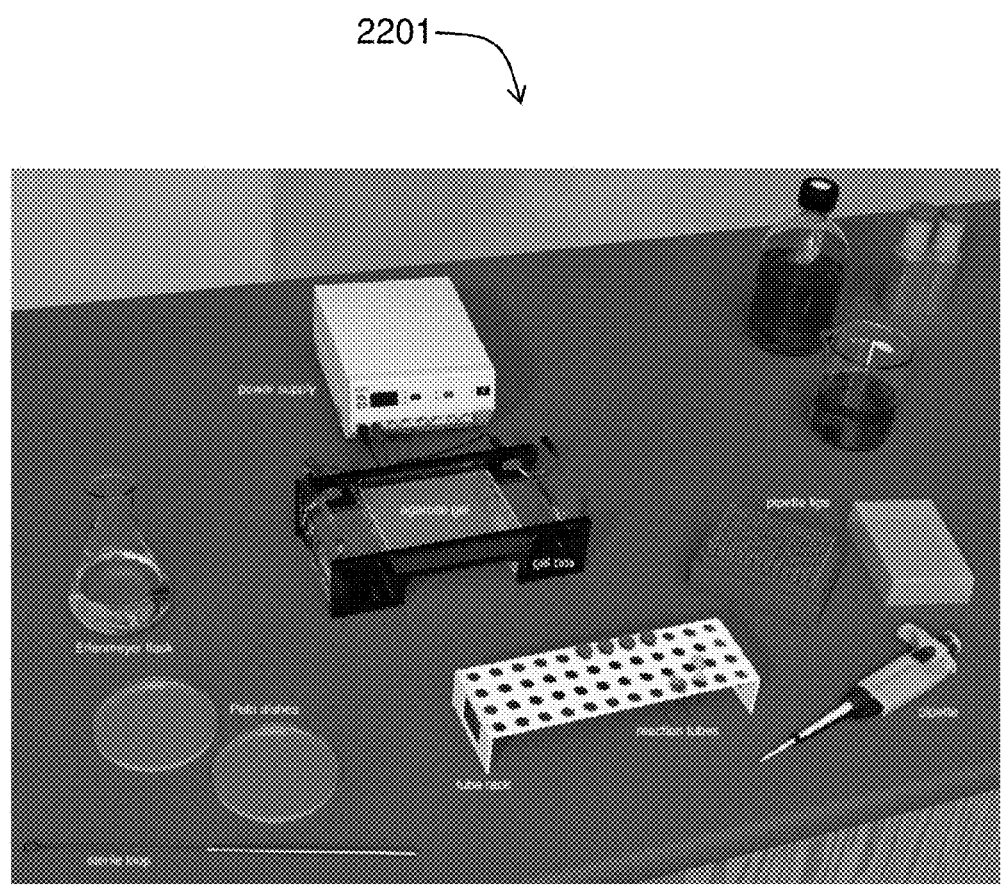
FIG. 22 illustrates a digital asset that includes a photorealistic image.

FIG. 22 illustrates a digital asset that includes a photorealistic image 2201 created using methods herein tailored for an undergraduate-level audience. Image 2201 and other images like it may be used to communicate, for example, laboratory techniques. Thus systems and methods of the invention may aid in solving the challenges associated with teaching students to perform certain exercises. Image 2201 appears here as a still, but it will be understood that using systems and methods of the invention, an animation or an interaction can be prepared that gives photorealistic representations of equipment, specimens, and other materials. In some embodiments, rigged models of materials such as pipettors, streak plates, or dissection samples are used in a video-game engine style environment to allow a student to simulate an exercise one or a few times before performing the exercise with real equipment to save costs to an institution.

Example 4. Modeling a Membrane

A curated model database will have embedded 'knowledge' or metadata on how to build a membrane based on simple parameters provided by the animator or user.

Figure 23:
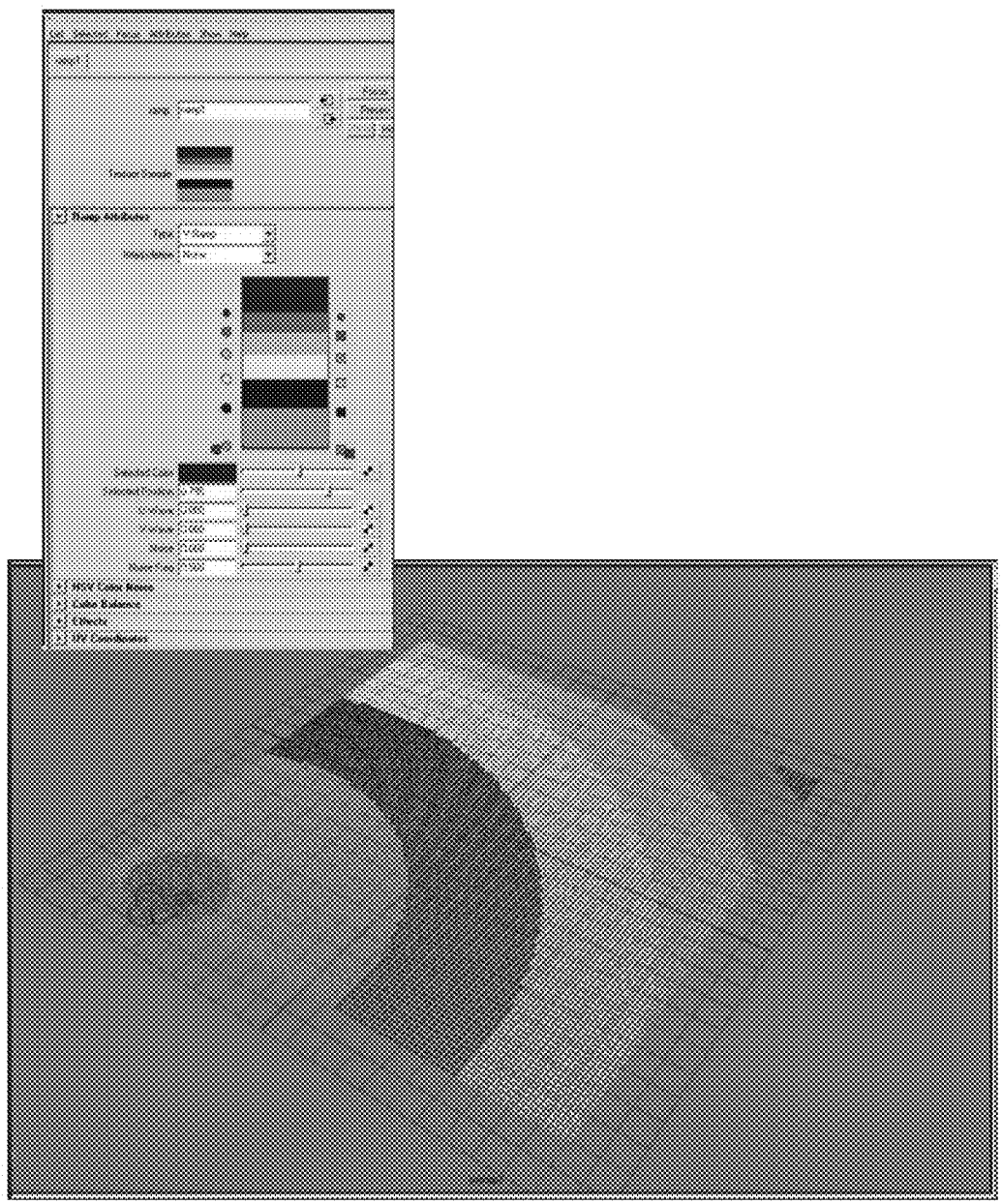
FIG. 23 shows modeling different regions across a membrane.
Figure 24:
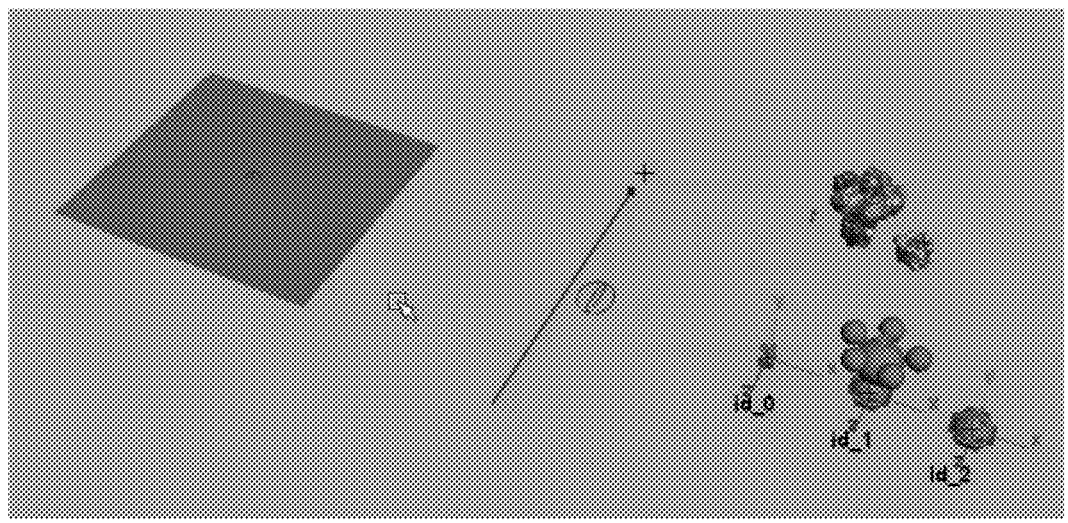
FIG. 24 illustrates bringing individual molecule models in to a membrane model.
Figure 25:
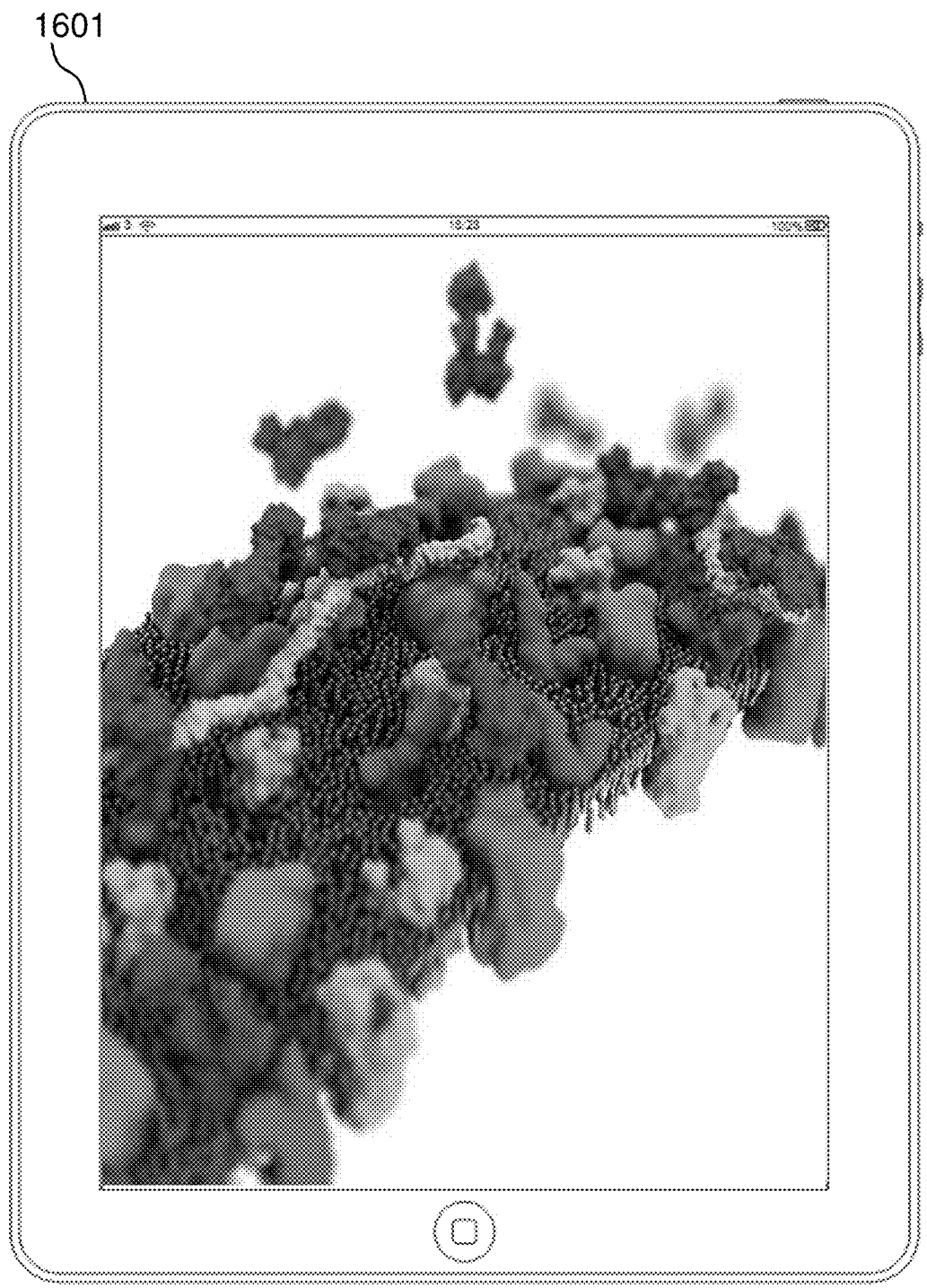
FIG. 25 shows use of an electronic device to view a visualization product.

FIG. 23-FIG. 25 illustrate membrane modeling according to embodiments of the invention to create a visualization product. Concepts of the invention include the ability to set or control a level of detail in a visual product. Setting the level of detail can aid in creating a visual product with the highest possible level of scientific accuracy given the available inputs and can also help tailor a visual product to an education level of an audience.

In this example, a bilayer membrane is modeled. Using a modeling environment, a user can establish areas with different levels of detail over an abstracted grid for the membrane. The user can also provide a simple piece of geometry—such as a curved plane—and, using the model information inside the database, populate this surface with a membrane model. This membrane model, as emanating from the curated model database, is pre-rigged and ready to animate/simulate within a scene and interact with other curated models embedded within it.

FIG. 23 shows use of molecular Maya to establish different regions across a membrane and set progressively varying properties across those regions. Here, a different level of detail is being set (e.g., high level of detail may be set for a region that will be close to a camera)—providing multiple levels of geometric (or other) detail is an example of metadata (i.e. an embedded property) of a curated model within the database.

FIG. 24 illustrates bringing individual molecule models (themselves curated models) in to the membrane model. Molecular Maya can then be used to populate the membrane with those molecules. There are different ways to accomplish this. For example, each phospholipid can be created as an instance of a phospholipid structure file that is rigged to allow appropriate rotation around bonds in the lipid tail. Alternatively, the phospholipids can be "drawn" as a set of strokes using, for example, a MEL or Python script. Transmembrane proteins and the membrane can be rigged to allow the proteins to float in the membrane and even displace laterally, if desired.

FIG. 25 shows use of an electronic device 1601 to view a visualization product of the curated models described in the invention. The visualization product may include a rendered animation. That is, the 3D model and rigging of a rigged model 121 and any other inputs may be rendered into a bit-mapped based video clip. The rendered animation may be viewed on a screen of 1601.

Example 5. The Visual Cell

Embodiments of the invention may provide The Visual Cell, an online, immersive and interactive learning environment for the most challenging concepts in the life sciences (including but not limited to cell & molecular biology, biochemistry, developmental biology, immunology, virology, neurobiology, physiology, experimental techniques and associated model organisms)—ones that are most effectively conveyed through visualization. The system is organized into visual mini-curricula and topic-specific collections and built upon a digital library of models, customizable imagery, animations, interactives and assessments. The system offers various learning paths through the material that tailor the materials to various educational levels including AP-Biology, introductory and advanced college biology topics. Data-driven scientific visualization modules are also available to scientists, educators and publishers in the context of topic-specific collections.

Figure 26:
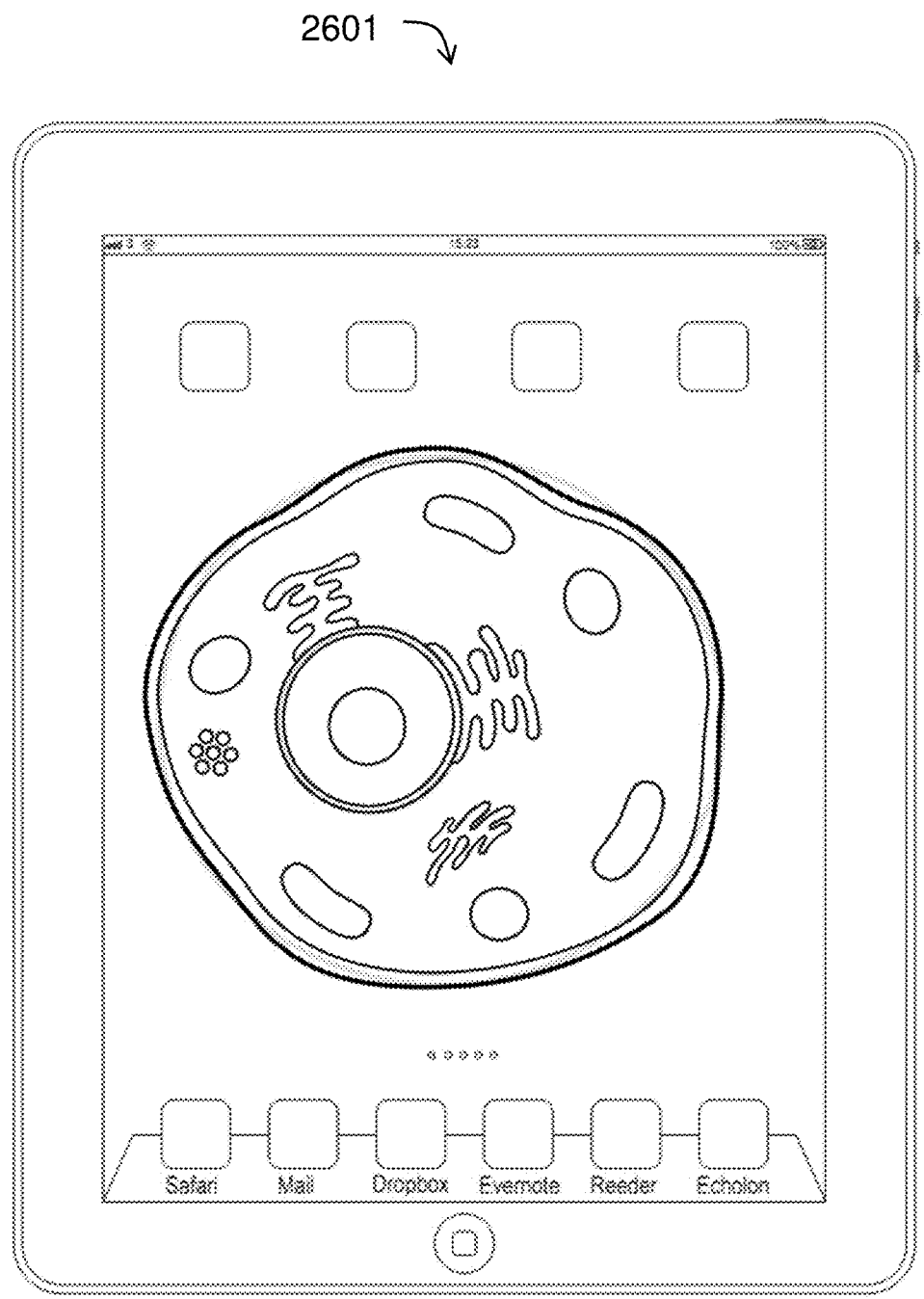
FIG. 26 illustrates use of an electronic device to interact with a model.

FIG. 26 illustrates use of an electronic device to interact with a model of a complex natural system such as a whole cell model. A whole cell model could be assembled from curated molecular models in the database. Systems and methods of the invention can be used to provide models that cover a substantial entirety of a complex natural system. For example, an ecological system such as the water cycle or population biology can be modeled. Astronomical and cosmological phenomenon such as energy and gravitational dynamics of galaxies and the space between them may be modeled. Organisms may be modeled, such as substantially all of the organ system in a body, or the development of an organism over time (e.g., embryonic stages). Neural networks and the architecture and function of the brain may be modeled. In certain embodiments, methods and systems of the invention are used to provide a visual cell.

The Visual Cell can include a plurality of interconnected visualizations that in the aggregate represent substantially all components and processes of a single cell. The Visual Cell and other assets illustrated herein use models from the curated database of this invention. A module from database 105 could include molecular recipes such that curated models are mixed together in varying amounts and seeded in an environment in order to result in such an image. It will be appreciated that each subsystem, such as each protein, for example, can be depicted using animations based on one or more rigged model 121. Device 2601 may be used by an audience member (e.g., student or other person) to interact with the cell. Interaction can include, for example, zooming in to examine features of interest or triggering metabolic phenomena. As discussed above, an animation may include a rigged model, which includes geometry representing some depicted structure and a rig. In some embodiments, these components are built and used within an animation environment such as Maya. Within Maya, a rig may be saved as a file that includes a reference to the rigged geometry file.

Figure 27:
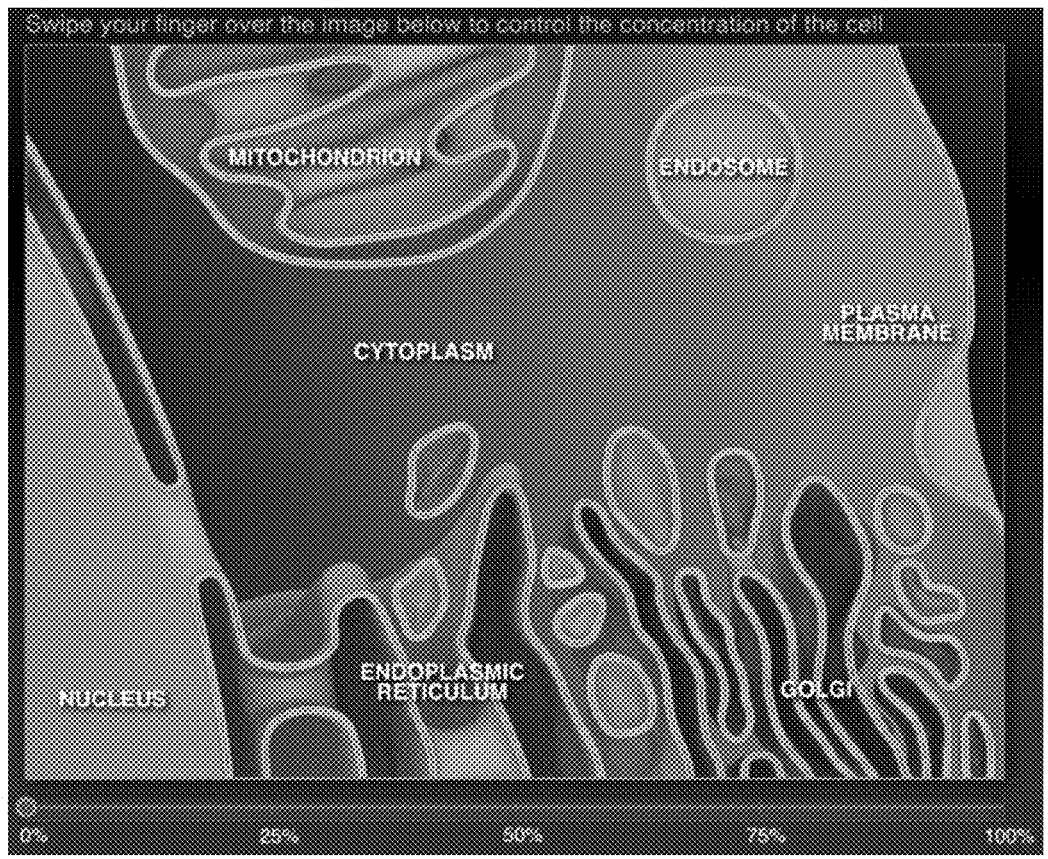
FIG. 27 illustrates a level of detail in a model.

FIG. 27 illustrates a zoomed-in level of an asset created using a curated model database in which a user may set a level of detail, or concentration, to be included in the scene. At the lowest level of detail, cellular mega-structures such as the endoplasmic reticulum and endosymbiotic organelles are depicted.

Figure 28:
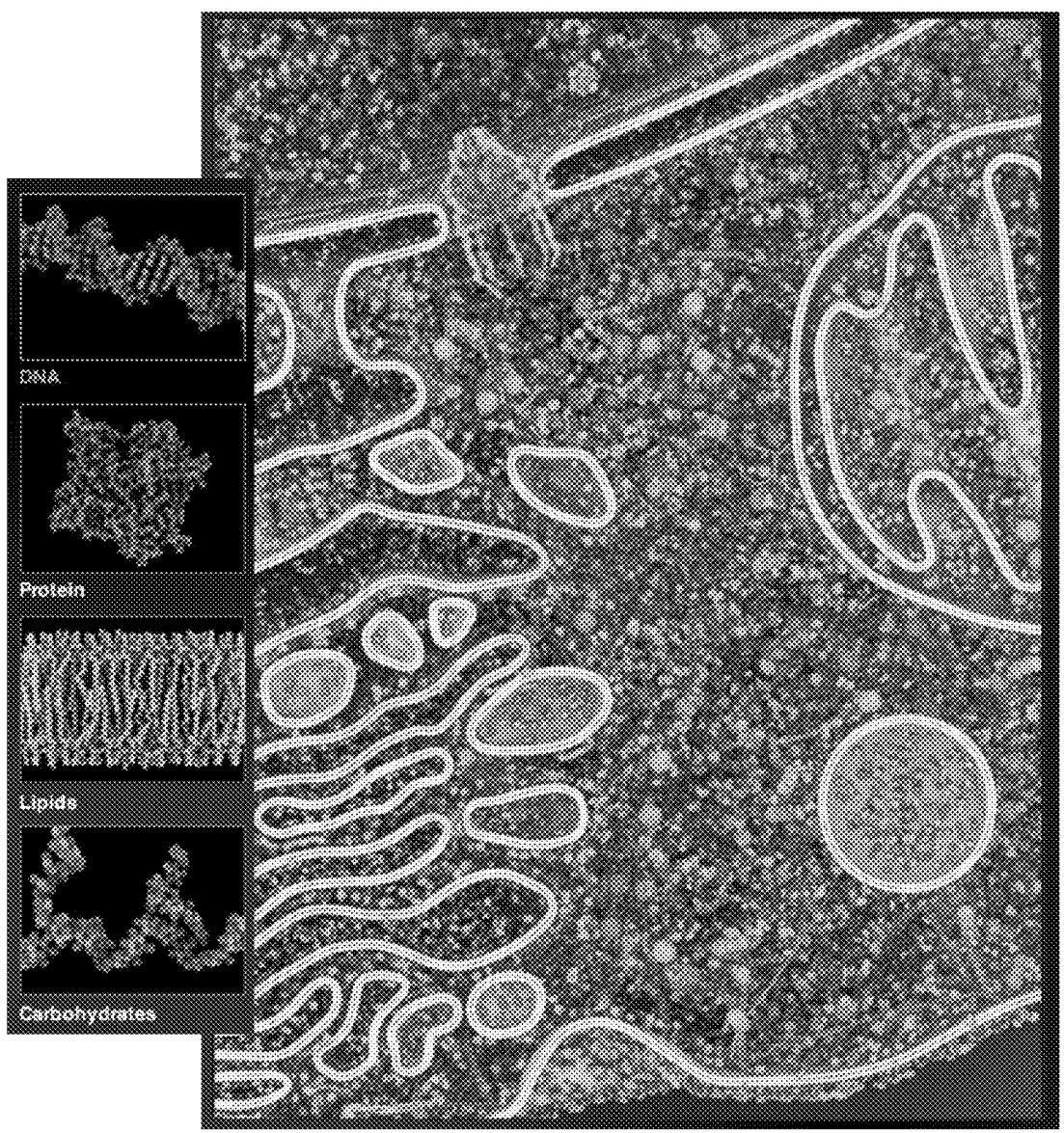
FIG. 28 shows a modeled cell with substantially all macromolecules present.

FIG. 28 shows a visual product in which a user has increased a level of complexity and the cell is depicted with substantially all macromolecules present. In the presented example, a key is set off to the side to show, for example, how color-coding may be used. For example, the key can indicate that all nucleic acids are red, all proteins are blue, all lipids are grey, and all carbohydrates are brown. Additionally, the key can be used to toggle the appearance of certain classes of macromolecule on and off. Since each macromolecule is represented using a rigged model 121 built on data that is sourced from primary scientific research, the actions and interactions depicted within the visual cell will be scientifically accurate.

Figure 29:
FIG. 29 shows a zoomed-in view from the visual cell.

FIG. 29 shows a zoomed-in view from The Visual Cell that includes a close-up cross section of a mitochondrion within the cytoplasmic environment that it inhabits. The circular mitochondrial genome can be viewed by the user as can the functioning components of the electron transport chain. A user could choose to zoom in on, for example, an ATPase to observe how that piece of cellular machinery exploits a proton concentration gradient to cause rotation, which mechanical energy is transferred by phosphorylating ADP to ATP, a universal store and source of energy. Thus the visual cell can be used to understand how our endosymbiotic history enables aerobic respiration to provide the energy we use to live and grow.

User customization may be included in The Visual Cell and its component modules.

In certain embodiments, The Visual Cell tailors the materials that it presents to its users in several different ways.

Depending on login info and therefore user account, we know whether the user is an instructor, student in HS/AP-Bio, intro college, college upper level, graduate student or scientist. Each module within The Visual Cell database is 'rated' by curricular and complexity level. Therefore while a set of 20 modules might cover a specific topic like 'Biomembranes', only 5 of them would be rated/tagged for inclusion in an AP-Bio learning path/classroom, 12 would be tagged for use in Introductory Biology and the remaining 3 would be advanced modules (for advanced students or scientists).

In addition to complexity level, subsets of widgets can also be grouped according to another cross-cutting themes such as evolution or topics that align themselves with educational standards. For example, an instructor may want to assemble a set of widgets that focuses on evolutionary aspects of biology and thereby find and assign widgets that are tagged with this underlying theme, but belong to many different specific mini-curriculum topics (i.e. Biomembranes, Gene-to-Protein, Cell Death Machinery etc.). Other instructors may want to have a view of widgets that more strictly follow some educational standards and whose topics are aligned with the NGSS (Next Generation Science Standards) or Common Core standards for example.

By default, within a particular mini-curriculum, a specific ordering of modules is offered by The Visual Cell (i.e. a 'learning path' through the material of that mini-curriculum). This order of widgets (as noted above it could be 5 or 12 or 20 depending on level of the audience), however, can also be customized by the instructor. The UI of The Visual Cell allows instructors to inspect a library of all widgets within a mini-curriculum (represented with small icons and titles), individually drag-and-drop these widgets onto a custom learning path template and then assign this new custom order to their virtual classroom.

Customization in The Visual Cell can also be found at the level of individual modules and their functionalities. For example, modules that allow students to create their own custom 'recipes' for assembling a molecular landscape image are unique in that the output of these activities are completely custom to each student (no 2 images generated by these modules is likely to ever be the same since the student recipe drives a simulation to position molecular components into the 3D scene and resulting image).

Each student, while experiencing instructional and assessment activities within The Visual Cell, collects various types of materials to embed within their own digital study portfolio. The study portfolio is also used by the student to write notes and associate them with collected materials as preparation for class tests ('collected materials' in The Visual Cell might be a snapshot from an instructional movie, or a custom image or model created within an assessment module or the result of a simulation launched by the student). Instructors are able to review students' digital study portfolios and make edits (or suggest edits for the students to make). The creation and review of these study portfolios is a valuable assessment activity in itself since it gives instructors a good sense of what the student understands about the material as well as any misconceptions they may have. Since each student's activities, associated notes and assessments is unique to that student, the study portfolio is another example of a tailored experience within The Visual Cell.

Additionally, visual assessment may be included in The Visual Cell and its component modules.

Current modes of student assessment are limited in the scope of concepts that they can test. Banks of multiple choice questions remain an easy and effective way to ascertain certain kinds of factual understanding, but there are many aspects of the complex information presented to students that cannot adequately be assessed with such testing methods. Indeed, typical forms of assessment—like multiple choice questions (rarely with any reference to visual materials as part of the question) and/or essay-type questions remain a narrow window through which instructors can discern the strength and robustness of student knowledge. At the same time, rich visual media are increasingly being used to impart complex concepts to students. These include carefully designed diagrams or images, multi-part interactives, immersive and photorealistic movies and even educational mini-games that engage students to participate in tasks and discoveries that drive learning. There is a disconnect between these increasingly rich visual experiences and the nature of the follow-on assessments that test students' understanding of the concepts presented. An analogy would be to ask a student to provide a rich, textured account of a Shakespeare sonnet or a Bach fugue using either a Kindergarten vocabulary or a 3 note repertoire, respectively. In short, current forms of assessment no longer match the breadth of instructional techniques and visuals used by instructors and this limits our ability to offer customized learning paths for students.

Visual assessment paradigms within the digital modules of The Visual Cell leverage the richness of the varied forms of visual media that we use for instructional purposes. They offer a unique opportunity to reuse and cast in a different light visual activities driven by students that tie back to the instructional materials and therefore offer a more consistent experience to the student. Example of such visual assessment modules may include any of the following.

In one possible module, the interactive labeling of a figure or diagram by a student (a visual similar or identical to those they have previously encountered in an instructional module but that they are now challenged to label, annotate and/or comment on).

A 3D interactive module can ask students to manipulate and orient a 3D model in space (whether it be a molecule, tissue, organ, organism or other instruments). Assessment requires students to select specific angles that showcase certain characteristics of the model (in the case of a molecule/enzyme, for ex, the assessment may require the student to orient the molecular such that the active site is facing the camera).

An interactive module challenges students to re-order a jumbled sequence of visuals (either static frames/slides or movie segments) in order to assemble the proper movie of an ordered process. This type of activity reinforces the concepts by revisiting the visual materials previously used in an instructional module but also tests the student's understanding of the chronological order of a complex process (for ex, given 6 movie clips across the gene-to-protein continuum, the student is asked to order them such that the complete movie proceeds from gene transcription, RNA maturation and splicing, nuclear export, translation and protein folding). When properly assembled (along with any supplemental commentary and annotations captured from the student), the movie is integrated within a personalized digital study portfolio—a continuously updated and instructor-moderated document that students use in preparation for larger exams throughout the course.

One possible module provides free-hand annotations of existing visuals (i.e. 'circle the cytoplasmic domain of this protein'). Implemented as 'guided sketching' activities, the freedom of such assessment provides instructors with an even broader window on what students are thinking (see, e.g., the results of the 'Picturing to Learn' NSF project led by Felice Frankel).

A 'create-your-own-study-figure' interactive module can be included that lets students create their own custom, professional-quality image or simple animation and save it as part of their online study portfolio. For example, a list of molecular ingredients is presented to student along with a challenge: 'model a red blood cell membrane'. These challenges may be based on (i) the instructional materials previously presented and (ii) tailored to the curricular level. Student has the ability to selectively include individual ingredients along with their relative amounts and submit this recipe to The Visual Cell via the web UI. Leveraging our proprietary 3D tools running on the cloud (Molecular Maya), the student's recipe is used to assemble and, in some cases, simulate a custom 3D model in an automated fashion. This complex model is then automatically rendered into a beautiful image that is sent back to the student via the web UI. Such custom scientific images and short animations are not only creative visual assessments where students have control over their creation but, in doing so, the system tests their understanding of the components and interactions within a biological system like a cellular membrane or a molecular complex. The resulting imagery can be shared and critiqued within either a class-related social network (online) or used in the context of a flipped classroom setting. Constructive criticism from the instructor and/or classmates drives a second round of editing by the student (via the same web UI which has saved their original recipe)—the final image or short animation can then be interactively labeled by the student within The Visual Cell UI and becomes embedded within the student's online study portfolio.

Fundamentally, visual assessment harnesses the benefits of visual thinking in students. It broadens the scope of assessments because many more concepts (and misconceptions) can be gleaned from students through the use of a multitude of visuals—whether static, interactive or custom-created by students themselves. The richness of visual assessment activities also has the potential to the paradigm of 'learn, learn, learn, learn, learn, asses' model to a demonstratively more effective type of instruction (in terms of understanding and long-term retention) which follows the 'learn, asses, learn, asses, learn, asses' model. The latter begins to blur the distinction between learning and assessment phases as a result of the rich experience provided by creative visual assessments.

Example 6. A Mini-Curriculum

What follows is given as an exemplary mini-curriculum that includes assets and collections of assets that may be made using curated models according to embodiments of the invention.

Biomembranes Visual Mini Curriculum (Media Spec)

Target audiences: undergraduate General Biology, General Chemistry & Biochemistry (General Biology will also include Advanced Placement Biology)

Approach: develop as a full-fledged mini curriculum and then scale/customize learning path based on course level and individual assessment results.

Curriculum coverage & modules:
I. Introduction to membranes
Overview (narrated movie)
II. Lipid Structure & Properties of Lipid Aggregates
Lipids, water & understanding the hydrophobic effect
Emergent properties of phospholipids (HTML5 w/ narrated movie+assessments)
Classification of lipids & fats
Lipid structure assessment ('inspect, orient and label' 3D interactive assessment)
Evolutionary aspects of membrane structure (narrated movie)
Archaeal membranes (treated separately from evolution above)

III. Biomembranes & their Constituents
The fluid mosaic model (narrated movie)
Membrane permeability (narrated movie)
Assessing the fluidity of membranes with cell fusion (HTML5)
Assessing membrane protein diffusion with FRAP
Membrane micro-domains, lipid rafts & signaling
Diversity of biological membranes
Model a membrane ('create your own study figure' interactive/assessment)
Spanning the membrane (interactive figure)
Using hydrophobicity plots to predict transmembrane domains of proteins
Blood typing game
IV. Transport Across Membranes
Overview of transport mechanisms
Passive transport in detail/example (movie+assemble sequence interactive)
Active transport in detail/example (movie+assemble sequence interactive)
Co-transport in detail/example (movie+assemble sequence interactive)
Electrochemical gradients (interactive simulation w/ drag-and-drop elements)
V. The Endomembrane System & Bulk Transport
Endomembrane system
Membrane curvature
Endocytosis & exocytosis
Mechanotransduction through membranes
Normal and virus-induced membrane fusion
Additional Modules to Consider
'Membranes in the lab'
'Membranes in the clinic'
'Do-you-believe-it?'-themed module
'Hot-off-the-press/bench'-themed module
visual glossary (with etymological roots)
Detail of Visual Mini Curriculum Modules
I. Introduction to Membranes
Overview (Narrated Movie)

Covers the overall role of membranes (the 'edge of life'), geography of membranes within cells, key molecular actors (lipids, proteins, sugars)—puts membranes in the cellular context and establishes the basic challenge at hand: controlling the passage of substances through them. What comes in, what stays out.

Figure 30:
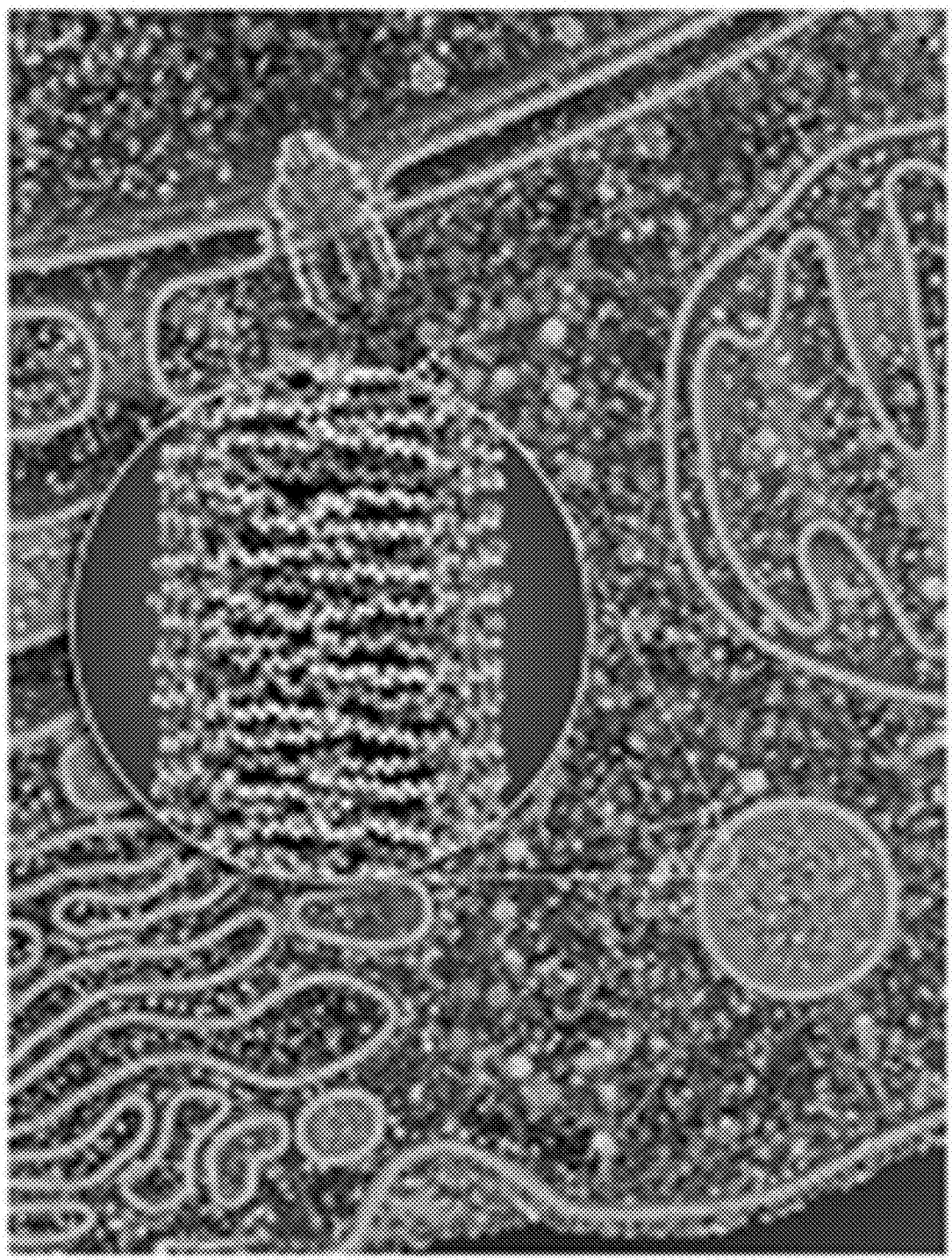
FIG. 30 illustrates a detail of a membrane.

FIG. 30 illustrates a detail of a membrane.

(Curriculum may include a video or a link to a video and may also allow students to post examples from nature, from their lives, analogies, connections—on the topic of controlled passage.)

II. Lipid Structure & Properties of Lipid Aggregates
Lipids, Water & Understanding the Hydrophobic Effect A module that combines an introductory narrated molecular movie and a visual assessment section that gets students to relate local perturbations in H-bond formation in bulk water by free/exposed aliphatic chains of a phospholipid.

part 1—a short narrated movie that explains how a molecular system always 'strives' to reach its lowest energy state (restatement of the 2nd law of thermodynamics). Visualize, as part of a small MD simulation, the H-bonding pattern of water in ice, liquid and gas states. We would show how increasing the amount of thermal energy fed into the system. These visuals will be accompanied by a quantitation of the average number of H-bonds per molecule in the system (4 for ice, 3.6 for water, and ~2 for ones surrounding a hydrophobic molecule).

part2—a series of visual assessment activities that show students simulations (with accompanying quantitative illustration of H-bond number & corresponding energy changes) and asks them to observe the data and offer explanations. Could include 2 steps/simulations:

1. Visualize lone phospholipid in bulk water start with review of average H-bond numbers per molecule in bulk water (visual+quant)–focus on single hero molecule (again, highlight H-bonds only for this one molecule) and show what happens when it diffuses and joins the hydration shell of a dissolved phospholipid (with quant), and then again when it leaves. Spend a few seconds, as an aside, showing H-bonding of water with polar head-group (and the fact that these waters DO maintain a higher # of H-bonds similar to bulk water). End with a highlight of all molecules in the hydration shell w/ average H-bond number for each (versus bulk water).

Visual assessment activity whereby students draw likely average curves (of either energy or H-bond number) for 2 individual molecules (1 bulk & 1 shell) or 2 highlighted populations of molecules (all bulk & all shell).

2. Visualize formation of a mini micelle in bulk water: A narrated movie Visual assessment activity whereby students—having seen the results of the micelle formation simulation—predict/estimate the energy of the entire system between frame 1 and the last frame.

Figure 31:
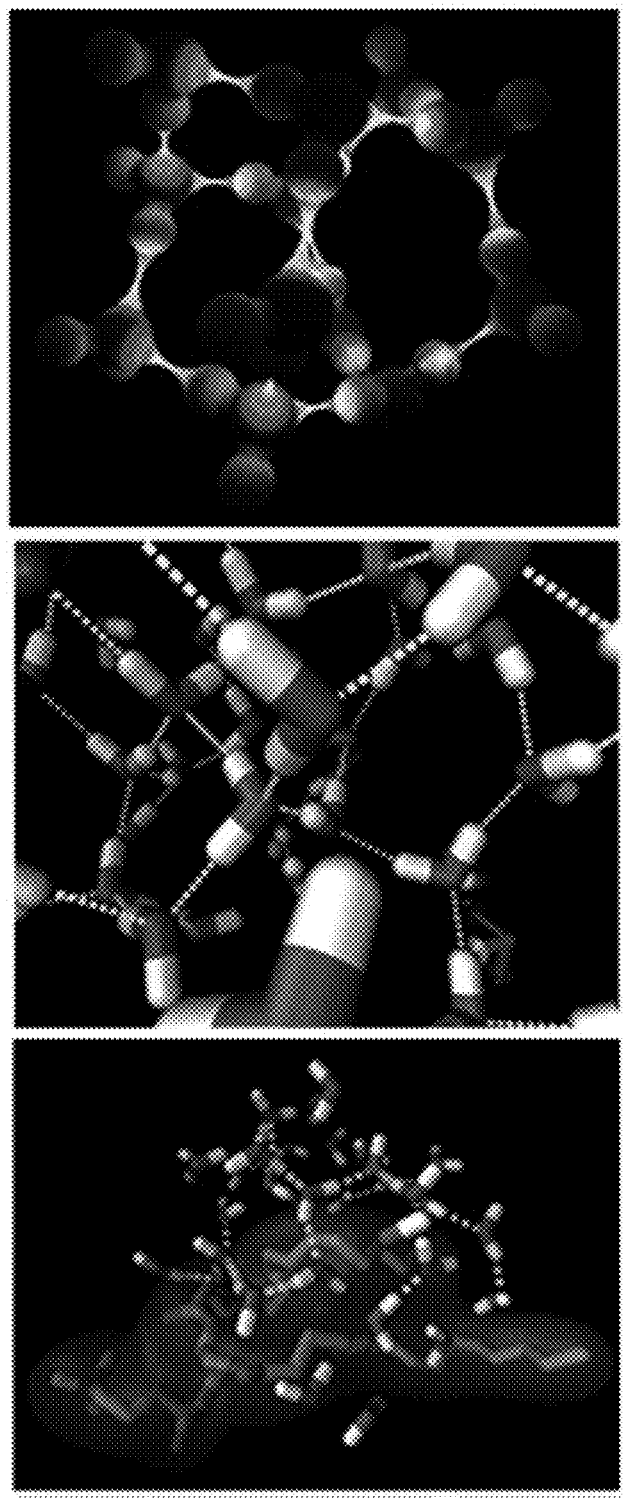
FIG. 31 shows an H-bond network in ice, bulk water and around a fatty chain.

FIG. 31 shows an H-bond network in ice, bulk water and around a fatty chain.

Emergent Properties of Phospholipids (HTML5 w/ Narrated Movie+Assessments)

How lipid structure/composition influences formation of micelles versus bilayers.

Narrated split-screen movie that compares micelle formation using a single-chain phospholipid (PDC, dodecyl-phospho-choline) and bilayer formation using a double-chain phospholipid (POPC, palmitoyl-oleoyl-phosphatidyl-choline). At end of movie, student is challenged with a series of questions based on visual inspection of selected frames or structures previously shown in the simulations (for ex: show snapshots of a stable micelle versus an intermediate aggregate highlighting any remaining hydrophobic areas in both (none in micelle, some in aggregate) and ask student to predict how system might evolve. (Answer is that micelle is stable—fully shielded—but aggregate would want to further aggregate/fuse in order to protect/bury its remaining hydrophobic surfaces). Another question will show student 3 new phospholipid structures (optional graphical highlight of their overall conical versus cylindrical shapes and ask student to predict what types of larger assemblies they are most likely to form. (optional 2 radio buttons for each of the three lipid structures: micelle, bilayer).

Classification of Lipids & Fats

Explanation of chemical structures—'amphiphile' concept (hydrophilic vs hydrophobic) differences between saturated/unsaturated & associated dynamics/flexibility.

Figure 32:
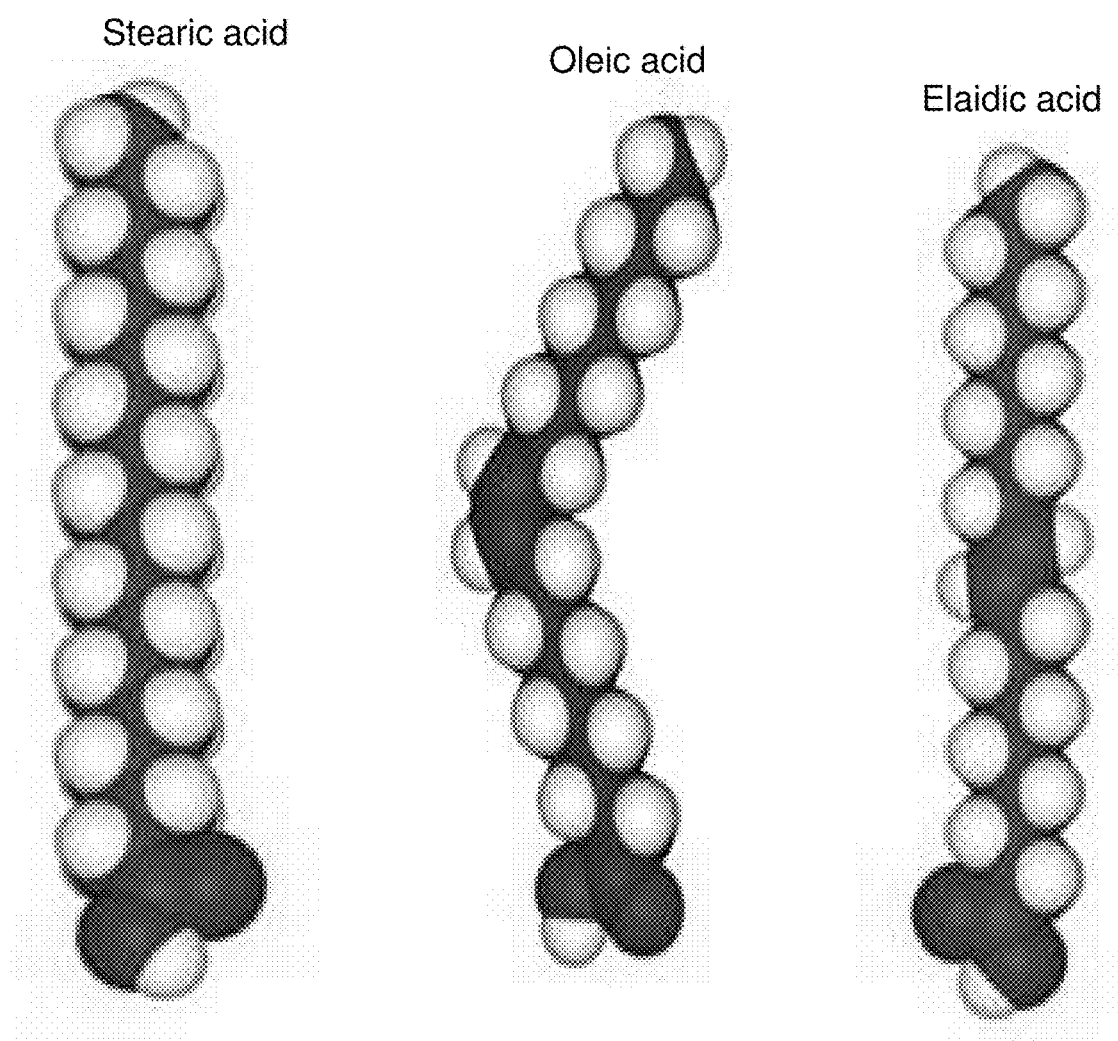
FIG. 32 shows phospholipids.

FIG. 32 illustrates chemical structures for stearic acid, oleic acid, and elaidic acid. Other structures include phosphatidylcholine (PC), phosphatidylethanolamine (PE), phosphatidylserine (PS), phosphatidylinositol (PI), cholesterol (Chol), sphingomyelin (SM), others.

Figure 33:
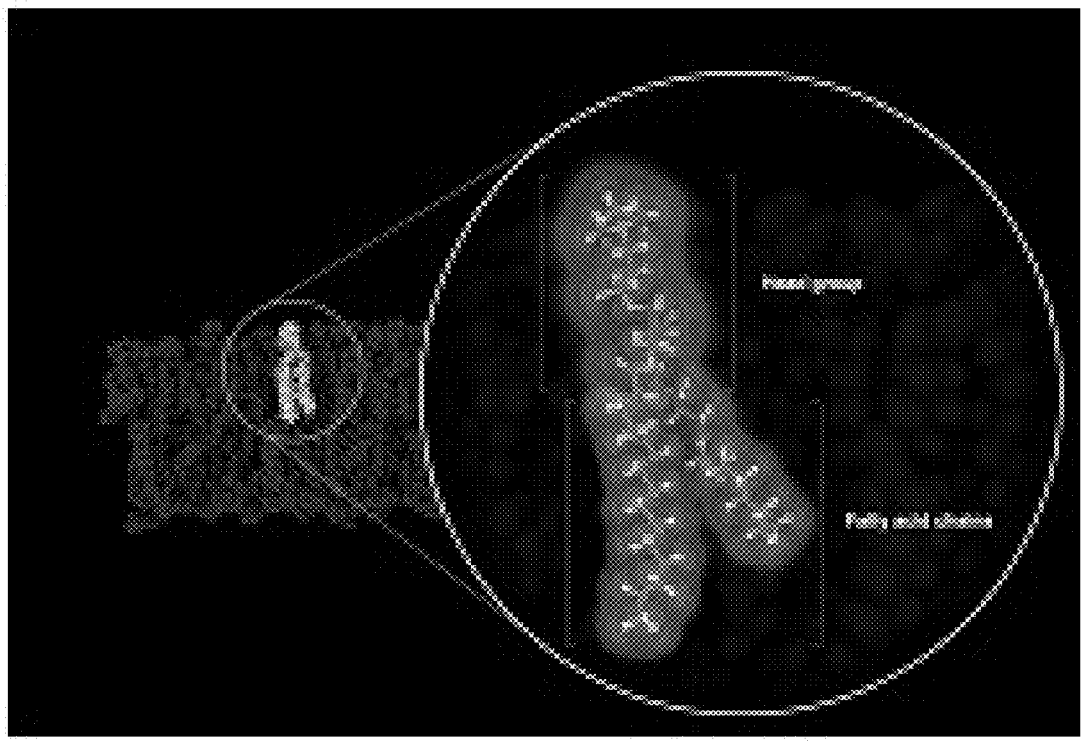
FIG. 33 illustrates chemical structures.

FIG. 33 shows a phospholipid in a membrane.

'Inspect, Orient and Label' 3D Molecular Interactive Assessment Module

The student is given a molecular model (in this case various fats, lipid structures—complexity of models presented will depend on level of instruction). Student inspect model interactively in the browser (using Unity) and considers how to optimally orient and then take a snapshot of the model in order to make visible and highlight key structural features. Student is then able to label their snapshot and enter/save it into their online 'study portfolio' (this is a way of using 3D interactivity as an assessment activity—as opposed to just 'explore the structure' which feels too unguided). (The concept of an e-portfolio is gaining increasing acceptance in higher ed. Students assemble evidence of their mastery in a variety of forms—written, videos, images, interactives.)

Evolutionary Aspects of Membrane Structure
different lipid compositions (saturated/unsaturated/other) depending on environmental temperature composition=evolutionary adaptation
structure of 'normal' bilayer with Archaeal monolayer with increased temperature.
evolutionary connections throughout. Might even see these nuggets as a separate "widget", mostly so that professors could see them all or arrange all into a special cross-cutting mini-curriculum. Help students make cross-concept connections.)

Figure 34:
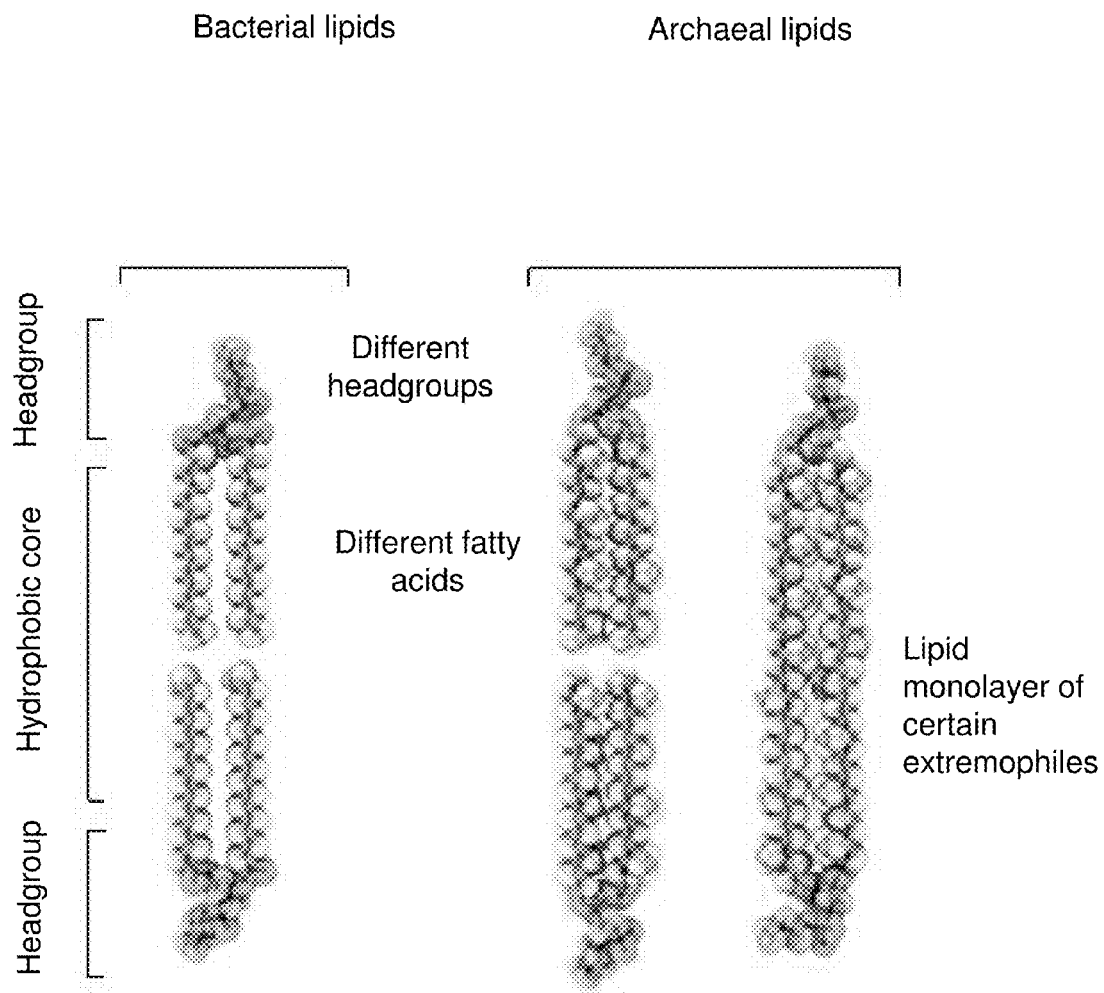
FIG. 34 shows phospholipids in leaflets.

FIG. 34 shows 1 phospholipid in a leaflet on the left versus 1 Archaeal lipid on the right.

(in adapting this existing simulation/visualization, make sure to temporarily highlight 1 phospholipid in a leaflet on the left versus 1 Archaeal lipid on the right—currently hard to tell the structural difference)

Figure 35:
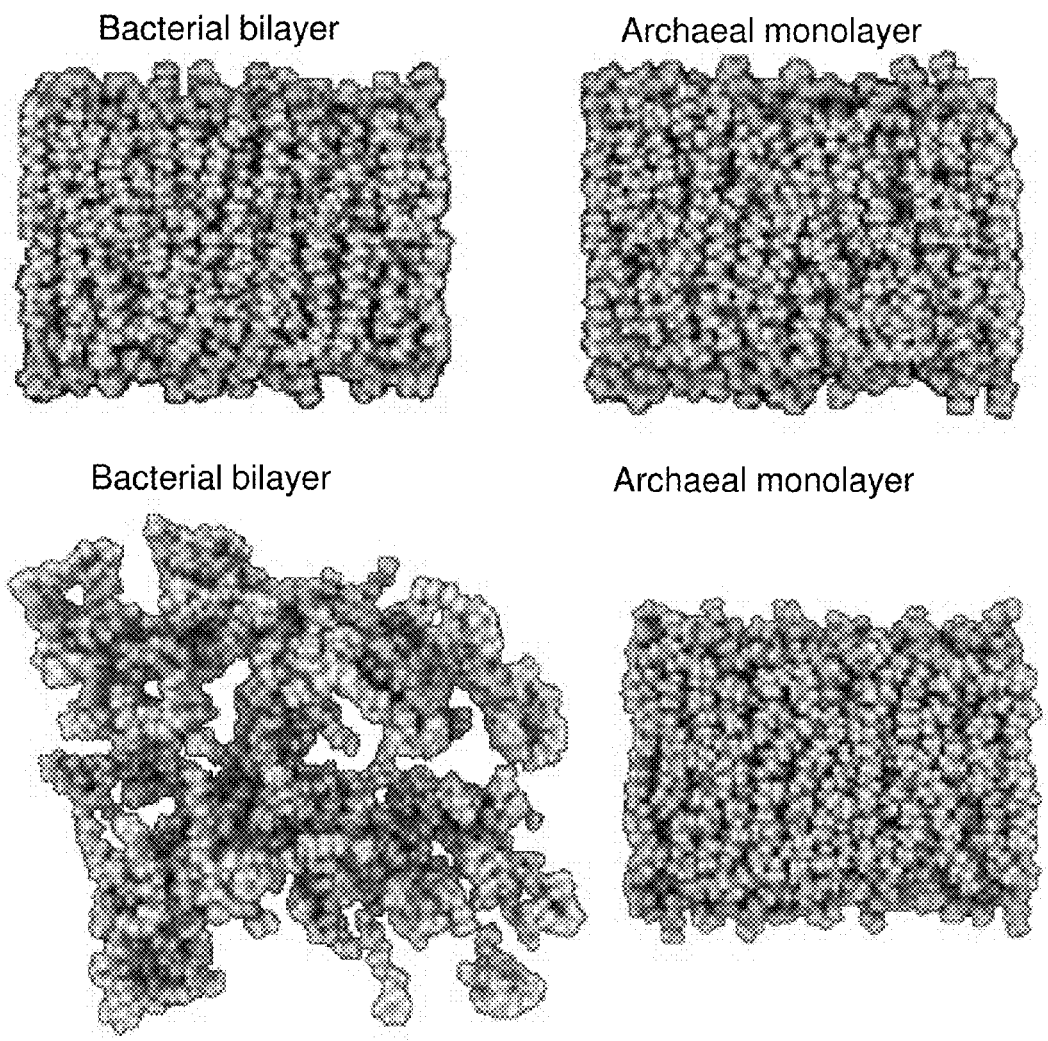
FIG. 35 illustrates a structural difference.

FIG. 35 illustrates a structural difference at increased temperatures.

III. Biomembranes & their Constituents
The Fluid Mosaic Model
Membranes are fluid mosaics of lipids and proteins—almost every protein in the membrane is laterally 'sensing' another protein that is only a few lipid radii away. Extra-membranous domains of peripheral and integral proteins lead to significant crowding of membrane surfaces, as well as the contribution of carbohydrates (glycosylation).

Figure 36:
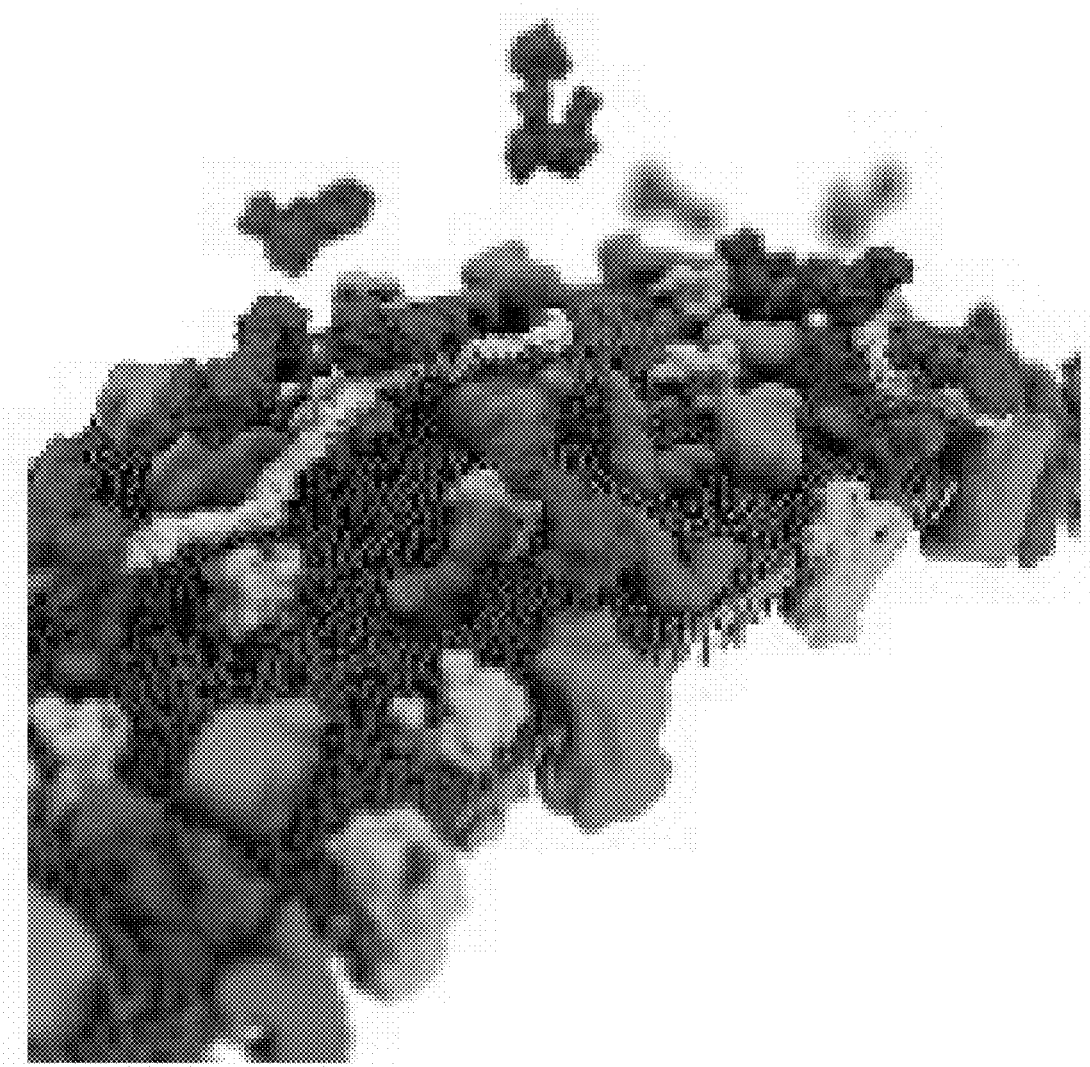
FIG. 36 illustrates an Archaeal monolayer.

Bacterial lipids Archaeal lipids Different headgroup—attachment—Different fatty acid—ÿ chains In some extreme thermophiles, the lipid bilayer is replaced by a monolayer of long fatty acids with a head group at both ends Bacterial bilayer FIG. 36 illustrates a lipid bilayer
Membrane Permeability
Narrated animation shows difference in intrinsic (i.e. lipid only) membrane permeability to water, ions, alcohol, small molecules, drugs and others.

(optional activity where students are challenged to drag different molecules or ions across a membrane? Water, Na, K, glucose. What goes and what doesn't? Why?)

Assessing the Fluidity of Membranes with Cell Fusion
The intention of this interactive-assessment module is for students to 'rediscover' these early observations and draw their own conclusions about membrane fluidity . . . several outcomes and experimental variables can be used:

explain goal of 1970 Frye & Edidin experiment & general methods (visualize basic cell fusion, staining and time course steps). Frye and Edidin, 1970, The rapid intermixing of cell surface antigens after formation of mouse-human heterokaryons, Journal of Cell Science 7:319-335.

provide data table (simplified/averaged Frye & Edidin data)—have students plot the data and suggest explanations for these findings. (optional question for more advanced levels—ask students what these experiments tell us about the fluidity of proteins on the INSIDE of the cell's plasma membrane?)

researchers offered at least 2 explanations for their results: 1) surface antigens diffuse freely in the plasma membrane and 2) rapid turnover of antigens (i.e. existing ones are recycled/degraded quickly and new ones are embedded in the membrane).

Ask students to suggest experiments to differentiate between these explanations (or offer a small selection of follow-up experiments and ask students to pick which one they feel is best suited to tell these mechanisms apart).

Reveal that the researchers repeated their experiments in the presence of a series of metabolic, protein and carbohydrate synthesis inhibitors, as well as at different temperatures We now know that there IS a lot of turnover in membrane constituents and that the cytoskeleton plays a key role in the shuffling of membranes. Ask students to suggest other experiments to address whether the cytoskeleton was involved in the events observed by Frye & Edidin (i.e., could use cytochalasin B or colchicine)

Based on what students have learned about the influence of lipid constituents on membrane fluidity (saturated and unsaturated lipids and cholesterol), ask them to hypothesize what might happen to the Frye & Edidin time course in membranes with different lipid compositions.

Assessing membrane protein diffusion with Fluorescence Recovery After

Photobleaching (FRAP)—Similar to concept of Peters 1974 experiments (except that they had to treat cell surfaces with fluorescein isothiocyanate—didn't have GFP-fusions!) Peters, et al., 1974, A microfluorimetric study of translational diffusion in erythrocyte membranes, Biochimica et Biophyisca Acta—Biomembranes 367(3):282-294.

Explain how method works.
Initially could have students control the bleaching beam and simply observe fluorescence recovery under various circumstances (like temperature or other variables).

A different experimental set-up is now provided where the student still controls the beam but we have 3-color fluorescence emitting from the cell—each color is a GFP fusion with a different membrane protein (but we don't reveal the identity of these proteins). The patterns overlap but are geographically distinct (hence usefulness now of having the student control the bleaching area; assume 3 colors can be visualized all at once for interactive).

Student is asked to sample different areas of the cell in order to target regions with different color staining patterns.

They observe different rates of recovery depending on the fluorescence color and are asked to hypothesize for mechanisms to explain this.

Based on cellular location and rate of diffusion, ask students to venture as to the possible identity (even just general molecular family) of these signals. Then reveal what they are along with a short explanation of that membrane protein's function (will be an opportunity to give examples of a freely-diffusing membrane protein, one associated with the cytoskeleton and perhaps one associated with the extracellular matrix).

Membrane Micro-Domains, Lipid Rafts & Signaling
A module that combines real images with an idealized top-view diagram of a membrane where student can observe or draw diffusion trajectories (in other words can either be shown data and asked to make observations/predictions or told about a mechanism and asked to draw expected trajectories and their speeds). Refer to real data/movie from Ron Vale lab using lck-GFP/CD2 movies. (incidentally, this is an opportunity to refer back to an enigmatic observation in the Frye & Edidin experiments that showed partial mosaics in fused cells at intermediate time points (i.e. human antigens appeared to diffuse more quickly than mouse ones in the heterokaryons—although they eventually completely overlapped). This is due to the fact that the anti-human stain was using sera raised against whole human cells, whereas antibody used to stain the mouse cells/antigens was specific to the H2 antigen (i.e. MHC) which is now known to exist in clusters and probably has reduced mobility.

Diversity of Biological Membranes

A visual exploration of the diversity of membranes within a cell, across cell types and across organisms:
within a cell
plasma
ER/Golgi
mitochondrial (inner/outer)
nuclear
across cell types within an organism
erythrocyte membrane
axonal/post-synaptic
adherens/tight junctions
other distinctive ones?
across organisms
eukaryotic
prokaryotic (gram+/−)
plant 'Create Your Own Study Figure' Interactive This unique module leverages a database of curated molecular models
- The module randomly assigns (optionally adaptively based on past performance in certain areas related to membrane diversity) to the student a type of membrane to model (e.g., an animal membrane, a plant cell membrane, make a bacterial membrane, an erythrocyte membrane from someone who is in the A blood group, etc. . . . )
- Student is given a menu of molecular actors (lipids, proteins, carbohydrates) and can choose to include or leave out each (where relevant, may even be able to dial in quantities)
- Student submits their suggested recipe for their custom membrane
- Student receives (onscreen):
- could be either a professional-quality 3D rendering of their membrane patch.
- (and/or) it could be an interactive of the 3D model in Unity (pre-rendering).

This allows for interaction, further customization perhaps and custom orientation. Note that each image will be unique to each student (even if 2 students dial in exactly the same molecular actors and relative quantities—this is because the membrane patch is simulated before being rendered).
- This image becomes the basis for either a live flipped classroom activity or social media-based virtual/forum-based activity—whereby students, guided by the instructor, critique each other's imagery for veracity/accuracy.
- With feedback in hand, the student returns to their saved membrane recipe online, modifies it and resubmits it. Using this final image, the system brings up all relevant labels in the window and the student goes about labeling (via drag-and-drop online) their study figure, which can then become part of their digital study 'portfolio.'

Spanning the Membrane

This interactive figure is a select visual catalog of structures/folds that nature has evolved to span the lipid bilayer. Default state of figure shows a single horizontal cross-section of a membrane with many proteins embedded/lined-up next to one another—the graphic style highlights the secondary structure of the transmembrane portion of each and showcases the structural diversity of folds used to span the membrane. By mousing-over each structure, student reveals (in close-up if necessary) the key hydrophobic side chains that enable these TM domains.

Using Hydrophobicity Plots to Predict Transmembrane Domains of Proteins

Students can interactively mouse over a primary structure and hydrophobicity plot in order to view the corresponding residues in the folded, membrane embedded proteins.

Blood Typing Game (with a Focus on Relevance to Membranes!)

A patient of known blood group enters the ER, and in need of a blood transfusion—ER has just received blood but the label has fallen off the bag and blood is now of unknown blood group. The goal of the game is to test and identify the blood group for the blood sample in order to start the transfusion and save the patient.
- Students being by mixing serum (i.e. antibodies) of the individual needing a transfusion with unknown blood/RBCs
- We visualize erythrocyte/RBC aggregation—little short animations show antibodies either 'flying by' the RBCs or binding and cross-linking them, leading to aggregation. If aggregates form, then you know right away the blood type. If they don't aggregate in round 1, then you could just go ahead and give that blood to that patient, but you would like to fully identify it in case another patient come in requiring blood. This indicates a need for a further test.
- Student carries out an antibody-based test against the potential remaining antigen to differentiate that antigen (A or B) from O
- As a result of figuring it out, the student visualizes the surface of the RBCs in the donated blood—i.e. antigens A, B or absence of either (and of course, patient gets transfusion and is saved).

IV. Transport Across Membranes

Figure 37:
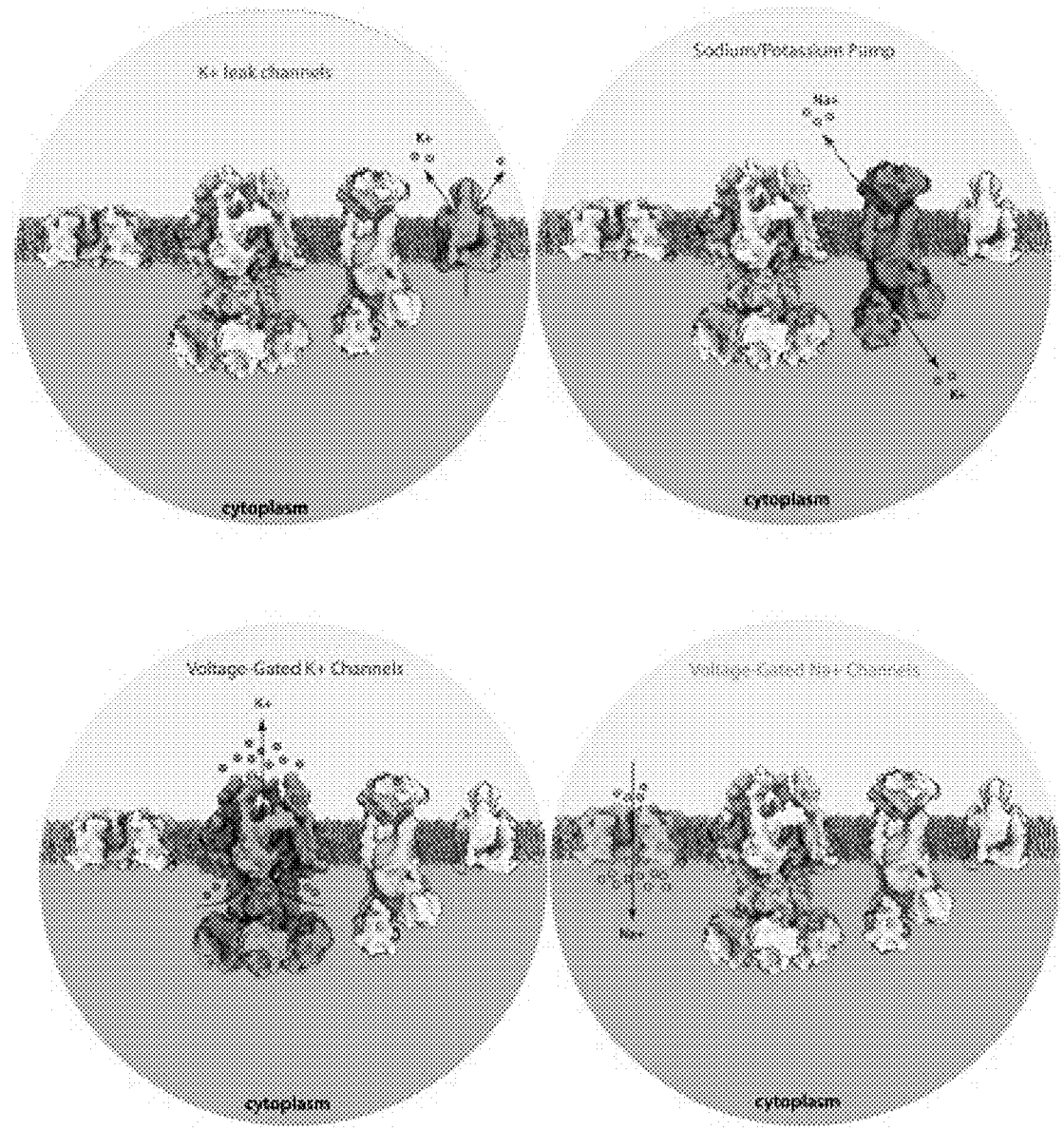
FIG. 37 illustrates types of transport.

Movies explaining the structure/function of proteins involved in key types of transport:
passive transport (down gradient, no energy)—include facilitated & gated transport
active transport (up gradient, needs energy input)
co-transport (down gradient of one, allows up gradient of other)
FIG. 37 illustrates types of transport
Also show structure/function of:
aquaporin
connexin (connexons/gap junctions)
pore-forming toxins: hemolysin A (beta sheet-based), cytolysin (alpha-helical)

Interactive Module to Explore how Cells Create and Maintain Electrical and Chemical (Electrochemical) Gradients and Harness their Potential Energy.

V. The Endomembrane System & Bulk Transport

Endomembrane System Overview of Membrane-Enclosed Organelles

Figure 38:
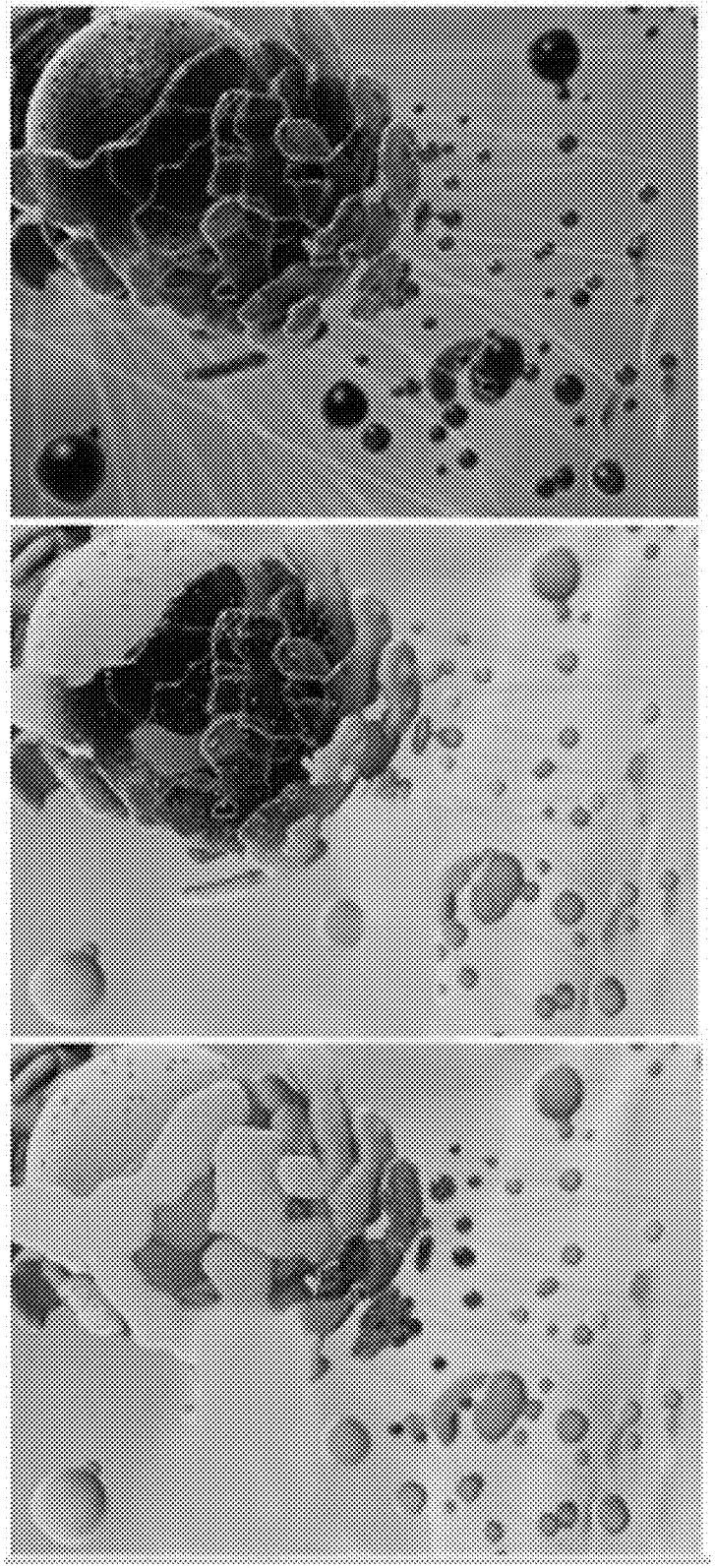
FIG. 38 shows an overview of membrane-enclosed organelles.

FIG. 38 shows an overview of membrane-enclosed organelles.

Membrane Curvature

Examples of how certain proteins (i.e. BAR-domains and others) preferentially bind curved membranes and also stabilize them (relevance to the function and maintenance of the endomembrane system).

Endocytosis & Exocytosis

Figure 39:
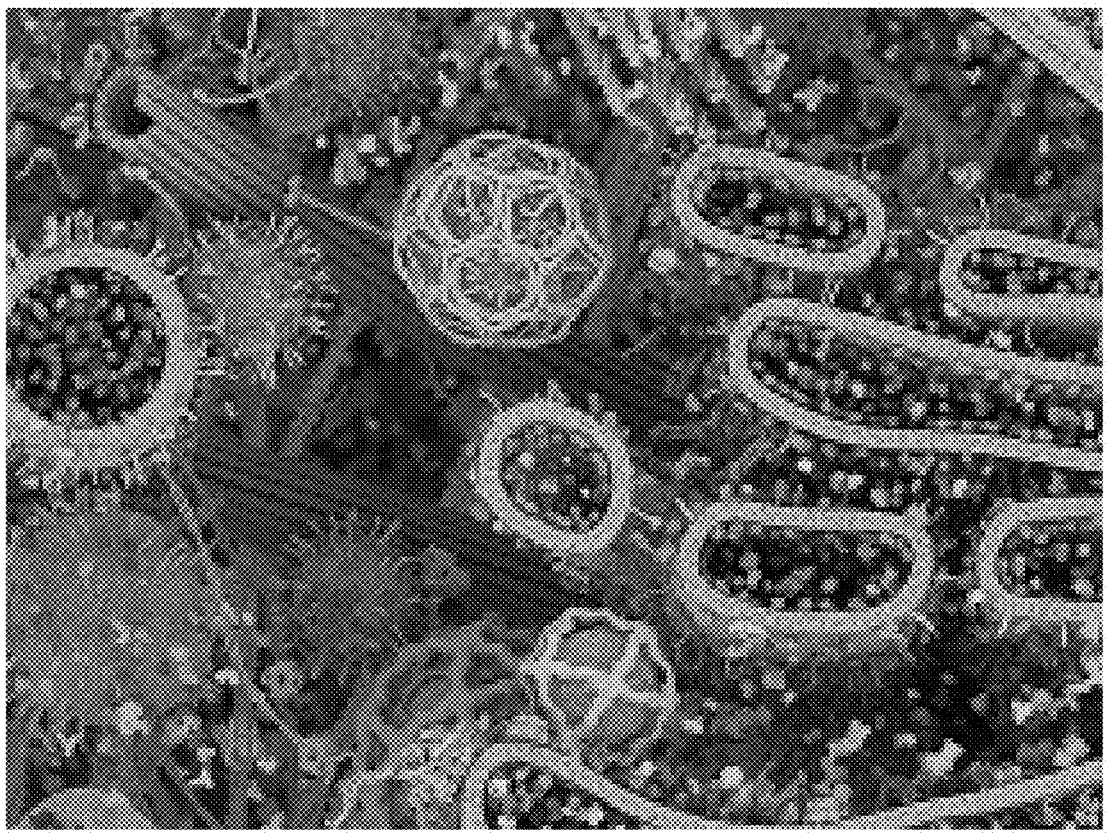
FIG. 39 shows endo- and exo-cytosis.

FIG. 39 shows organelles and molecular actors relevant to endomembrane transport system (including endo-, exocytosis and vesicle transport)

Mechanotransduction Through Membranes

Figure 40:
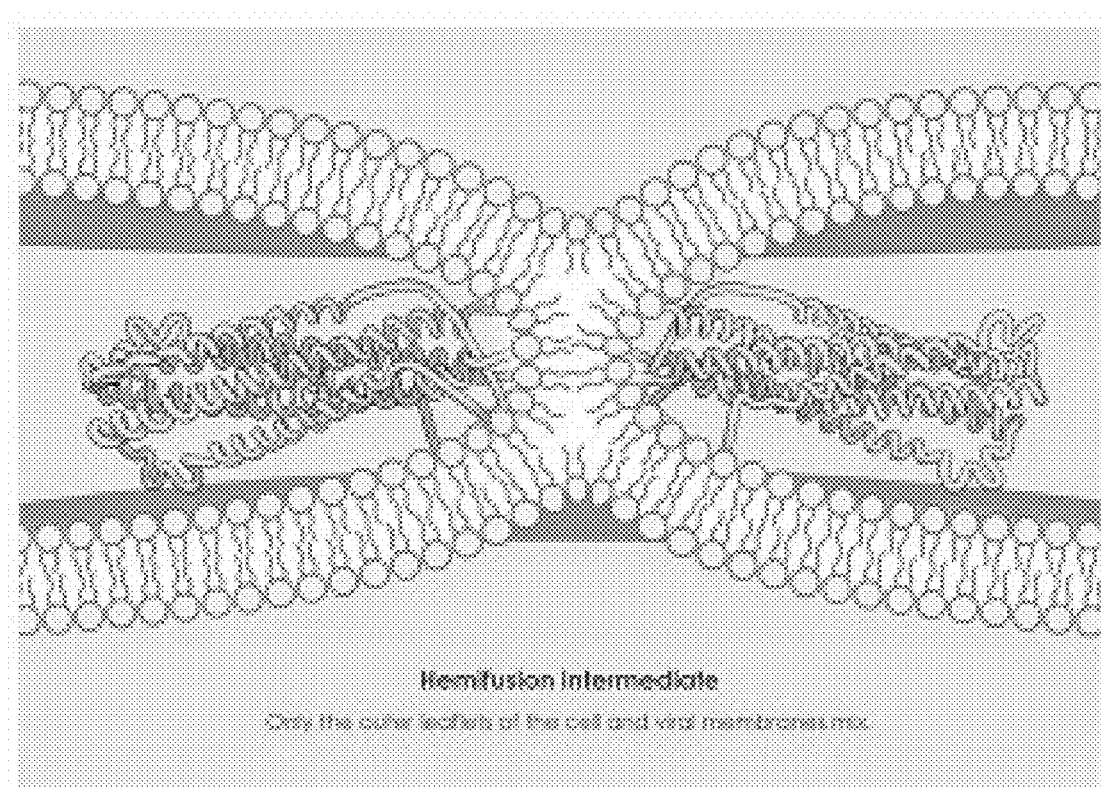
FIG. 40 shows a hemi-fusion intermediate.

Examples of how proteins can influence membrane thickness and how membrane composition and tension can influence protein function Virus-Induced Membrane Fusion Viral strategies and associated molecular machinery that drive this energetically-unfavorable event FIG. 40 shows a hemi-fusion intermediate.

Additional modules that may be optionally include in BIOMEMBRANES visual mini curriculum 'Membranes in the Lab'

Explores intersection of scientific principles covered above and practical knowledge about manipulating membranes in an experimental/lab setting. For example how to use detergents to solubilize or fractionate membranes.

'Membranes in the Clinic'

Use an example like the Multi-Drug Resistance (MDR) channel to explain the clinical relevance of proteins that can expel small molecule drugs from cells 'Do-you-believe-it?'-themed module that offers data supporting an alternate (or slightly modified) view of a mechanism 'Hot-Off-the-Press/Bench'-Themed Module Highlights very recent data/finding in the field—gives students a feel for how area is still actively being studied and what are the key remaining unknowns.

visual Glossary (with Etymological Roots)

(reference visualization data & methods embedded within each of these widgets)

What is claimed is:

1. An integrated system for providing a scientific simulation, the system comprising:
   a processor coupled to a non-transitory memory having stored therein:
   at least one rigged curated digital model comprising a biomolecule structure generated from scientific data, including structural, dynamic, and behavioral data, sourced from one or more scientific data sources and a rig that defines animation dynamics for the biomolecule structure based on the scientific data,
   wherein the rigged curated digital model is constructed from a geometry or particle object file comprising scientific structural data sourced from the one or more scientific data sources, the geometry or particle object file providing a three-dimensional model of the biological structure, and rigging data applied to the structural data of the three-dimensional model based on correlation of the structural data and rigging data, the rigging data comprising dynamic and behavioral data sourced from the one or more scientific data sources and corresponding to the structural data of the biological structure, wherein the rig comprises an organized system of deformers, expressions, and controls, including a plurality of joints, that allow one or more portions of the biomolecule structure to be deformed into a plurality of scientifically accurate poses for conveying a scientific concept, such that a range of motion of the at least one rigged curated digital model on an electronic display device is predetermined without manipulation from a user; and
   at least one molecular dynamics modality selectable by the user that applies one or more parameters that influence the animation dynamics of the biomolecule structure in a simulation provided by the system.

2. The system of claim 1, further comprising at least one user-selectable environment that defines the volume and composition of the simulation space for the at least one rigged curated digital model.

3. The system of claim 2, wherein the user-selectable environment includes compositional and quantitative settings.

4. The system of claim 3, wherein the user-selectable environment includes a representation of a biological membrane and the compositional and quantitative settings control a specific molecular composition of the biological membrane or a relative amount of lipids and proteins in the biological membrane.

5. The system of claim 1, further comprising a graphical interface that allows a user to select the molecular dynamics modality and build the simulation.

6. The system of claim 1, wherein the molecular dynamics modality comprises at least one selected from the list consisting of Brownian dynamics, a Monte Carlo simulation, an explicit-solvent coarse-grained simulation, an implicit-solvent coarse-grained simulation, an all atom simulation, and a quantum mechanical simulation.

7. The system of claim 1, wherein the system is operable to receive a new rigged curated digital model from the user and create the simulation using the new digital model and the selected molecular dynamics modality.

8. The system of claim 1, wherein the biomolecule structure and the rig of the rigged curated digital model and the selected molecular dynamics modality govern how that rigged curated digital model will interact with other rigged curated digital models in the simulation and a resulting visualization.

9. The system according to claim 1, wherein the rig that defines animation dynamics comprises different sets of rules for the rigged curated digital model based on the selected molecular dynamics modality.

10. The system according to claim 9, wherein the rig further offers various methods and levels of coarse-graining detail and the selected molecular dynamics modality allows the user to control one or more of temperature, salinity, pH, osmolality, viscosity, and a combination thereof in the simulation.

11. The system of claim 1, wherein the rig allows the data to illustrate a biological entity in a plurality of realistic conformations within the simulation.

12. The system of claim 1, further wherein the user may create the simulation and share a visual version of the simulation with a plurality of viewers.

13. The system of claim 1, wherein a plurality of users may contributed to the simulation by selecting one or more molecular dynamics modalities or rigged curated digital models for inclusion in the simulation.

14. A method of producing a scientific simulation, the method comprising:

obtaining a plurality of rigged curated digital models stored in a non-transitory computer-readable medium, each one rigged curated digital model comprises a biomolecule structure generated from scientific data, including structural, dynamic, and behavioral data, sourced from one or more scientific data sources and a rig that defines animation dynamics for the biomolecule structure based on the scientific data, wherein the rigged curated digital model is constructed from a geometry or particle object file comprising scientific structural data sourced from the one or more scientific data sources, the geometry or particle object file providing a three-dimensional model of the biological structure, and rigging data applied to the structural data of the three-dimensional model based on correlation of the structural data and rigging data, the rigging data comprising dynamic and behavioral data sourced from the one or more scientific data sources and corresponding to the structural data of the biological structure, wherein the rig comprises an organized system of deformers, expressions, and controls, including a plurality of joints that allow one or more portions of the biomolecule structure to be deformed into a plurality of scientifically accurate poses for conveying a scientific concept, such that motion of each digital model on an electronic display device is predetermined without manipulation from a user;

selecting at least one molecular dynamics modality that applies one or more parameters that influence the animation dynamics of the plurality of rigged curated digital models;

generating a simulation through use of the plurality of rigged curated digital models and the selected molecular dynamics modality; and outputting the simulation for display on an electronic device as a visualization that conveys a scientific concept to a user.

15. The method of claim 14, wherein at least one of the rigged curated digital models comprises two or more alternative rigs.

16. The method of claim 14, wherein the molecular dynamics modality selectable by the user provides one selected from the list consisting of Brownian dynamics, a Monte Carlo simulation, an explicit-solvent coarse-grained simulation, an implicit-solvent coarse-grained simulation, an all atom simulation, and a quantum mechanical simulation.

17. The method of claim 14, wherein the memory further has stored therein at least one environment model that the user may include in the simulation.

18. The method of claim 17, further comprising receiving a new rigged curated digital model from the user and creating the simulation using the environment model, the new rigged curated digital model, and the selected molecular dynamics modality.

19. The method of claim 17, wherein the environment model represents at least a portion of a biological lipid membrane.

20. The method of claim 19, wherein the simulation includes a number of the rigged curated digital models in a pathway animation depicting a cascade of events in which at least two depicted biological structures interact only indirectly.

21. The method of claim 14, wherein the selected molecular dynamics modality and the rig of the rigged curated digital model govern how that digital model will interact with other rigged curated digital models in a visualization.

22. The method of to claim 14, wherein the selected molecular dynamics modality allows the user to control one or more of temperature, salinity, pH, osmolality, viscosity, and a combination thereof in the simulation.

23. The method of claim 14, further wherein the user may create the simulation and share a visual version of the simulation with a plurality of viewers.

24. The method of claim 14, further comprising allowing a plurality of users to contribute to the simulation by selecting one or more molecular dynamics modalities or rigged curated digital models for inclusion in the simulation.

* * * * *